United States Patent
Wolff

[19]

[11] Patent Number: 5,999,930
[45] Date of Patent: Dec. 7, 1999

[54] METHOD AND APPARATUS FOR DISTRIBUTED CONTROL OF A SHARED STORAGE VOLUME

[75] Inventor: James J. Wolff, Santa Barbara, Calif.

[73] Assignee: Hewlett-Packard Company, Palo Alto, Calif.

[21] Appl. No.: 08/905,307

[22] Filed: Aug. 1, 1997

Related U.S. Application Data

[60] Provisional application No. 60/023,218, Aug. 2, 1996.

[51] Int. Cl.[6] .................................................. G06F 17/30
[52] U.S. Cl. .................................... 707/8; 707/9; 707/10; 707/100; 707/103
[58] Field of Search ............................ 707/8, 9, 10, 100, 707/103; 395/187.01, 200.43, 200.55, 200.5, 200.31, 200.75; 364/133; 380/25, 21, 23, 49

[56] References Cited

U.S. PATENT DOCUMENTS

| | | | |
|---|---|---|---|
| 5,226,143 | 7/1993 | Baird et al. | 395/425 |
| 5,428,745 | 6/1995 | De Bruijn | 395/187.01 |
| 5,442,765 | 8/1995 | Shiga | 395/600 |
| 5,459,862 | 10/1995 | Garliepp et al. | 395/600 |
| 5,469,575 | 11/1995 | Madduri | 395/200.03 |
| 5,535,361 | 7/1996 | Hirata | 395/200.35 |
| 5,535,375 | 7/1996 | Eshel et al. | 391/500 |
| 5,553,240 | 9/1996 | Madduri | 395/200.03 |
| 5,564,019 | 10/1996 | Beausoleil et al. | 395/200.08 |
| 5,568,615 | 10/1996 | Sederlund | 395/200.43 |
| 5,623,670 | 4/1997 | Bohannon et al. | 395/726 |
| 5,625,795 | 4/1997 | Sakakura et al. | 395/475 |
| 5,634,122 | 5/1997 | Loucks et al. | 395/608 |
| 5,649,102 | 7/1997 | Yamauchi et al. | 345/200.03 |
| 5,724,575 | 3/1998 | Hoover | 707/10 |

*Primary Examiner*—Thomas G. Black
*Assistant Examiner*—Diane D. Mizrahi

[57] ABSTRACT

A distributed volume management system is disclosed in which clients on a network share responsibility for the coherency of a data storage volume. The system includes: a control table which includes availability indicia for indicating whether the control table is available and identification indicia for indicating ownership of the data storage volume. The system also includes control processes each executed on a client. The control processes request and acquire exclusive ownership of the control table to provide to the clients exclusive write access to the data storage volume.

19 Claims, 48 Drawing Sheets

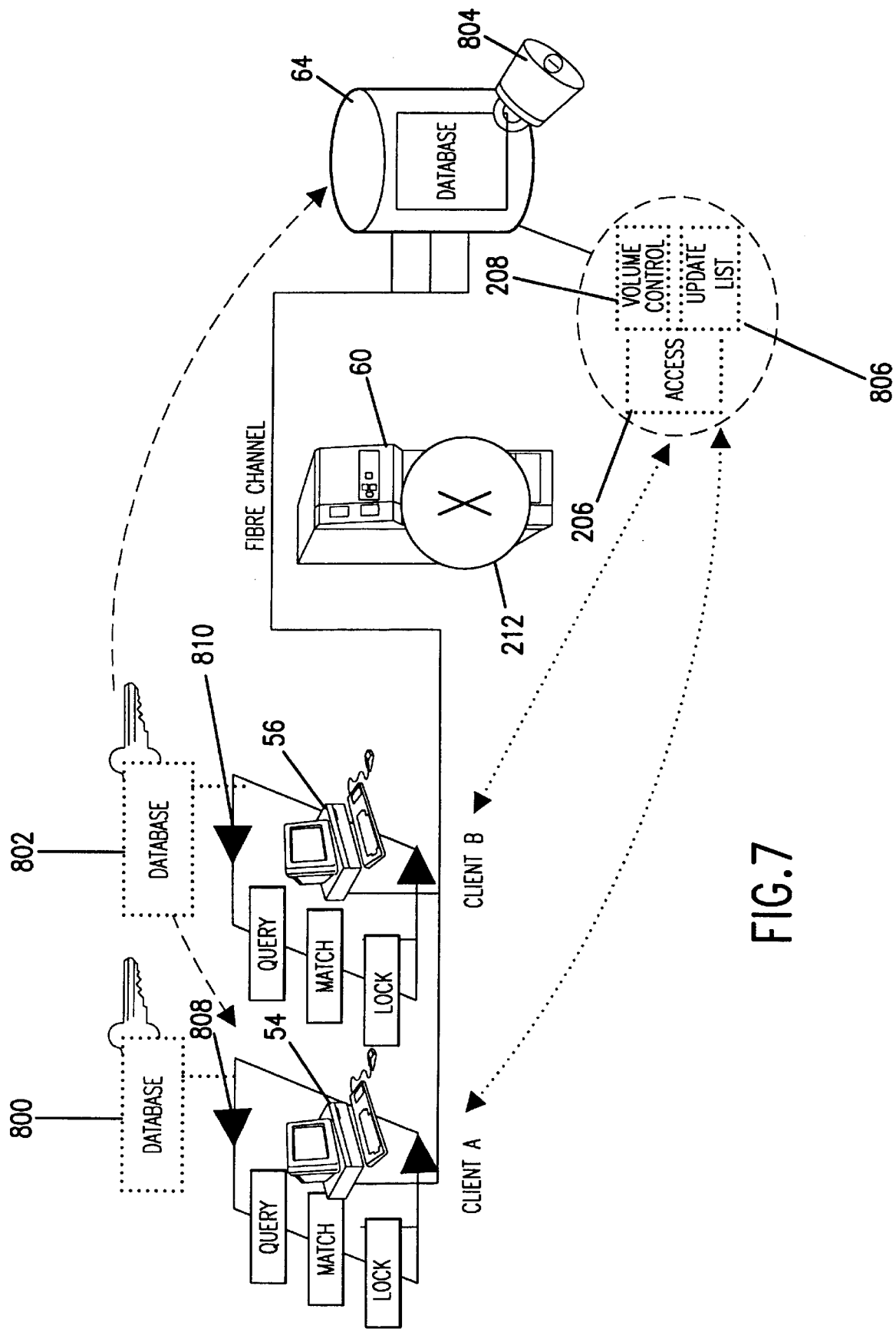

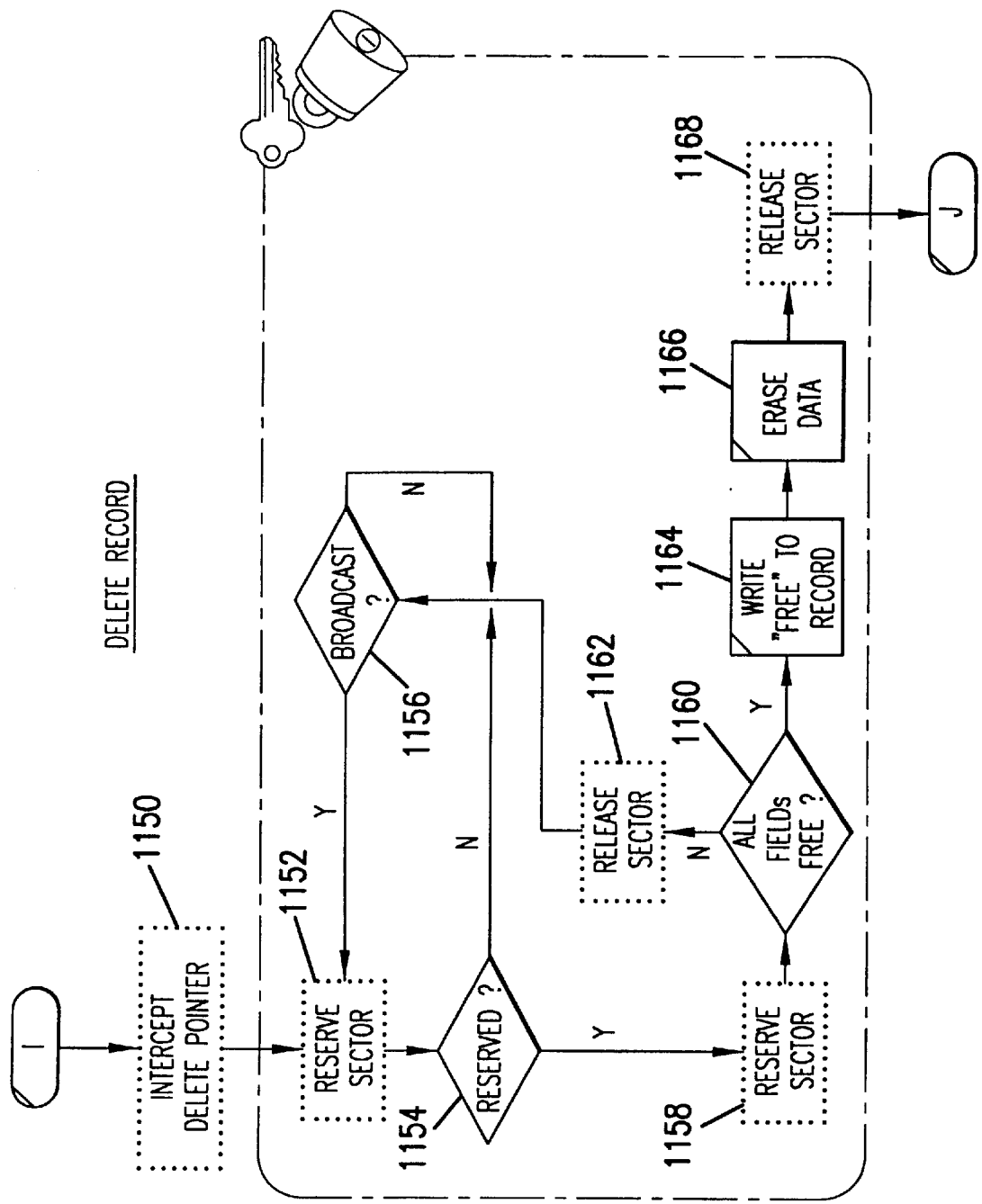

| CLIENT | UTILIZATION | MIPS | WORD | ELEC | CAD | REND | OTHER |
|--------|-------------|------|------|------|-----|------|-------|
| A | 70% | 266 | N/A | 25% | 10% | 25% | 10% |
| B | 30% | 166 | N/A | N/A | 20% | N/A | 10% |
| C | 51% | 266 | 1% | 20% | 10% | 10% | 10% |
| D | 51% | 66 | 1% | 20% | 10% | 10% | 10% |
| E | 0% | 266 | 0% | N/A | 0% | 0% | 0% |

METHOD AND APPARATUS FOR DISTRIBUTED CONTROL OF A SHARED STORAGE VOLUME

CROSS-REFERENCE TO RELATED APPLICATIONS

This application claims the benefit of prior filed copending Provisional Application No. 60/023,218 filed on Aug. 2, 1996, which is incorporated herein by reference in its entirety. The present application is related to copending U.S. patent application Ser. No. 08/905,287, (Attorney Docket No. 16598.703) filed Aug. 1, 1997 entitled "Method and Apparatus for Distributed Control of Multiple Processors" by inventors James J. Wolff and David Lathrop; pending U.S. patent application Ser. No. 08/904,828, (Attorney Docket No. 16598.704) filed Aug. 1, 1997 entitled "Method and Apparatus for Distributed Control of a Database" by inventor James J. Wolff, and pending International Application Serial No. PCT/US97/12843; (Attorney Docket No. 16598.705) filed Aug. 1, 1997, entitled "Method and Apparatus for Allowing Distributed Control of Shared Resources" by inventors James J. Wolff and David Lathrop. Each of the above-cited applications is incorporated herein by reference in its entirety.

BACKGROUND OF THE INVENTION

1. Copyright Authorization

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

2. Field of the Invention

The field of the present invention relates in general to a system for, distributed control of shared resources on a computer network. More particularly the field of the invention relates to distributing control between the multiple hosts in a networked environment over resources such as: storage devices, databases, and projects.

3. Background

It is common in computer systems to share file information with multiple computers through a variety of communication means. Some of the common ways computers send file information to other computers is through the use of modems and networks. Modems are very slow compared to networks. Networks require file servers, and for high speed networks, the speed of the file server becomes a bottleneck. This bottleneck is an impediment to applications needing to share the file information at a speed greater than the file server can keep up with. File servers operate under what is called the client/server paradigm. Under this paradigm a client makes requests of a server that then carries out the requests. In the case of a file server, there may be multiple clients making requests of the file server. The file server receives the requests, queues them, and then services them one at a time. In this way file system consistency is maintained because one entity, the file server, is operating upon the data structures that control the file system where the file information resides in a logical and coherent manner on a storage medium.

Some advancements in network technology have allowed various means to attach storage directly on the network, just as one would attach a printer to the network as a network attached peripheral (NAP). The NAP paradigm allows the removal of speed bottlenecks associated with a file server, but at the price of flexibility. Under the NAP paradigm there is no method to maintain file system consistency. This amounts to limiting the multiple computers to read-only access of the file information thus preventing the modification of the file information. If multiple computers where to modify the file information then the file system would become corrupt because there is no way to maintain the data structures of the file system in a logical and coherent manner on the storage medium because there are multiple entities trying to modify the file system with no means of maintaining the coherency of cached file system data structures. Therefore, these NAP type systems manifest themselves as high speed, read-only, file information sharing systems.

What is needed is an improved system and method for sharing file information. Preferably such a system would remove the file server bottleneck to increase access speed, as is provided by the NAP paradigm, while at the same time maintain the flexibility of the Client/Server paradigm.

It is common in computer systems for calculation intensive processes to take an enormous amount of time to come to completion. In multi-processor systems, the calculation may be expedited by the distribution of the process over the processors present in the computer. This is possible-because the processors that are resident in a single machine share the same physical resources (e.g. PCI, Memory, Disk, and CPU busses) that the processes are based on, in a direct attached manner. The disadvantage to this approach is that it requires very expensive and uncommon hardware equipment, and software has to be written to take advantage of this capability on a particular hardware model. In addition, the processing power is strictly limited to the number of CPU's that can be put in a single computer system. The single machine, multi-processor approach is further limited by the severe bottlenecks that can be created as the physical resources are divided among an increasing number of CPU's.

A second approach is the distribution of the process among multiple processors that are attached through a network system. This approach is attractive since the number of participating processors can be virtually unlimited, and the type of machines used can be inexpensive and common. A number of disadvantages, however, have made this approach extremely inefficient and in many cases, virtually useless. The primary drawback to network process distribution, is that the communication of the information required by each machine to run the process, as well as, the communication of process results can be very slow as it needs to go over a typically slow network connection, through a traditional client/server network (along with the associated bottlenecks of the client/server model). These limitations produce very large processing overheads in cases that require large amounts of data on input and/or output. The efficiency of the distributed process is further degraded by the increased network traffic as more machines are added to the process.

What is needed is an improved system and method for distributed processing over a network. Such a system would remove the bottlenecks and disadvantages associated with current distributed networks, while at the same time maintaining its advantages. Such a system would further allow the distribution of processes to function and be managed in a cross platform environment.

SUMMARY OF THE INVENTION

Distributed Control of a Volume

In a first embodiment of the invention a distributed volume management system is disclosed. In this embodiment multiple clients on a network share control over and responsibility for the coherency of a data storage volume. The system includes: a control table associated with the data storage volume. The control table includes availability indicia for indicating whether the control table is available and identification indicia for indicating ownership of the control table. The system also includes control processes each executed on a client. The control processes request and acquire exclusive ownership of the control table to provide to the clients exclusive write access to the data storage volume.

In an embodiment of the invention, the method for enforcing mutually exclusive write access to a data storage volume among a plurality of clients connected to the data storage volume comprises the acts of:

detecting a write request at a first client;

initiating a request routine on the first client in response to the detecting act, wherein the request routine comprises the acts of:

a) determining on the basis of an ownership indicia in the control table that a second client has write access to the data storage volume; and b) sending, in response to the determining act, a release request to the second client to release write access;

c) responsive to an affirmative notification from the second client i) replacing the ownership indicia in the control table with a first client ownership indicia;

ii) mounting the data storage volume for write access; and acquiring the release request at the second client;

initiating a release routine on the second client in response to the acquiring act, wherein said release routine comprises the acts of:

a) releasing write access to said data storage volume; and b) sending an affirmative notification to the first client of the releasing act.

BRIEF DESCRIPTION OF THE DRAWINGS

These and other features and advantages of the present invention will become more apparent to those skilled in the art from the following detailed description in conjunction with the appended drawings in which:

FIG. 7 is a hardware block diagram in which multiple clients are direct attached to a database on a shared storage volume.

FIGS. 12A–F shows the processes implemented on each client shown on FIG. 7 in order to maintain a coherent database on the shared storage volume.

DESCRIPTION

Figure 1A:
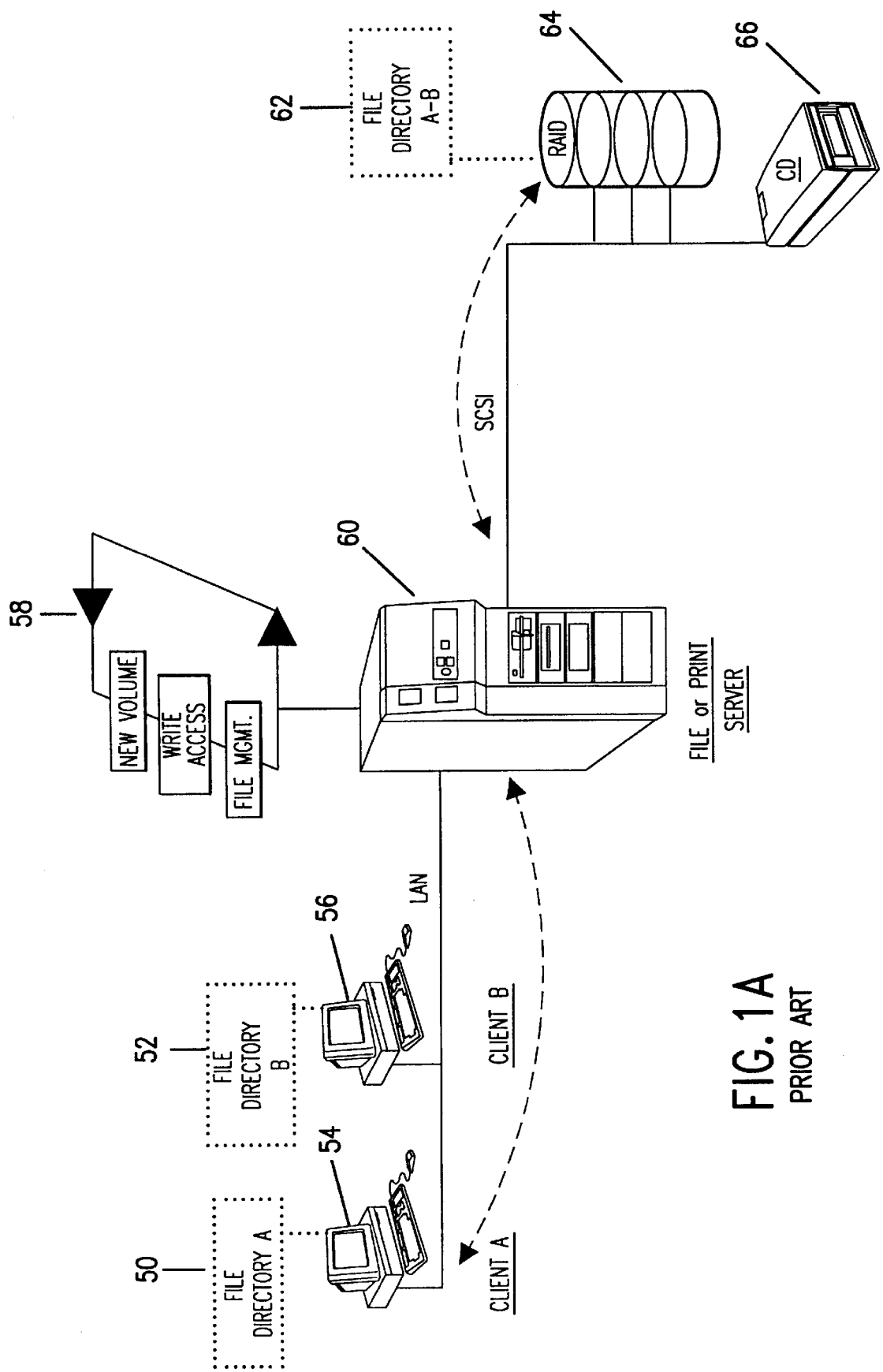
FIG. 1A is a hardware block diagram of a prior art client server network.

FIG. 1A is a hardware block diagram of a prior art client server network. The network comprises clients 54–56 [labeled respectively as clients A–B], server 60 and storage volumes 64 and 66. Storage volume 66 is a compact disk. Storage volume 64 is a redundant array of disks (RAID). Each storage volume has a file directory associated with it. Storage volume 64 contains a file directory 62. Each of clients 54–56 contains respectively cache copies 50–52 of file directory 62.

Computers 54–56 are connected via a local area network (LAN) to server 60. Server 60 is connected to storage volumes 64 and 66 by a small computer system interface (SCSI) connection. In order for clients A–B to connect to either of volumes 64–66 they must first log an access request with server 60. In response, server 60 conducts processes 58 corresponding to volume management write access and file management in order to maintain the coherency of the storage volumes.

Figure 1B:
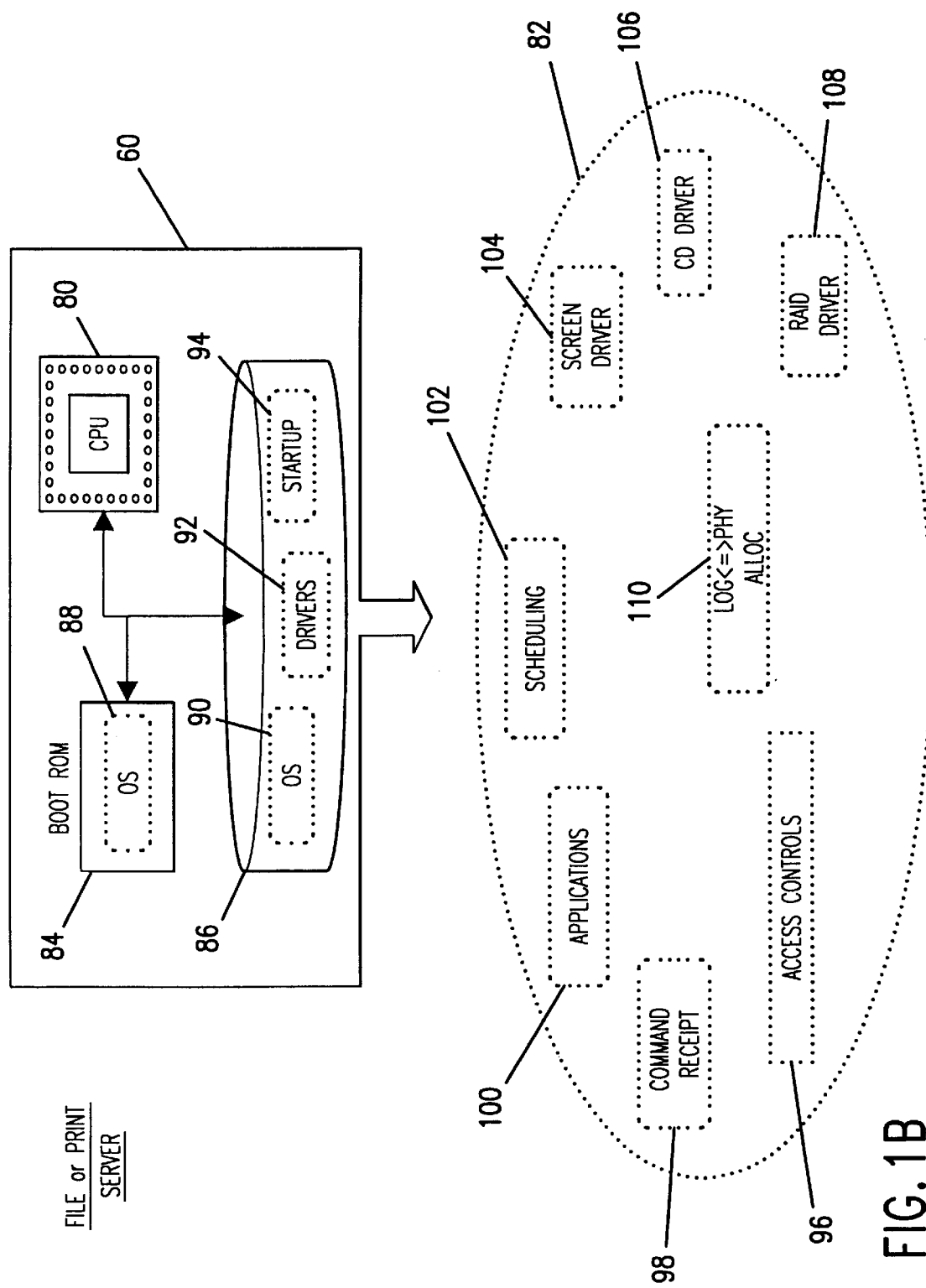
FIG. 1B shows the software modules present on each of the clients shown in FIG. 1A.

FIG. 1B shows the hardware and software modules on server 60 during power on. Server 60 comprises a non-volatile memory 84, a CPU 80 and a local storage device 86. Within non-volatile storage device 84 is a software module identified as the operating system (OS) kernel. Storage device 86 contains the fall OS 90, associated drivers 92, and start-up configuration 94. In operation, at power on, the CPU 80 initiates the code sequence of the operating system kernel 88. The CPU then accesses the main operating system 90 on storage device 86. In the course of operating system initialization, various drivers 92 are initialized. These drivers connect the CPU to peripheral devices such as keyboard, monitor, printer, and storage devices. After the operating system is initialized, a start-up file 94 is implemented which results in one or more applications being enabled.

Shown in software module block 82, are the software modules which are enabled during power on. The module associated with the OS are the access control module 96, the command receipt module 98, the scheduling module 102 and the logical to physical translation and space allocation module 110. The modules are the screen driver 104, the CD driver 106 and the RAID storage driver 108. Finally, application module 100 is enabled by the start-up file 94.

Figure 1C:
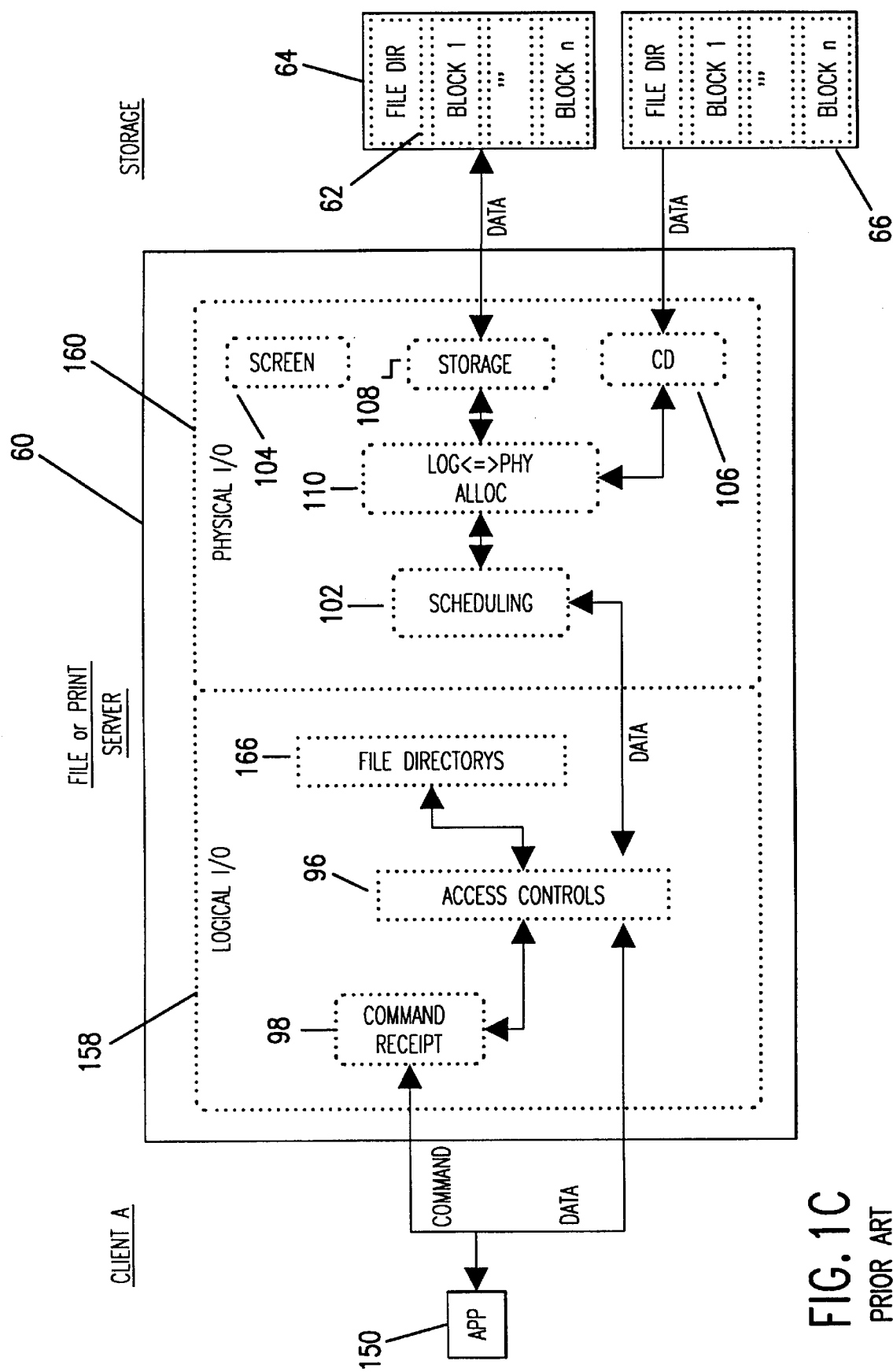
FIG. 1C shows the functional relationship of the modules shown in FIG. 1B.

FIG. 1C is a block diagram showing the functional input output I/O relationship between the software modules shown in FIGS. 1B–C includes a client application 150 communicating with server 60, which in turn communicates with either of storage devices 64 or 66, as shown initially in FIG. 1A. The file server 60 comprises a logical I/O block 158 and physical I/O block 160. Logical I/O block 158 comprises command receipt module 98, access control modules 96 and file directories 166. Physical I/O block 160 comprises scheduling module 102, logical to physical translation and space allocation module 110 and drivers 104–108 associated with respectively the monitor, the CD and the RAID storage device. RAID storage device 64 includes a file directory 62 which contains the directory tree and access rights for all data located on storage device 64.

In operation, a client application 150 communicates via server 60 with either of storage devices 64 and 66. Commands received from client application 150 includes: create, delete, open, close, read, and write. Each of these commands is accompanied by a logical file name. A command is passed from the command receipt module 98 to the access control module 96. The access control modules 96 each interface with a corresponding one of file directories 166. There is generally one file directory for each physical volume. Additionally a volume could exist accross multiple physical storage devices as in software striping. A physical volume can be a single storage device or a partition on a storage device. A file directory will be discussed in greater detail in connection with FIG. 4, and generally includes a directory tree of logical file names, and access privileges associated with each file name. The access control module 96 determines on the basis of access privileges contained in file directories 166 whether or not a specific command should be implemented. For example, if an application command comprises a write request to a file or volume, which is listed as read only, then that request will not be implemented by the access control module. Alternately, when a command is received that the access control module will implement then the data associated with that command is passed directly to the scheduling module 102. The physical I/O block is the primary interface with the environment outside the computer system. The physical I/O deals with blocks of data that are exchanged with disk or tape systems. Thus, it is concerned with the placement of those blocks on the secondary storage device and with the buffering of those blocks in main memory, the scheduling module is concerned with scheduling disk or tape accesses to optimize performance. I/O buffers are assigned and secondary memory is allocated at this level. From the scheduling module 102, a command to, e.g., read data from a specific logical location is passed to logical to physical translation and space allocation module 110. This module is responsible for translating a logical location into a actual physical location on a specific storage device. A file for example, may not be stored on a contiguous portion of a storage device. Instead, it may be stored on fragmented segments. This module then performs the translation of a logical file name to a series of physical segments. This module is also responsible for space allocation. Space allocation in the sense that when a write commands is received the actual physical locations to which the data is written, is determined by module 110. The final software interface between the server 60 and the storage device is via an appropriate device driver. Each device driver handles one device type. The device driver is the only part of the operating system that knows how many registers the disk controller has and what they are used for. It alone knows about sectors, tracks, cylinders, head-arm motion, interleave factors, motor drives, head settling times and all other mechanics of making the storage device work properly. In general terms, the job of a device driver is to accept abstract requests from the device-independent software above it and see to it that the request is executed.

Figure 2A:
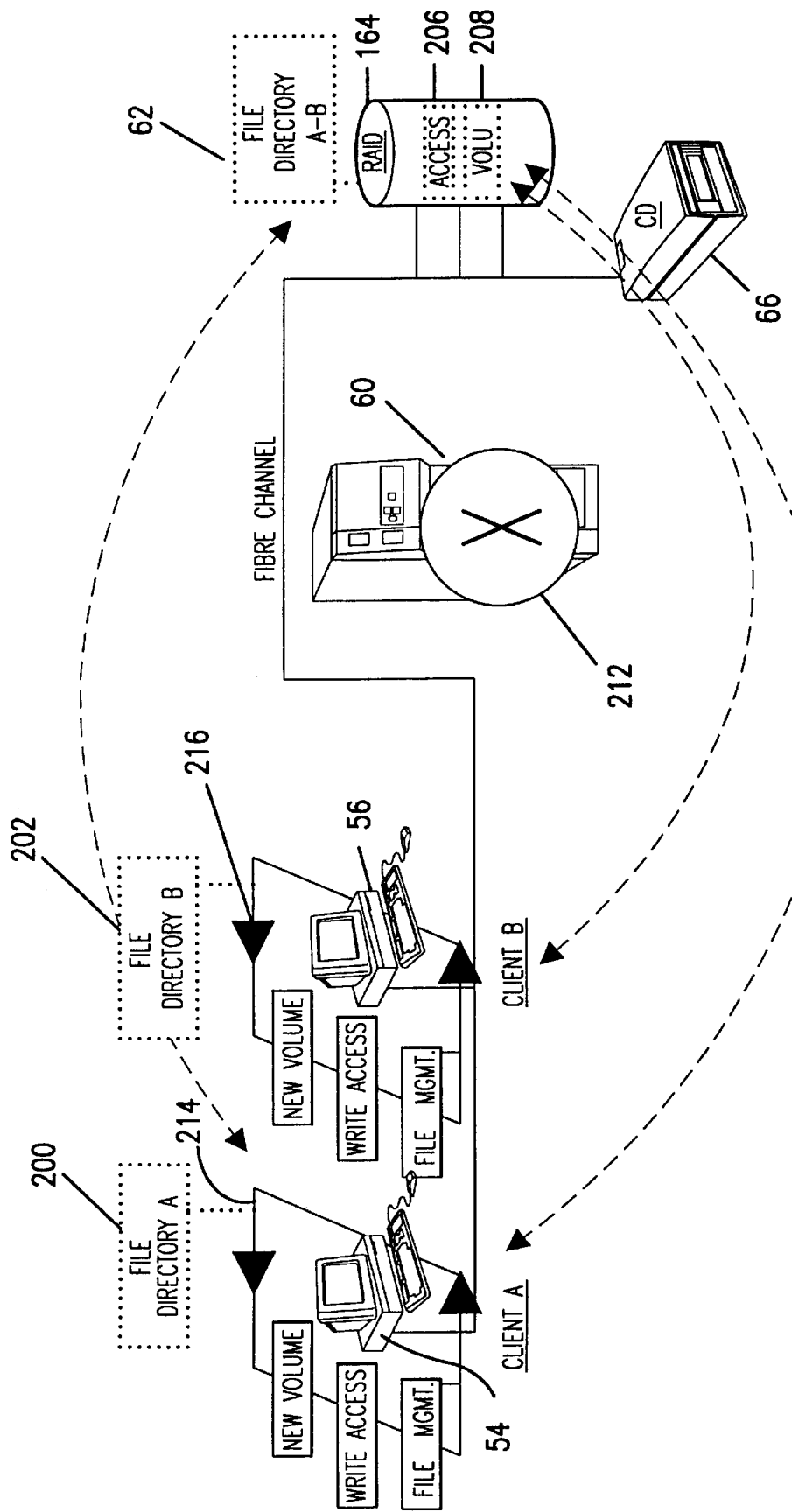
FIG. 2A is a hardware block diagram showing a serverless network connection between multiple clients and shared storage volumes.

FIG. 2A is a hardware block diagram of a preferred embodiment of the current invention in which clients may be directly attached to one or more shared storage volumes, without loss of coherency of the data contained on those volumes. Clients 54–56 storage devices 64–66 and server 60 are shown. RAID storage device 64 includes a file directory 204, an access control table 206 and a volume control table 208. Clients 54–56 each implement processes for distributed management of storage volumes 64–66. Client 54 implements process 214 and client 56 implements process 216. Clients 54–56 include resident copies 200–202 of file directory 62.

Server 60 as indicated by x marker 212 is no longer needed in order to service a request from either client 54 or 56 to the storage volumes 64–66. Instead, clients 54–56 are directly connected to storage volumes 64–66. In a preferred embodiment the connection is based on either the Fibre Channel ANSI Standard X3.230 and/or the SCSI-3 ANSI Standard X3.270, although other media connection systems may be supported. Other embodiments of the present invention may be adapted to support other methods of connecting the storage 802 and hosts 804, such as embodiments utilizing Fast-40 (Utra-SCSI), Serial Storage Architecture (SSA), "FireWire" IEEE Standard P1394, Asynchronous Transfer Mode (ATM), or Scalable Coherent Interface (SCI) IEEE Standard 1596–1992, or, some combination of the above, among other possibilities. The fibre channel architecture provides high speed interface links to both serial communications and storage I/O. These links can transmit data using industry standard interfaces at 10 to 100 times the speed of currently-existing architectures. Fibre channel is part of a very recent revolution in data communications caused by incorporating the serial transmission line, design techniques and technologies into applications and computer architecture that have traditionally used parallel bus-base types of data transport. Transmission lines have superior characteristics for data transport and bus-based designs, allowing signals to be transmitted error-free over greater distances and/or at higher data rates. Fibre channel supports a flexible topology including point-to-point links, packet-switching, and shared-media loop topologies. In a preferred embodiment, a fibre channel network links clients 54–56 to both of storage volumes 64–66. Storage volume 64 is equipped with striping software which reads and writes data concurrently across multiple disks. This striping capability allows the bandwidth of the network medium, i.e., fibre channel to be equaled by the bandwidth of the storage device. This is in spite of the fact that individual disks on the storage device can only provide data at a fraction of the bandwidth of the network connection. By striping a file across multiple disks the bandwidth constraints imposed by the physical limits on the head-arm are overcome by allowing multiple disks to operate in parallel to provide data drives.

In order to maintain coherency of the data written by either of clients A or B to storage device 64, processes 214–216 are implemented on respectively clients 54–56. Each process controls the mounting of new volumes, write access and file management. In order to write data to the storage device 64, a client must first have determined that a write condition exists within both the access control table 206 and the volume control table 208 on the shared storage volume. When that condition is determined to exist, the client may write to the storage volume. When that condition does not exist a write request is denied. In a preferred embodiment, the access control table and volume control table reside on a separate volume on a physical storage device which has both a read and write capability. Thus, the access and volume control tables need not and, in fact, normally would not, reside on the same physical device to which they are controlling access. Instead, each of processes 214 and 216 utilizes the shared access and volume control tables to determine when and under what conditions they may write to any one of a number of volumes to which they may be attached.

Figure 2B:
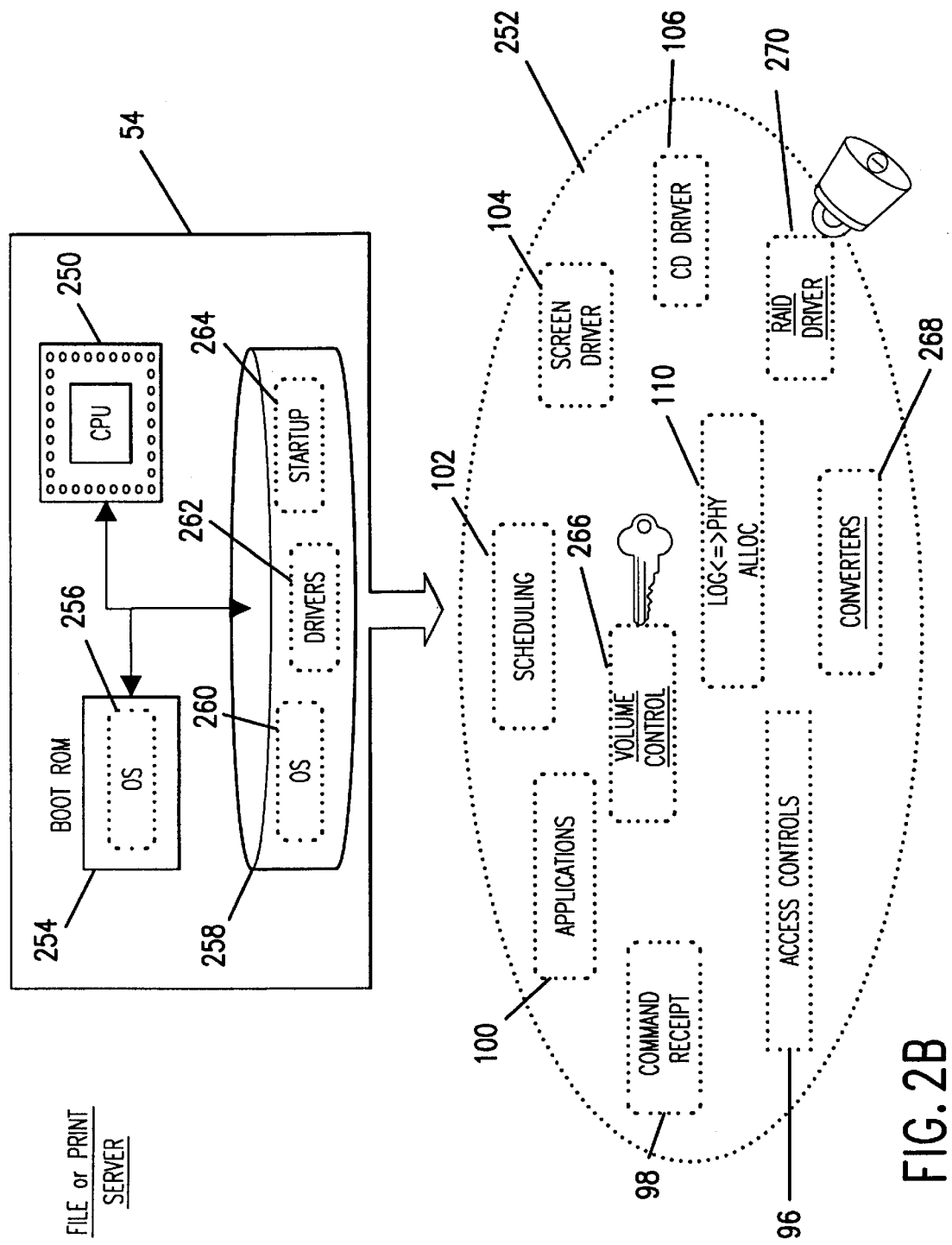
FIG. 2B shows the software modules present on each client of FIG. 2A.

FIG. 2B is a hardware software block diagram of client 54. Client 54 comprises CPU 250 non-volatile memory 254 and local storage device 258. Non-volatile 254 comprises an ISO 256. Nonvolatile memory 258 comprises the main OS 260 device drivers 262 and start-up files 264.

At power on CPU 250 uploads the OS kernel from boot ROM 254 and reads the remaining portion of the operating system 260 from the local storage device 258, e.g., a disk drive. During the latter stages of the operating system enablement, device drivers 262 and start-up file 264 are enabled. Software module block 252 shows the software modules that are enabled during the power on. During the enablement of the operating system 260, the command receipt module 98, the access control modules 96, the scheduling module 102, the logical to physical translation and space allocation module 110, and the converter modules 268 are enabled. During the enablement of the device drivers 262, the screen driver 104, the CD driver 106 and the RAID driver 270 are enabled. During the initiation of the start-up file, the volume control application 266 and a resident application 100 are enabled.

Figure 2C:
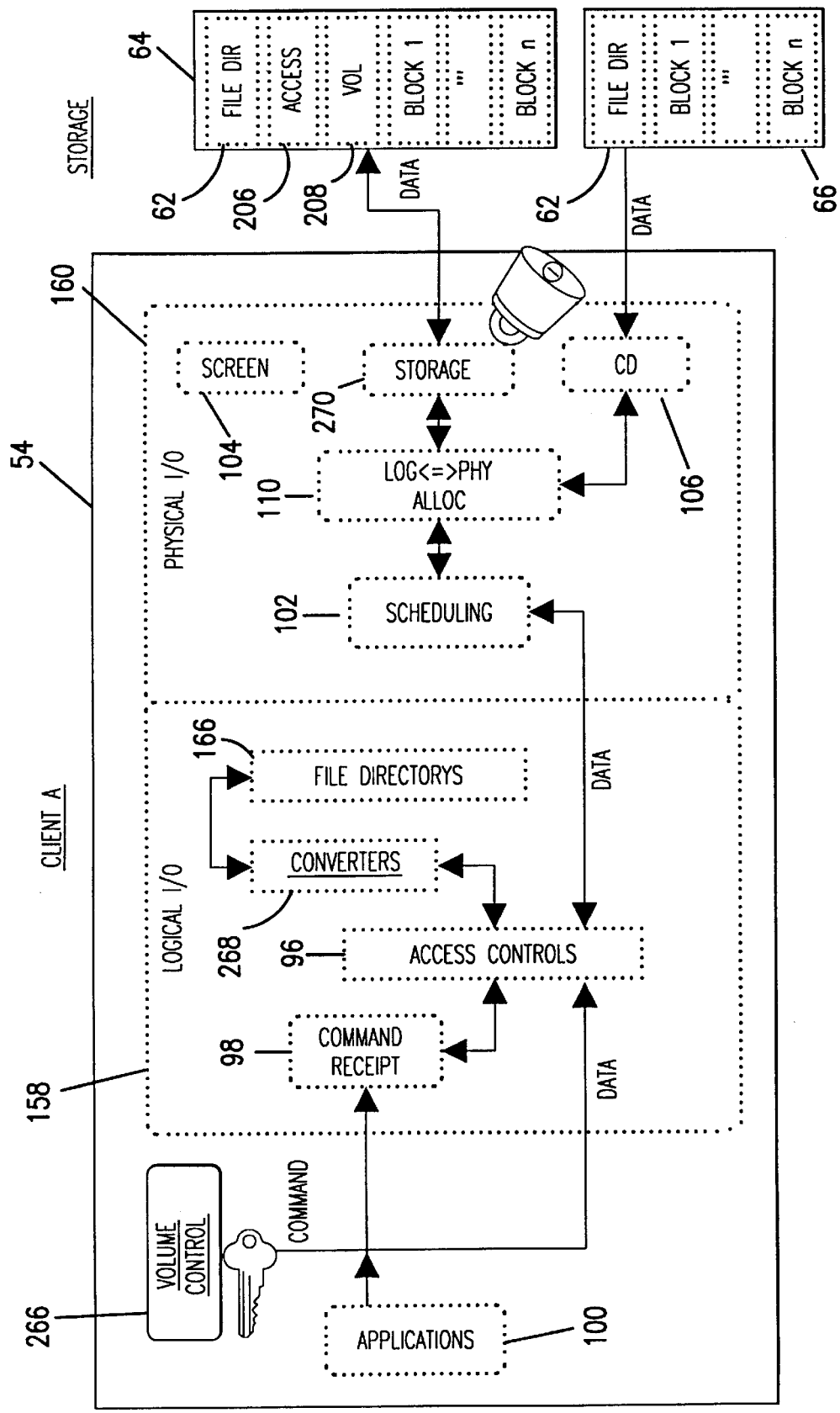
FIG. 2C shows the functional relationship between the software modules shown in FIG. 2A.

FIG. 2C shows the functional relationship between the software modules enabled during power on and shown in FIG. 2B. Client 54 and physical storage devices 64 and 66 are shown. Physical storage device 64 includes a file directory 62, access control table 206, volume control table 208 and blocks 1 through N. Physical storage device 62 includes its own file directory and data blocks 1 through N. Client 54 includes volume control application 266, logical I/O block 158 and physical I/O block 160. Logical I/O block 158 includes command receipt module 98, access control modules 96, file conversion module 268 and file directory 166. Physical block 160 includes scheduling module 102, logical to physical translation and space allocation module 110 and device drivers 104–106 and 270.

In operation, device driver 270 is not fully enabled during the initialization of the operating system. Thus, the physical device 64 does not appear to client 54 to be available, i.e., connected. When volume control 266 is enabled it sends a series of commands to command receipt module 98. These commands result in the discovery of the lock storage driver 270 by the volume control module 266. In the course of this discovery process, the volume control module also discovers the access and volume control tables 206 and 208 on the physical device 64. During this discovery process any other applications other than the volume control application will not have access to the physical storage device 64. When the volume control module 266 has read the access and volume privileges from respectively the access control 206 and volume control 208 tables, it then engages in a series of commands designed to write those access privileges to the file directories 166. For example, if it is determined that the volume control table indicates that client 54 is to have read/write access to physical device 64, then the volume control module will issue a mount R/W command, which when received by the command receipt module will cause the file directory 166 to be updated and to include these privileges. Subsequently, when the file directory 166 is written back to physical device 64 then the file directory 62 resident on the actual physical device 64 will also be updated. Thus, the access and volume privileges are read from the access and volume control tables and written by the volume control module 266 to the cached 166 and physical 62 file directories. This process can be carried out across multiple physical devices on the basis of an access and volume control table which resides in only one of those devices in the preferred embodiment, however, other locations for these tables are possible.

The remaining module which has not yet been discussed in functional terms, is protocol conversion module 268. Protocol conversion module 268 interfaces the access control module 96 to the file directories 166, and maintains a uniform file directory structure across heterogenous operating systems, such as may be present on clients 54 and 56. Client 54 for example, may be running a MacIntosh System 7®, operating system while client 56 may be running Windows NT. The protocol conversion modules 268 on each of these clients enforce a homogenous file directory structure thus enabling cross platform operation of the current invention. The protocol conversion module 268 provide a communication rule conversion and command format conversion to the communication rules and command format of the common API. Thus, directories and files can be stored in a data format across multiple operating systems. The format has specific ASCII characters, conventions for file names and specific conventions which will be discussed in greater detail in connection with FIG. 4 for file directory and access control. When the protocol conversion unit receives a command it calls a processing routine within itself which corresponds to the type of command and this processing routine handles the command.

Figure 3A:
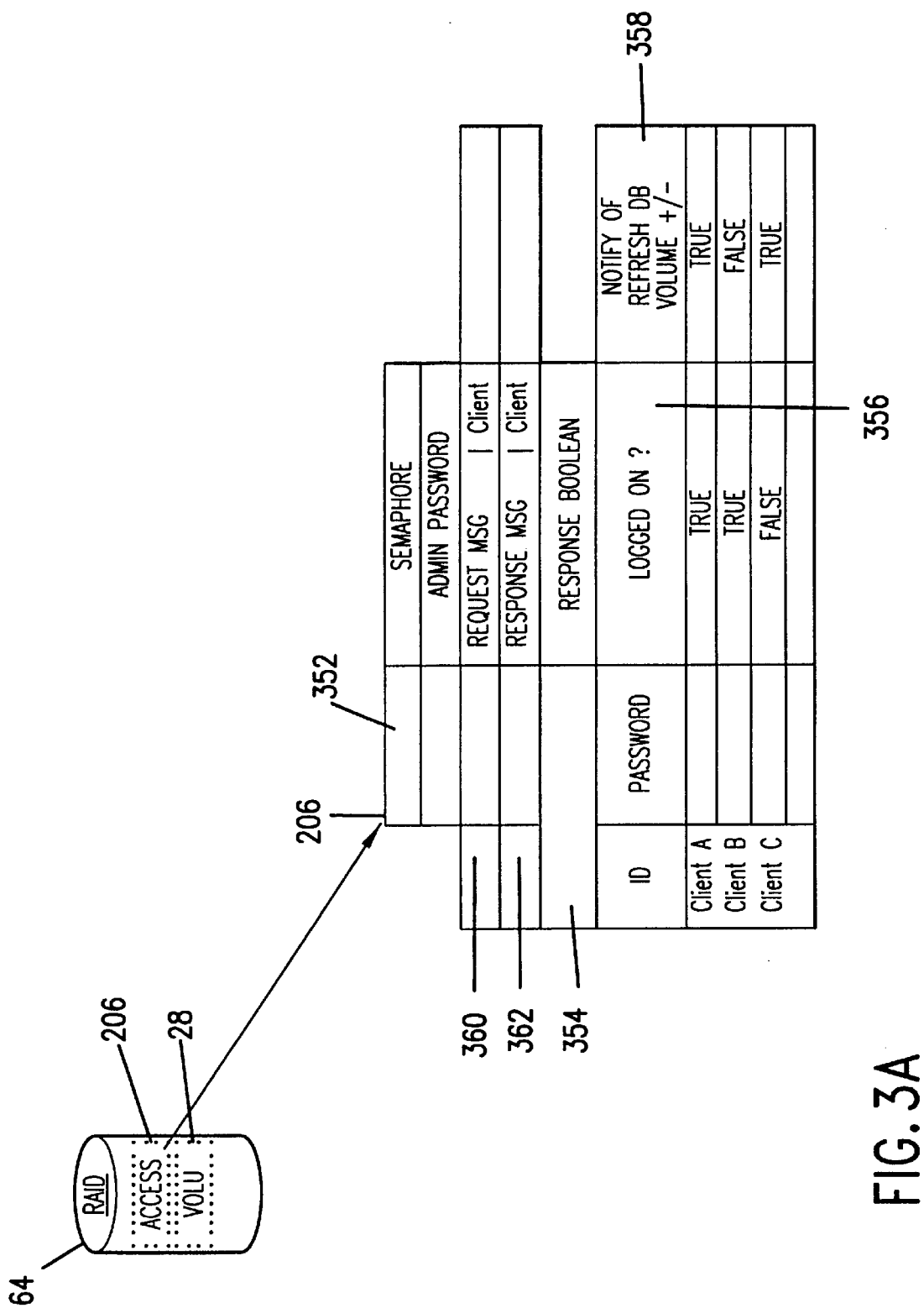
FIG. 3A shows the access control table on the shared storage volume shown in FIG. 2A.

FIG. 3A shows a detailed data structure for the access control table 206 discussed above in connection with FIGS. 2A–C. Logged on fields 356 of the access control table indicate which user processes 214–216 [see FIG. 2A] are logged onto the access control and volume control tables. Until a user is logged onto the access control table any applications on that client will not be able to access any of the physical devices whose device drivers have a lock control similar to device driver 270 [See FIG. 2C]. The access and control table also has refresh notification field 358 associated with each client. A boolean true condition in a field associated with a specific client assures that client will be notified by its resident volume control process, when changes in the access privileges of other users on the system take place. A boolean false has the opposite effect, i.e., no notification will be provided by the volume control process on a client having a boolean false in the refresh notification field of the access control table. The access control table also provide a message passing capability between clients. Field 360 contains a request message. Field 362 and 354 contain respectively, a text based and boolean based response message. Finally, the access control table includes a semaphore field 352. The presence of a semaphore in the semaphore field indicates that one of clients 54 or 56 has seized control of the access and volume control tables 206–208 respectively. A client process which has written a identifier in the semaphore field 352 can alter the privileges associated with each volume and can initiate a change in the write status.

Figure 3B:
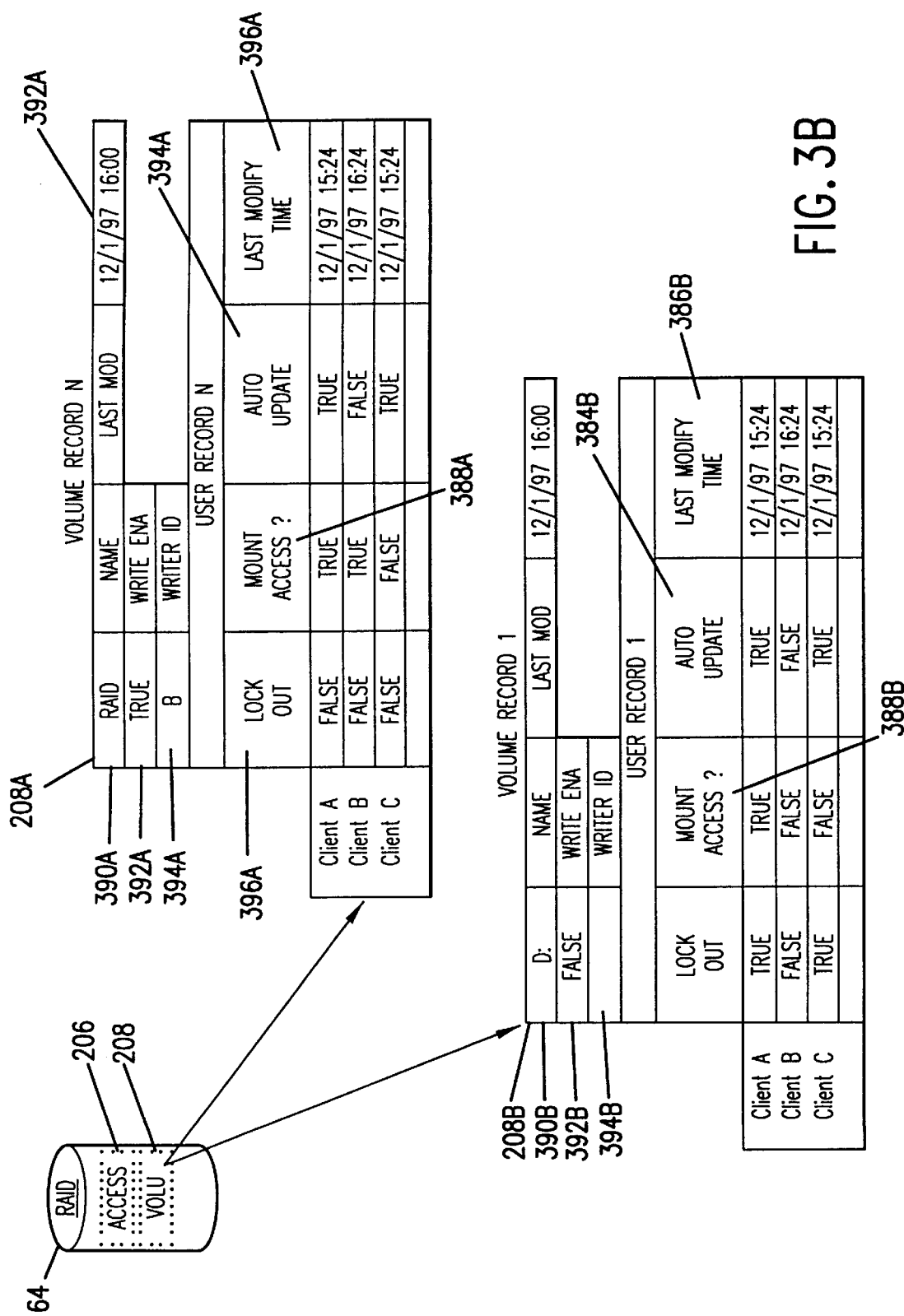
FIG. 3B shows the volume control tables in the shared storage volume shown in FIG. 2A.

FIG. 3B shows the data structures associated with the volume control tables 208. Specifically, tables 208A and 208B are shown. There is one volume control table for each volume, which supports distributed control by multiple writers. The fields within volume control record 208A are all identified with the suffix "A." The fields identified with volume control table 208B all contain a "B" suffix. Field 390 identifies the logical volume associated with a specific volume control table. Field 390A indicates that RAID storage device 64 [see FIG. 2A] is associated with volume control table 208A. Field 390B indicates that the CD-ROM 66 [see FIG. 2A] is associated with volume control table 208B. Field 392 contains a boolean TRUE/FALSE indicating whether or not a specific volume is write enabled. Field 392A indicates that the RAID device 64 [see FIG. 2A] is write enabled. Field 392B indicates that CD-ROM 66 [see FIG. 2A] is not write enabled. Field 394 indicates which client currently has write access to a specific volume. Field 394-A indicates that client 54 [see FIG. 2A] currently has write access to RAID storage device 64. Field 394B indicates that no client has write access to CD-ROM 66 [see FIG. 2A]. Field 388 indicate which clients have mount access privileges for each specific volume. A boolean true indicates that the client can mount the volume. A boolean false indicates the opposite. Field 396 indicates for each client as to the ability to request a change to its current volume settings. A boolean false indicates a client is not locked out from making change requests such as read-only to read-write (or vise versa). A boolean true indicates a client is locked out from making change requests. Field 384 is a boolean true/false indicating wether or not a client with read only privileges will be updated when changes are made to the volume by other clients with respect to a specific volume. Fields 386 are time stamps indicating the last time at which a client received an updated copy of a file directory 62 [See FIG. 2A]. Field 382 is a time stamp indicating the last modification time for a specific volume by any client. By comparing the last modification time field 386 to the volume modification time field 382 the processes 214–216 [see FIG. 2A] can determine when a client with auto update privileges is in need of a file directory refresh.

The following is a listing illustrating the data structures and function calls in another embodiment of the volume and access control tables. The listings depict some of the data structure elements for these tables. The access table comprises a StudioBOSS_DB_Header 14xx and an array of Partition_Volume_Record's 14xx.

Volume DB Header 14xx

The Volume_DB_Header 14xx is stored at the beginning of the Volume Table in a first embodiment of the present invention, although the actual position could vary. A description of each of its fields follows:

Table_Version_Number 14xx
The version number of the table format. Current set to SB_DB_VERSION 14xx. Intended for future compatibility.

Table_Open_Counter 14xx
Keeps track of the number of times the table has ever been opened. Currently used with DEMO copies to determine one of the criteria for expiration of the DEMO version (see SB_DB_OPENS_UNTIL_EXPIRE 14xx).

Table_Write_Lockout_Semaphore 14xx
Set to MAXIMUM_USERS 14xx if table is safe to access. Otherwise, set to the user number who has grabbed the semaphore. If grabbed, the table is not reliable and no changes should be made.

Number_Of_Users 14xx
Total number of users created in the table.

Number Of Volumes 14xx
Total number of volumes in the table.

User_Names[MAXIMUM_USERS 14xx] 14xx
Names of the users in the table in Pascal string format (length byte+characters). NOTE: To find the next name in the list, search the array for the next non-zero length string.

User_Has_Owner[MAXIMUM_USERS 14xx] 14xx
Set TRUE if user valid, FALSE otherwise.

User_Logged_On[MAXIMUM_USERS 14xx] 14xx
Set TRUE if the user is currently logged onto the table, FALSE otherwise.

User_Refresh_DB[MAXIMUM-USERS 14xx] 14xx
Set TRUE if that user needs to be notified of changes made in the table requiring a complete shutdown/restarting of the table file (As when volumes are added or removed with users logged on etc.)

User_Receiving_Request 14xx
User number of the receiving party, otherwise set to MAXIMUM USERS 14xx.

User-Sending-Request 14xx
User number of the sending party, otherwise set to MAXIMUM_USERS 14xx.

Volume_With_Request_Position 14xx
Index from start of file of the volume record involving the request, 0 otherwise.

Request_Response 14xx
Set TRUE of the response was positive and the response_Message is valid.

Sender_Message 14xx
Pascal style string of a message to be sent from the sender to the receiver as part of a request.

Response_Message 14xx
Pascal style string of the message to be sent from the receiver to the sender as part of a request.

DB_Header_Filler[400]
Reserved. Should be set to 0.

Partition Volume Record[MAXIMUM VOLUMES 14xx] 14xx
The Volume_DB_Header 14xx is followed by MAXIMUM_VOLUMES 14xx (200) Partition_Volume_Record's 14xx. A description of each of its fields follows:

Volume_Info 14xx
The field is a Partition_Volume_Header 14xx record and contains information regarding the next volume in the table. See below for a complete description of its fields.

Users [MAXIMUM_USERS 14xx] 14xx
This field is an array of Partition_User_Record 14xx records and contains information regarding the up to MAXIMUM_USERS 14xx (200) users of the volume. See below for a complete description of its fields.

Partition Volume Header 14xx
A description of the Partition_Volume_Header 14xx record fields follows:
Volume_Name 14xx
Pascal string of the volume's name.
Writer_User_Number 14xx
User number who has Write access to the volume. If none, then set to MAXIMUM_USERS 14xx.
Volume_Last_Modified_Time 14xx
Contains the last time the software noticed the volume was changed.
Vol_Header_Filler[100] 14xx
Reserved. Should be set to 0.
Partition User Record 14xx
A description of the Partition_User_Record 14xx record fields follows:
User_Number 14xx
This is the user number in the table. It must be equal to its index into the users[MAXIMUM_USERS 14xx] array.:
Write_Access 14xx
Set TRUE if the user has read/write access, FALSE otherwise.
Mount_Access 14xx
Set TRUE if the user wants the volume mounted for access.
Auto_Update 14xx
Set TRUE if the user wishes to volume to be automatically checked for changes and updated. When FALSE the auto_Update_Check_Seconds 14xx field below is invalid.
Auto_Update_Check_Seconds 14xx
When auto_Update 14xx is TRUE, this represents the number of seconds that must elapse before the volume will be checked for changes again.
Last_Modified_Time 14xx
Contains the last time that the user noticed that the volume was changed.
Reserved[50]
Reserved. Should be set to 0.
Located on each host computer is a preference file that consists of a Preference_Record 14xx. The purpose of this information is to allow each host a unique user number inside the Volume table so that each host can log into to the Volume table and have its own set of parameters configured for each file system.
File_Signature 14xx
This is set to a unique value that indicates the following information is most likely a valid set of data that can be relied upon as a Preference_Record 14xx.
Admin_Expired 14xx
This is a value, set either to TRUE or FALSE, that indicates if this is an expired DEMO copy of the software.
Total_tables 14xx
This value indicates the total number of Volume tables that have been configured and found at a previous search. This is the number that will automatically be expected to be found upon net startup.
SB_Process_Ticks 14xx
This is a time value between times when the Volume File Control software component is invoked to check user events or table changes.
Monitor_DB_Ticks 14xx
This is the time value that must pass before that Volume File Control software component will check for table changes, such as a request for write access from another user.
User_Name 14xx
This is a character string, indicating the name of the user that will be searched for upon Volume table logon from which a user number shall be generated and used for later access.
Admin_Password 14xx
This is a character string, indicating the current password required for access to the administrator functions of the Volume File Control software component for this host.
Volume_Volume_Names[MAXIMUM_Volume] 14xx
This is an array of character strings, indicating the names of the file system where the Volume File Control software component should search for Volume tables.
Pref_Filler[396] 14xx
This is a array of bytes that are a place holder for future expansion.
Ignore_Bad_Mounts 14xx
This is a variable that can be set to TRUE or FALSE that indicates if the user should be informed of errors during mount attempts of file systems that fail.
Lockout_Access_Changes 14xx
This is a variable that can be set to TRUE or FALSE that indicates if the user is allowed to make changes to the Volume table, such as requests to change read/write privileges. This can be set by the administrator if it is determined that a user should not be able to change any settings.
Keep_DB_Volume_Locked 14xx
This is a variable that can be set to TRUE or FALSE and indicates if the Volume File Control software component keeps the file system where the Volume table file is located locked or not. It is preferable that this is set to TRUE, but it is not a requirement.
Keep_DB_Volume_Unmounted 14xx
This is a variable that can be set to TRUE or FALSE and indicates whether the Volume File Control software component should keep the file systems where Volume tables are located unmounted. It is preferable that this is set to TRUE, but it is not a requirement.
A Volume_Node_Record 14xx is a data structure used by the Volume File Control software component in the form of a linked list, one for each file system to be monitored.
Next_Volume_Node 14xx
This is a variable that is a pointer to the next Volume_Node_Record 14xx in the linked list.
Volume_Reference 14xx
This is a data structure that is a reference to the file system and its internal operating system dependent structures. It is used to reference the file system in order to lock/unlock, mount/unmount and find other information such as free space, last modified time etc.
Volume_Check_Timer 14xx
This variable is a timer that, when expired, indicates it is time to check the volume to see if it needs to be refreshed.
Free_Megabytes 14xx
This variable indicates the amount of free space on the file system.
Volume_Record_Position 14xx
This variable is an indication of the position in the Volume table that describes this file system for this host.
User_Record_Position 14xx
This variable is an indication of the position in the Volume table that indicates this user information for this host.
SN_DB_File_Reference 14xx
This variable is a reference data structure used to access the Volume table itself.
Volume_Enabled 14xx
This is a variable, either TRUE or FALSE, that indicates if this file system is enable or disabled. Disabled file systems do not have any of the normal monitoring functions associated with them. This means that diables volumes will not be updated and refreshed if necessary. Normally, volumes are enabled, thus enabling the file system to participate in the system as a normal entity.

Some data structures that are globally useful to the Volume File Control software component are:
SB__Admin__Preferences 14xx
   The Preference__File__Record 14xx for this host.
Head__Volume__Node 14xx
   A pointer to the beginning of the linked list of Volume__Node__Records 14xx used for searching the list from the start.
Tail__Volume__Node 14xx
   A pointer to the end of the linked list of Volume__Node__Records 14xx used for insertion of new records.
Current__Volume__Node 14xx
   A pointer to the current Volume__Node__Record 14xx being monitored.
Current__DB__Header__Ptr 14xx
   A pointer to the current Volume__DB__Header of the table that is mainlining the current file system being monitored, as indicated by current__Volume__Node 14xx
Current__DB__Volume__Header__Ptr 14xx
   A pointer to the current Partition__Volume__Header 14xx beloning to the current file system being monitored.
Current__DB__User__Record__Ptr 14xx
   A pointer to the current Partition__User__Record 14xx belonging to the current file system being monitored.
SB__Process__Timer 14xx
   A timer, that when expired, indicates that is is time to check the next file system.
Monitor__DB__Timer 14xx
   A timer, that when expired, indicates that is sis time to check for any pending table requests.
Administration__Mode 14xx
   A variable, either TRUE or FALSE that indicates when the Volume File Control software component is operating with administrator functions available to the user.
Restart__Volume 14xx
   A variable, either TRUE or FALSE, that indicates if is time to shutdown and restart the system by logging out of all tables, and relogging back in.
Suspend__Operations 14xx
   A variable, either TRUE or FALSE, that indicates if all file system and table monitoring should be suspended.

Figure 4:
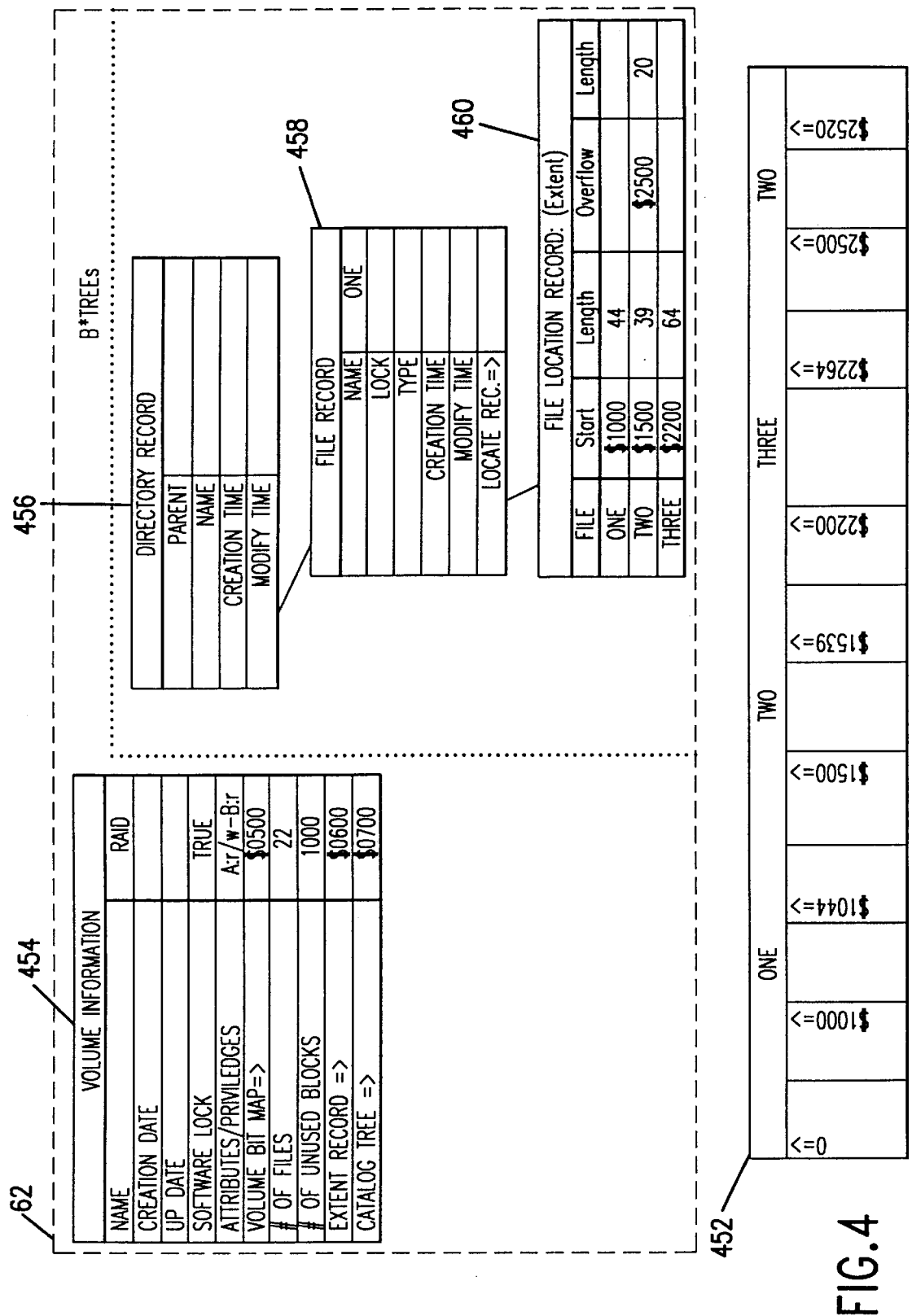
FIG. 4 shows an example of a file directory structure for the shared storage volume shown in FIG. 2A.

FIG. 4 is a detailed data structure diagram for a uniform file directory format which can be implemented on both clients A–B utilizing the current invention. This directory structure can be maintained, not withstanding the operating system on each client by the protocol conversion modules 268 discussed above in FIG. 2C. Shown on FIG. 4 are the file directory 62 and a physical address map 452 for the storage device 64. File directory 62 comprises a volume header 454, a directory record 456, a file record 458 and a file location record (Extent) 460. This directory structure is generally associated with the HFS file directory format associated with the System 8 operating system provided with the MacIntosh® computers. The volume header 454 contains the name of the volume, its creation date, its update date, a software lock, a listing of attributes and privileges, a volume availability bit map, and a number of other parameters broadly defining the physical volume. Associated with the volume record 454 are a plurality of directory records of which record 456 is referenced. Each directory record includes a pointer to a parent directory, a name, a creation time and a modification time. Next are the plurality of file records associated with each directory of which file record 458 is referenced. Each file record contains a name, a type, a lock indicator, a creation and modification time and other file level information. Associated with each file and directory record are a plurality of file location records of which record 460 is referenced. Each file location record includes a pointer to the physical address at which the file starts and an indication as to the length of the file. If a file is stored in noncontiguous segments, then there will be an overflow indicator indicating the physical address of the next portion of the file and the length of that portion. As indicated in the physical address record 452, the file location record addresses and address lengths correspond to the actual physical address locations of the file contents. For example in file location record, 460 file ONE is listed as starting at physical address 1000, having a length of 44 sectors. In the physical address record 452, file ONE begins at a physical memory address 1,000 and extending up to physical address 1044, for a total length of 44 sectors. Each operating system has its own file directory structure differing in numerous aspects from the one disclosed in FIG. 4. In a preferred embodiment of this invention discussed above in FIG. 2C protocol conversion modules 268 associated with each of client processes 214–216 enforce a uniform file directory format notwithstanding the operating system on each client. This assures that there is cross-platform compatibility between any application on either of the clients notwithstanding the OS that may be present on the client. Thus, a client running a MacIntosh System 8® operating system can read or write a file created by another client operating with a Windows NT™ operating system.

FIGS. 5A–E show the processes 214–216 associated with respectively clients A and B as shown in FIG. 2A. Each client implements all the capabilities shown in FIGS. 5A–E.

Figure 5A:
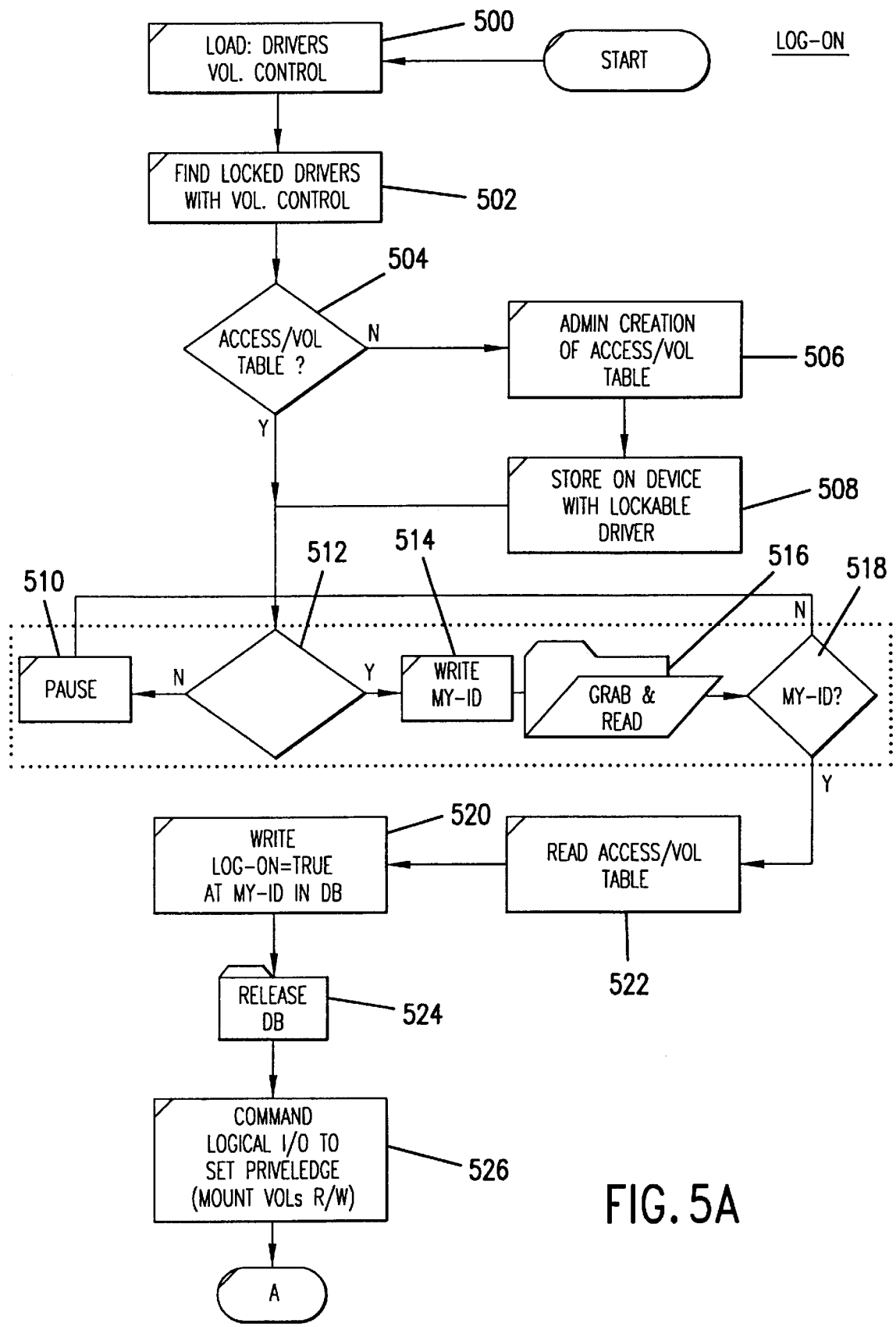
FIGS. 5A–E show the processes for allowing multiple clients to share read and write access to a shared storage volume.

The processes associated with power up and log on are shown in FIG. 5A. Commencing with process 500, the device drivers and the volume control processes are loaded to the client. Control then passes to process 502 in which device drivers which have been customized to include the locking feature are located. In addition, specific device driver connected to the physical volume which contains the volume and access control tables [see FIG. 2C] is identified. Control then passes to decision process 504. In decision process 504, a determination is made as to whether a volume and access control table has been created. If that determination is in the negative, then control passes to process 506 in which the volume control process presents to an administrator a template on which to create an access and volume control table. Control is then passed to process 508 in which the newly created access and volume control tables are stored on a volume with a customized, i.e., lockable driver. Control then passes to decision process 512. Alternately, if in decision process 504, a determination in the affirmative is reached, i.e., that a volume control table does exist, then control passes directly to decision process 512.

In decision process 512, a determination is made as to whether the semaphore field 352 [see FIG. 3A] is empty. In the event this determination is in the negative, control passes to processes 510 for the introduction of a delay after which delay interval control returns to decision process 512. When an affirmative determination is reached in decision process 512, i.e., that the semaphore field 352 of the access control table 206 [see FIG. 2A] is empty then control passes to process 514. In process 514, the client identifier is written to the semaphore field. Control then passes to process 516 in which the client who has seized the access and control table reads the access and control tables. Control then passes to decision process 518. In decision process 518, a determination is made as to whether the client identifier in field 352 is the I.D. of the client running the process. In the event that determination is in the negative, the client has not seized control of the access and volume tables. Therefore, control returns to decision process 512. If in the affirmative, a determination is made in decision process 518 that a client has seized control of the access and control table then control passes to process 522. In process 522, the client reads the access and volume control tables. Control is then passed to process 520. In process 520, the client writes their I.D. in the corresponding log on field 356 [see FIG. 3A] in the access control table 206. Control then passes to process 524. In process 524, the client releases the access and control tables by removing their identifier from the semaphore field 352. Control then passes to processes 526 in which the access control module 266 [see FIG. 2C] sets the access privileges for each physical device in accordance with those privileges indicated in the access and control table for the specific client running this process. As discussed above in FIG. 2C, these privileges are set by the volume control process sending mount volume commands to the command receipt module 98, which are accompanied by either a read or read/write privilege. Control then passes to splice block A.

Figure 5B:
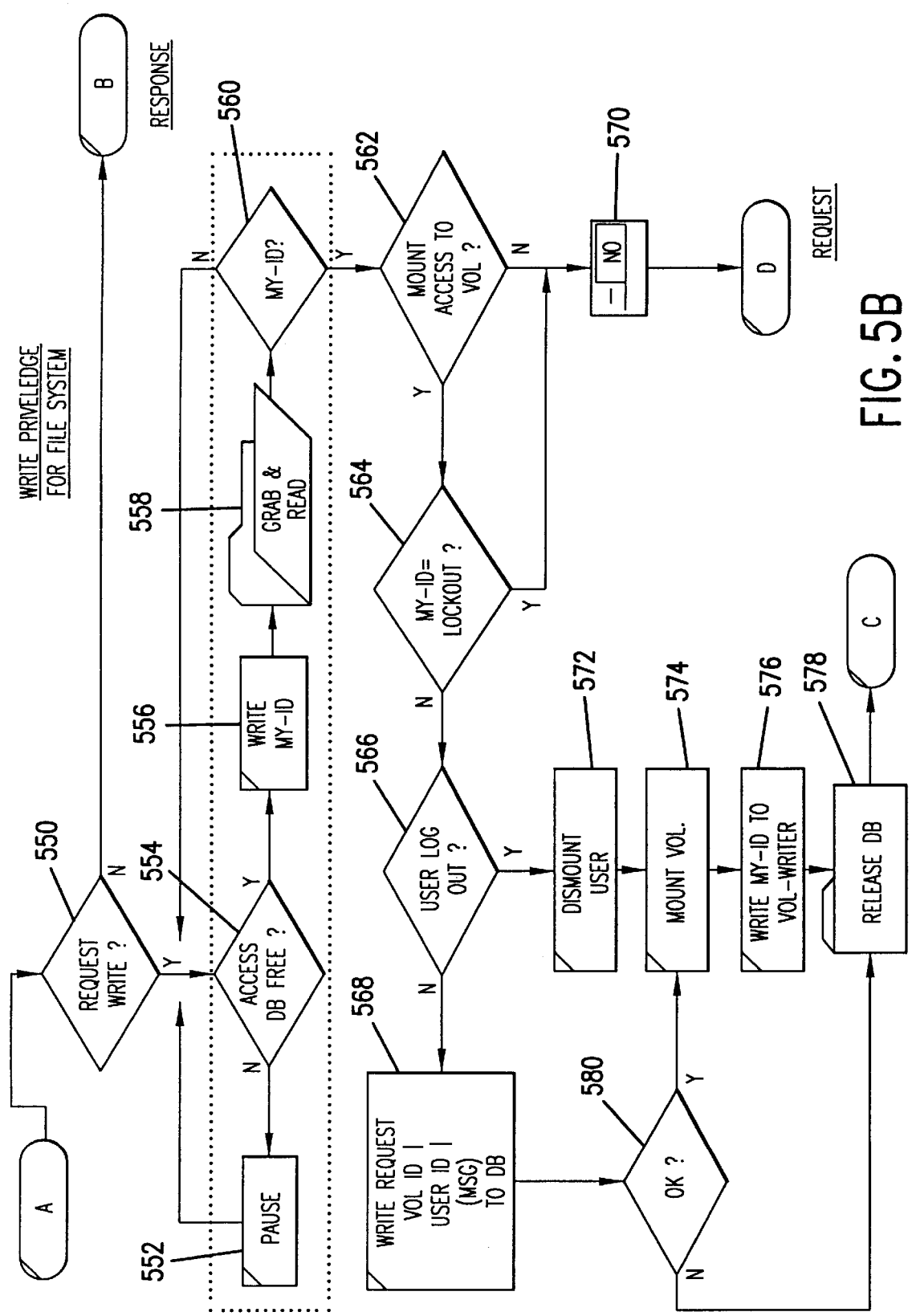

FIG. 5B shows the processes conducted on a client associated with requesting a write privilege for a file system or volume. Beginning at splice block A, control passes to decision process 550. In decision process 550, a determination is made as to whether a write to request has been received by the volume control process 266 [see FIG. 2C]. This write request can be received at any time by the volume control process via a graphical user interface (GUI). The GUI allows a user to select a specific volume with respect to which the user has read privileges and to request that those privileges be altered to write privileges. Alternatively a write request can be made programatically via another process. If a determination in the negative is reached, i.e., that no write to request has been received or generated by the volume control process, then control passes to splice block D. Alternately, if in decision process 550 an affirmative determination is reached, then control is passed to decision process 554. In decision process 554, a determination is made as to whether a semaphore is present in field 352 in the access control table [see FIG. 3A]. In the event this determination is in the negative, control passes to process 552 for the introduction of a pause. Control then returns to decision process 554. When an affirmative determination is reached in decision process 554, control passes to process 556 in which a write command is issued and the identifier for the client running the process is written to field 352. Control is then passed to process 558. In process 558, the value for field 352 is read. Control is then passed to decision process 560. In decision 560, a determination is made as to whether the value in field 352 corresponds to the client I.D. of the client running the process. In the event that determination is in the negative control returns to decision process 554. Alternately, if a determination in the affirmative is reached in decision process 560, then control passes to decision process 562. In decision process 562, a determination is made on the basis of the mount access field 388 [see FIG. 3B] as to whether this particular client can mount the volume to which the write to request is directed. If this determination is in the negative, then control passes to process 570 in which a notification is given that the write to request has been denied. Control then passes to splice block D. Alternately, if in decision process 562 a determination is reached that the volume is mountable with respect to this particular client running the process, then control passes to decision process 564. In decision process 564, a determination is made on the basis of fields 396 [see FIG. 3B] as to whether this client can obtain write access to the specific volume or whether the client is locked out of request access. If a determination is reached in the affirmative, i.e., that the client cannot obtain write access then control passes to process 570 discussed above. Alternately, if a determination in the negative is reached in decision process 564, i.e., that the client is not locked out from obtaining write access to the volume then control passes to decision process 566. In decision process 566 a determination is made on the basis of field 394 [see FIG. 3B] and fields 356 [see FIG. 3A] as to whether the current writer has in fact logged off the network. If that determination is in the affirmative, then control passes to process 572 in which a dismount command is issued for the volume. Control is then passed to process 574 in which a mount volume command is sent by the volume control process 266 [see FIG. 2C] to the command receipt module 98. This causes the volume to be mounted reflecting the most recent changes. Control then passes to process 576 in which field 394 [see FIG. 3B] in the volume control table is updated with the I.D. of the client running the process. Control then passes to process 578 in which the client releases the access and volume control tables by removing their semaphore, i.e., I.D. from the semaphore field 352 [see FIG. 3A] of the volume control table. Control then passes to splice block C.

Alternately, if in decision process 566 a determination is made that the current writer has not logged out then control passes to process 568. In process 568, a write request is written to the request field 360 [see FIG. 3A] of the access control table. This request includes an identifier of the volume to which the write request is directed; the identifier of the client making the request; and a textual message from the requester. The identifier of the volume to which the write request is directed is read from field 394 of the volume record. The text message can be manually entered in a GUI interface provided by volume control process 266 [see FIG. 2]. Control then passes to decision process 580. In decision process 580, the response message and response boolean fields respectively 362 and 354 [see FIG. 3A] are read and the determination is made on the basis of those fields as to whether the write privilege has been relinquished by the current writer. In the event that determination is in the affirmative, control passed to process 574 discussed above. Alternately, if that determination is in the negative, then control passes to process 578 in which the current requestor removes their I.D. from the access control table semaphore field 352 [see FIG. 3A] control then passes to splice block C.

Figure 5C:
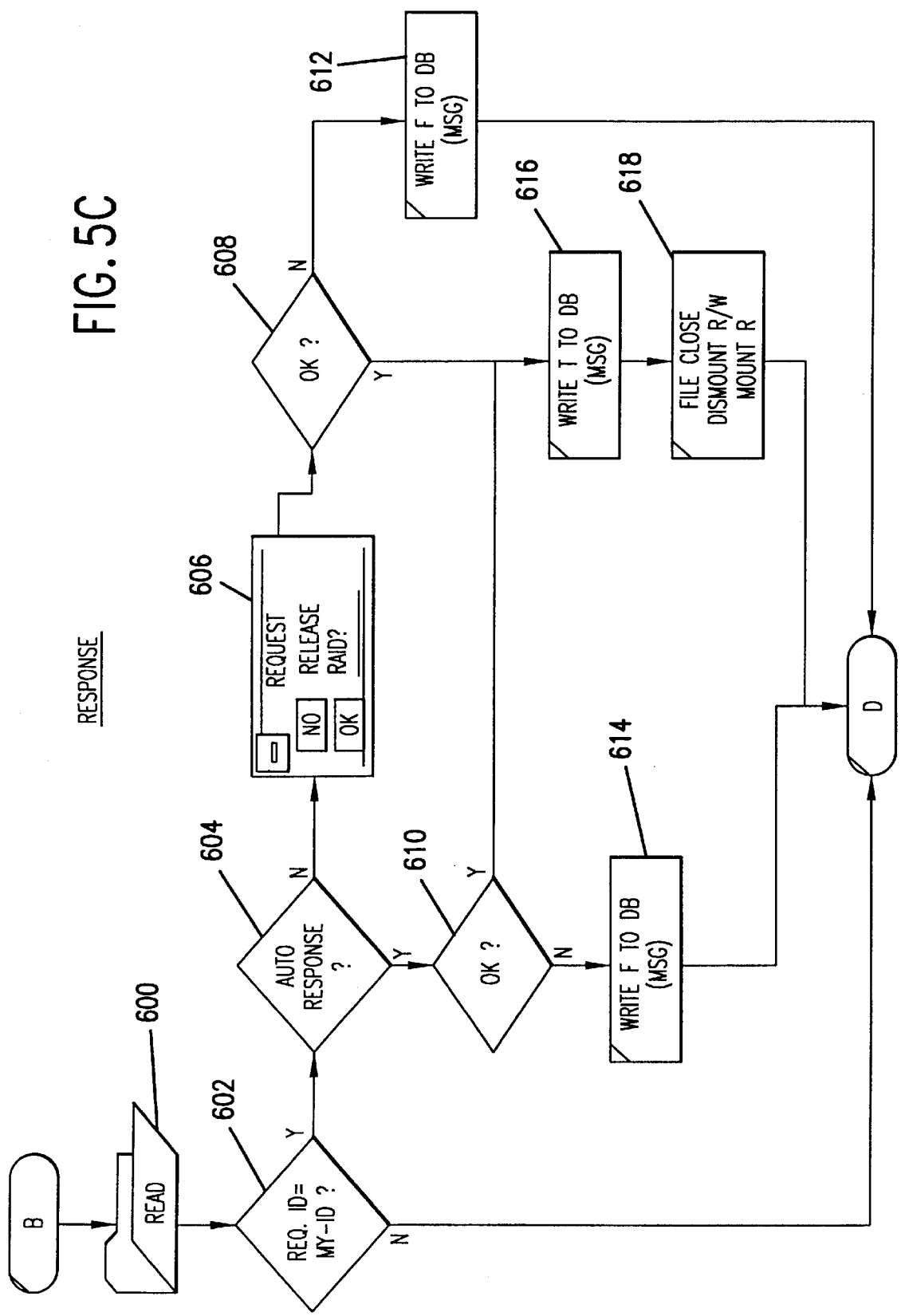

FIG. 5C shows the processes connected with a response to another client requesting write access privilege. Process portion begins at splice block B and control is passed to process 600. In process 600, the access control table and specifically request message field 360 [see FIG. 3A] is read. Control is then passed to decision process 602. In decision process 602, a determination is made as to whether the client I.D. associated with the request corresponds to the I.D. of the client running the process. If a determination in the affirmative is made, i.e., that the client running the process is the client to which the request is directed then control is passed to decision process 604. In decision process 604 a determination is made as to whether an auto response capability has been enabled for this specific client. In a preferred embodiment, this determination could be made on the basis of yet another field entry in the access control table 206 [see FIG. 3A]. There would in this embodiment be a field corresponding to each client in which a boolean true condition would indicate that auto response had been enabled and a boolean false condition would indicate that it had not been enabled. If a determination is made in decision process 604 that auto response has been enabled, then control would pass directly to decision process 610. In decision process 610, a determination would be made on the basis of the current processing on the client as to whether control could be relinquished at this time. If for example, the client was in the middle of conducting a large rendering project, decision in the negative might be reached. In the event that such a determination was reached, control would be passed to process 614. In process 614, the responding client would write a boolean false condition in the response message field 362 [see FIG. 3A] of the access control table. Control would pass to splice block D.

Alternately, if in decision process 602 a determination is made that the client I.D. associated with the request was not the client I.D. running the process, then control would pass directly to splice block D.

Alternately, in decision process 604, if a determination is made that the request was being made of a client running process (process block 602 YES) and further that auto response feature had not been enabled, then control would pass directly to process 606. In process 606 a message prompt is presented by GUI portion of volume control process 266 [see FIG. 2C] to the user. The user would be given the alternative of answering the request yes or no, and including in the response a text based message. This response would be written to the response message and boolean response fields respectively, 362 and 354 [see FIG. 3A]. Control is then passed to decision process 608. In decision process 608 a determination is reached as to whether the user has relinquished write privilege. If that determination is in the affirmative, then control passes to process 616. In decision process 610, if a determination is made that write control cannot be relinquished at the current time, then control is also passed to process 616. In process 616, the boolean true condition is written to the access control table and specifically boolean response field 354 [see FIG. 3A]. This indicates that the client receiving the request and currently having write privileges is about to release those privileges. Control is then passed to process 618. In process 618 any files on the requested volume are closed and the volume is dismounted as to read and write access and remounted in a read only access mode. Control is then passed to splice block D.

Alternately, if in decision process 608 a determination is made that the user has chosen not to relinquish write access privilege for the requested volume then control passes to process 612. In process 612 a boolean false condition is written to the access control table and specifically boolean response field 354 thereof [see FIG. 3A]. Control is then passed to splice block D.

Figure 5D:
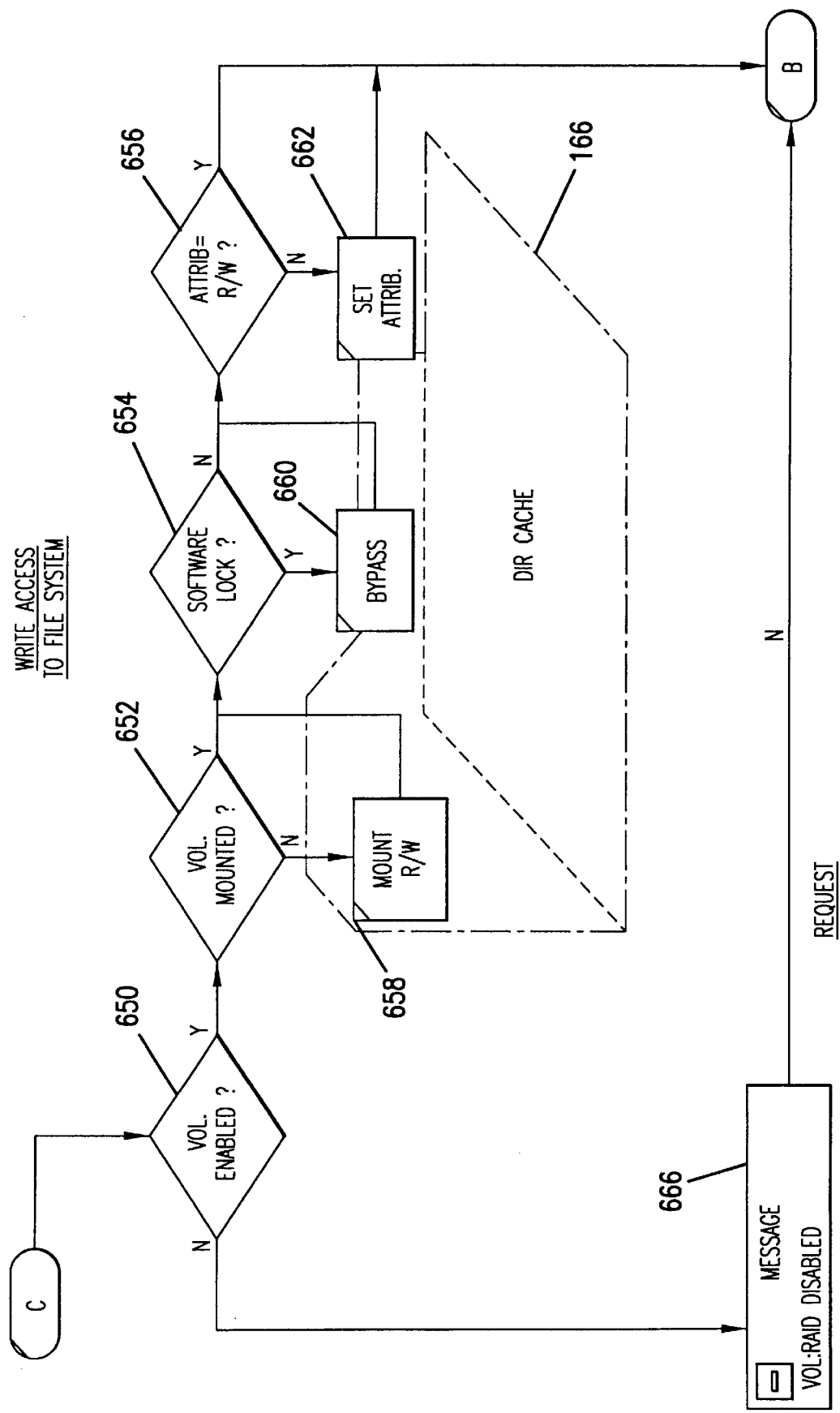

FIG. 5D shows the portion of the processes connected with converting a write privilege into actual write access to a file system. Process portion begins at splice block C where control is passed to decision process 650. In decision process 650 a determination is made on the basis of field 392 in the volume control table [see FIG. 3B] as to whether the volume to which the write to request is directed is in fact enabled. If this determination is in the negative, then control is passed to process 666 in which a message is delivered to the user by the GUI interface portion of volume control process 266 [see FIG. 2C] indicating that the volume is disabled and write access cannot be provided. Control is then passed to splice block B. Alternately, if in decision process 650 an affirmative determination is reached, i.e., that the volume to which the write to request is directed is in fact enabled, then control passes to decision process 652. In decision process 652, a determination is made as to whether the volume is mounted for the client running the process. If that determination is in the negative, then control is passed to process 658 in which the volume control process 266 [see FIG. 2C] sends a mount command with read write privileges to the command receipt module 98 [see FIG. 2C]. This results in the volume being mounted with read write privileges. Control is then passed to decision block 654. Alternately, if in decision process 652, an affirmative determination is reached, i.e., that the volume is mounted with either read or read/write privilege then control is also passed to decision process 654. In decision process 654, a determination is made as to whether a file directory level a software lock bit is enabled as to this specific volume and whether that software lock bit precludes access to the volume. In the event that determination is in the affirmative, then control is passed to process 660. In process 660 the software lock and file directory is either bypassed or disabled. In a preferred embodiment, it is preferable to bypass the software lock. This has the benefit of preventing clients on the network which do not have the volume control process form inadvertently accessing the controlled volume. Control is then passed to decision process 656. Alternately, if in decision process 654 determination is reached either that no software lock exists at the file directory level or that the software lock at the file directory level can be bypassed by the commands of the volume control process 266, then control is passed directly to decision process 656.

In decision process 656, a determination is made as to whether the volume is currently mounted with read and write privileges. In the event that the determination is in the negative, control is passed to process 662 in which the volume control process 266 sends a volume dismount followed by a volume mount R/W for the requested volume to the command receipt module 98 [see FIG. 2C]. This has the effect of remounting the volume with read write privileges as to this client. Control is then passed to splice block D. Alternately, if in decision process 656 a determination in the affirmative is reached, i.e., that a volume is mounted and mounted with read write privileges, then control passes directly to splice block B. The changes in the file directory brought about by the processes of FIG. 5D are first evidenced in the cached copy 166 of the file directory corresponding to the volume to which write access is provided [see FIG. 2C]. The cached copy updates are then flushed back or written back to the file directory on the physical device 64 which results in a coherent set of file directories in which the new access privileges are evidenced.

Figure 5E:
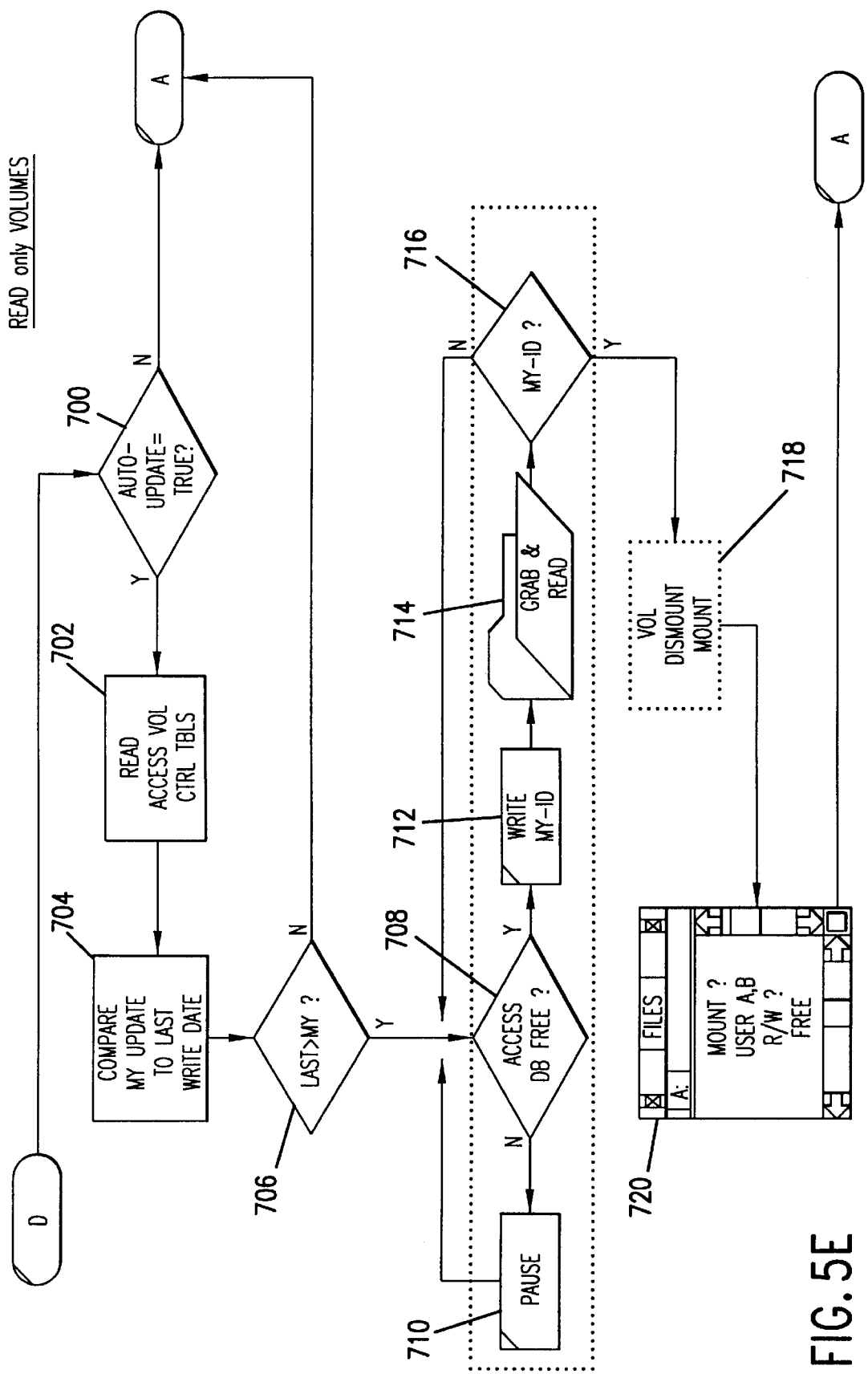

FIG. 5E includes that portion of the processes associated with read only volumes. A client mounted in a read only state to a volume will not be updated as to changes in the file directory that might take place with respect to that volume, i.e., when writes are conducted to that volume to other clients on the system. For those clients, therefore, which want auto updating capability, the processes of FIG. 5E provide that capability. The processes begin at splice block D where control passes to decision block 700. In decision block 700, a determination is made on the basis of fields 384 [see FIG. 3B] of the volume control table as to whether any of the volumes to which the client is currently connected in a read only state, are indicated for auto updating. As to each of those volumes, the last modify time field 386 [see FIG. 3B] for this particular client is read in process 702 and compared with field 382 [see FIG. 3B].

The purpose of this process is as follows.

Normally a client with read only priviledges to a volume, will not refresh their local, cached, copy of the file directory for the volume. As a result the copy can become stale, i.e. either showing directories/files that no longer exist, or not showing directories/files that do exist. It is therefore important that clients with read only access be able to have the option of having their cached directory copies periodically refreshed when other clients make changes to the volume. This refresh and update option is provided by field 384[see FIG. 3B]. The determination as to whether a refresh/update is needed is made in process 704–706 to which control is next passed. In process 704, a comparison is conducted between the time stamps for the last volume change, i.e. field 382, and the last time the client conducted a dismount and mount in order to get a fresh copy of the file directory, i.e. field 386. In decision process 706, a determination is made as to whether the clients cached directory copy is stale. In the event this determination is in the negative, the client contains the most recent copy of the file directory resident on the volume. Control therefore passes to splice block A since no updating is necessary. Alternately, if in decision process 706 an affirmative determination is made, i.e., that the cached file directory 166 [see FIG. 2C] is stale, then control is passed to decision process 708. In decision process 708, a determination is made as to whether the access control database semaphore field 352 [see FIG. 3A] is empty. In the event this determination is the negative control is then passed to process 710. In process 710, a pause is introduced after which control returns to decision process 708. Alternately, if in decision process 708 a determination is made that the semaphore field 352 is available, then control is passed to process 712 in which the client I.D. is written to the semaphore field in the access control table 206 [see FIG. 3A]. Control then passes to process 714 in which the semaphore field portion of the access control table is read and control is then passed to decision process 716. In decision process 716, a determination is made as to whether the client I.D. present in the semaphore field is identical to the I.D. of the client conducting this process. If that determination is in the negative, then the client has not seized control of the access control table and processing returns to decision process 708. Alternately, if a determination in the affirmative is reached, i.e., that the client has seized control of the access control table, then control passes to process 718. In process 718, a volume dismount command followed by a mount with read access only command is sent by the volume control process 266 [see FIG. 2C] to the command receipt module 98. This results in an updated copy of the file directory 166 being displayed in process 720 to the user. The user display may include information as to all volumes and the status of all clients with respect to those volumes; i.e. mount/dismount, read only, read/write, locked/unlocked. Control then passes to splice block A.

DISTRIBUTED DATABASE

Figure 6:
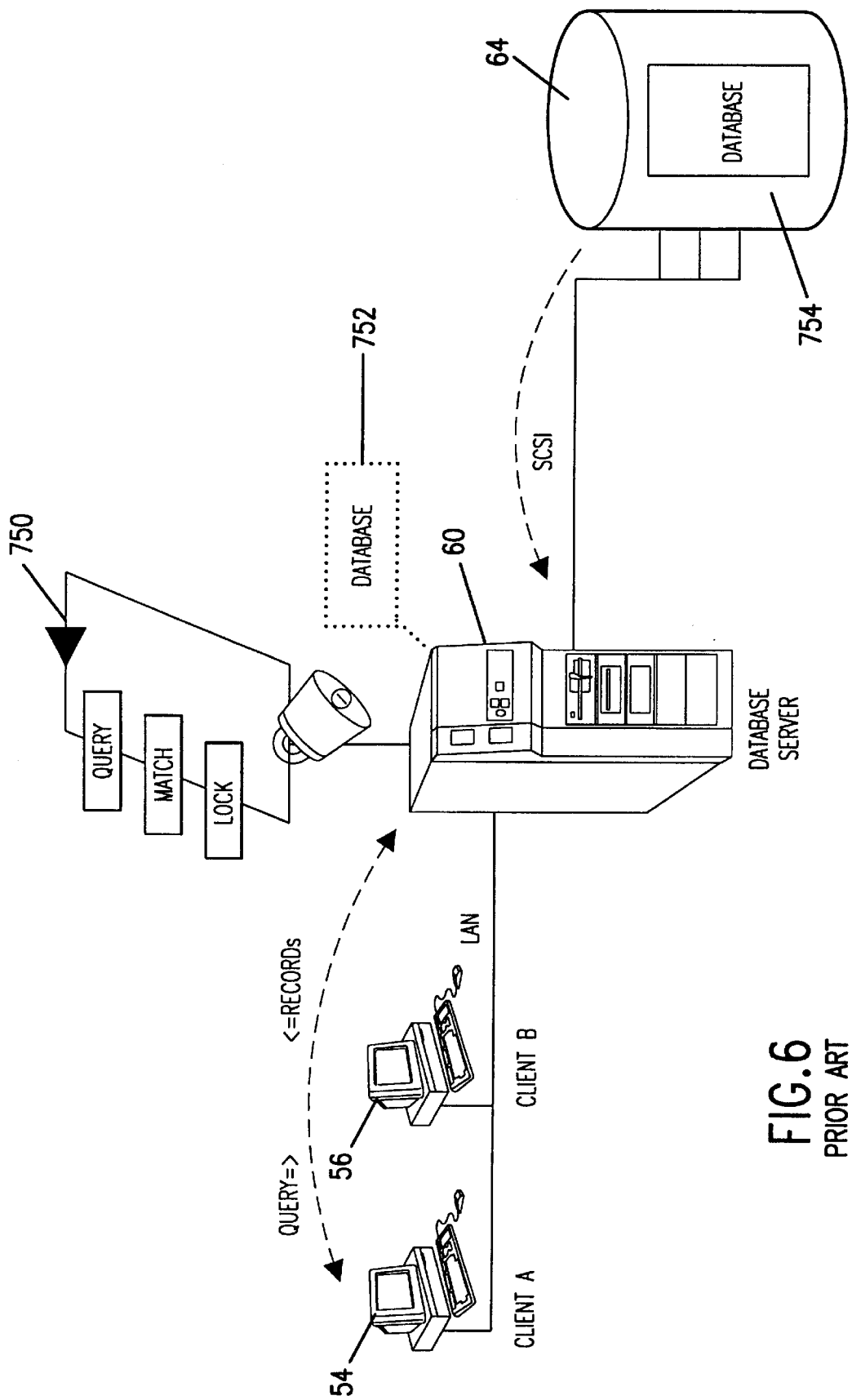
FIG. 6 is a hardware block diagram of a prior art data base server connected to a client network.

FIG. 6 shows a prior art client database server configuration. The hardware components include clients 54–56, server 60 and storage device 64. A database 754 of multiple records, each with a plurality of fields, is stored on storage device 64, which is connected to server 60 by a SCSI connection. Server 60 is connected via a LAN to both clients 54 and 56. Either of clients 54 or 56 launch a query and in response to that query, server 60 implements database functions 750. Then server 60 obtains a copy 752 of the database stored on the physical device 64 and sorts through the records to find those which match the client query. Then the server provides only those records matching the query to the client. This prior art architecture has the benefit of leaving the massive job of sorting and searching the database to the high speed server and allowing less expensive client workstations to engage in the querying process.

FIG. 7 shows another embodiment of the current invention, in which a shared resource, i.e., a database is subject to distributed management by any one of the clients to which it is directly attached. This architecture has the benefit of not requiring a server intermediate the physical device on which the database is stored and the clients which are accessing that database. This architecture has the disadvantage of requiring each client to implement a complete database engine. Nevertheless, in certain database applications where the database comprises a series of fields, each with a pointer to a voluminous image, animation or audio file, the current invention can be used to advantage. In this instance, processing time on either of the clients more closely correlates with the image transfer process than it does with the actual query and sorting process conducted with finding the pointer to the image audio file or animation to be transferred. Under these conditions it is advantageous not to have a server acting as a bottleneck. Also, a modification to this embodiment would be to have multiple traditional servers (with their LAN attached clients) all be directly connected to the shared storage which would allow for higher data availability because all the data would be stored in a single location accessible by all servers (and therefore by all clients).

The components of FIG. 7 include clients 54–56 labeled as clients A–B respectively, and server 60 and storage device 64. Database 804 is resident on the physical storage device 64 and includes additional fields suitable for the implementation of this embodiment of the invention. These additional fields will be described in detail in the following FIGS. 9A–B. Storage device 64 is direct connected to each of clients A–B. The network connection can for example be fibre channel as described and discussed in FIG. 2A. This type of network provides a very high bandwidth communication path between storage device 64 and either of the clients. This allows the rapid transfer of bitmapped images, animation or sound clips without the impediment of a server, which as been eliminated as indicated by delete mark 212. Clients 54–56 each contain a cache copy of the database sorting indices. Sorting indices 800 are associated with client 54 while sorting indices 802 are associated with client 56. These indices are periodically refreshed from the main indices stored on the actual physical device 64. Each of clients 54–56 implements respectively enhanced database processes 808–810. In addition to the normal database functions of query, matching and locking, these processes also include record locking, record update and volume control functions which will be discussed in greater detail. Coherency of database access to individual records and fields within a record is maintained by virtue of the interaction of client resident processes 808–810 with an access control table 206, a volume control table 208 and an update list 806, all of which are resident on a volume within physical device 64, which volume is read/write accessible by all clients.

Figure 8A:
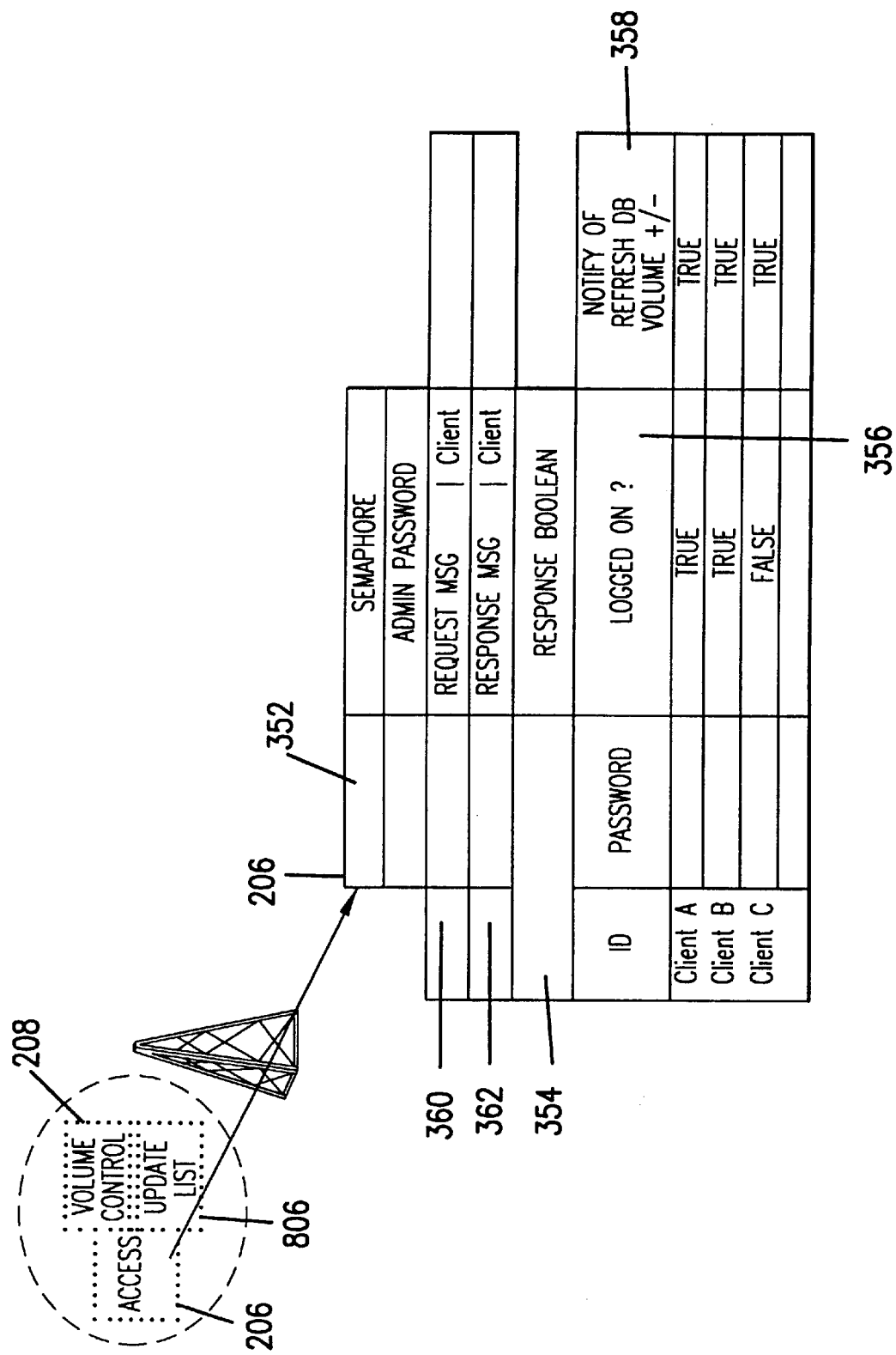
FIG. 8A shows the access control table on the shared volume of FIG. 7.

FIG. 8A shows the detailed data structure for the access control table 206. The access control table is identical to that described and discussed in FIG. 3A. This access control table will be utilized in the processes discussed in the following FIG. 12F.

Figure 8B:
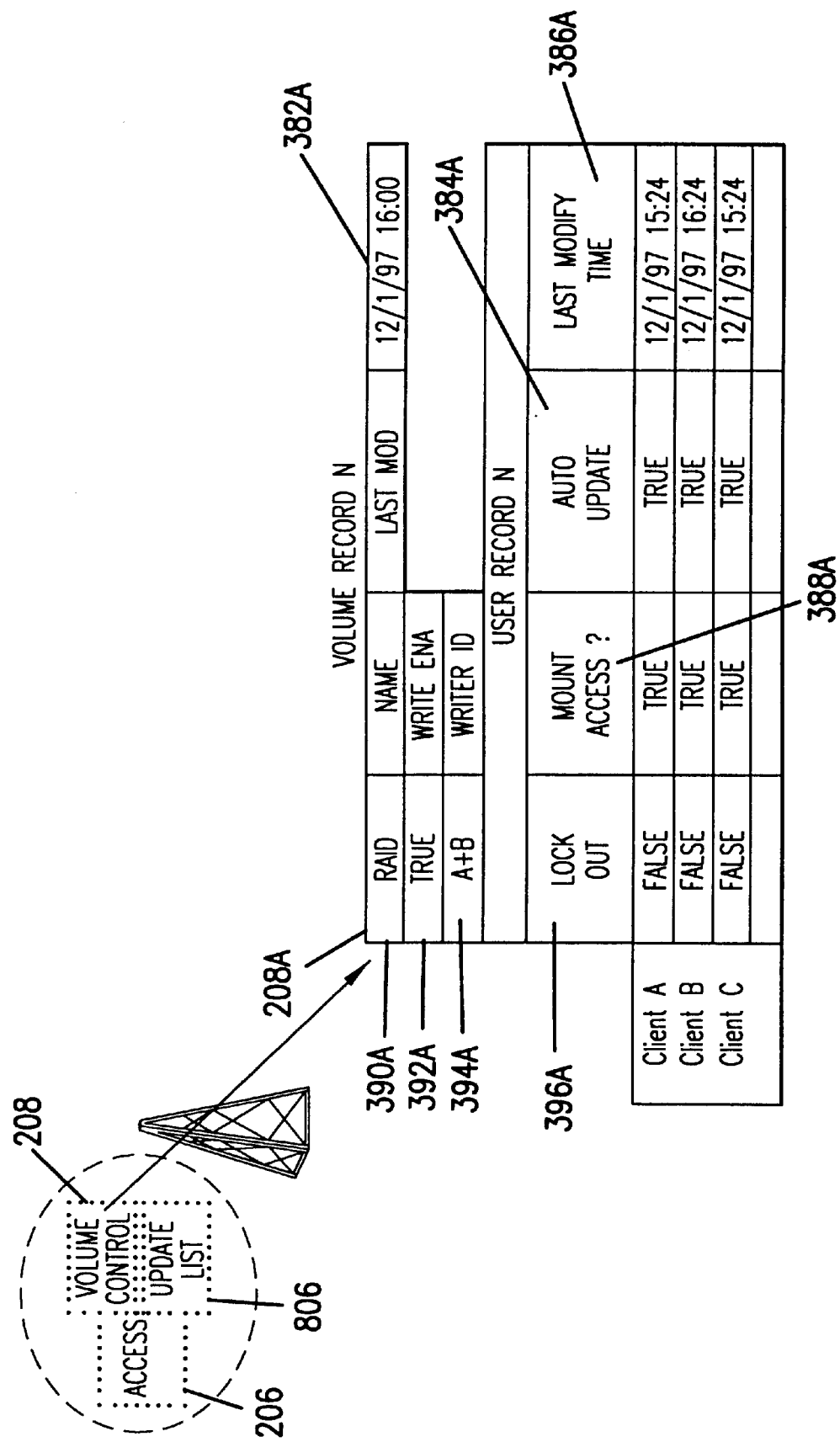
FIG. 8B shows the volume control tables on the shared volume shown in FIG. 7.

FIG. 8B shows the detailed data structure for the volume control table associated with read volume 64 on which the database 804 [see FIG. 7] is stored. Note that in the lock out fields 396A each of clients 54 and 56 is indicated as Boolean false, meaning that they both have write privileges with respect to that volume. Additionally, both clients A and B are identified in field 394A as having concurrent write privilege.

Figure 8C:
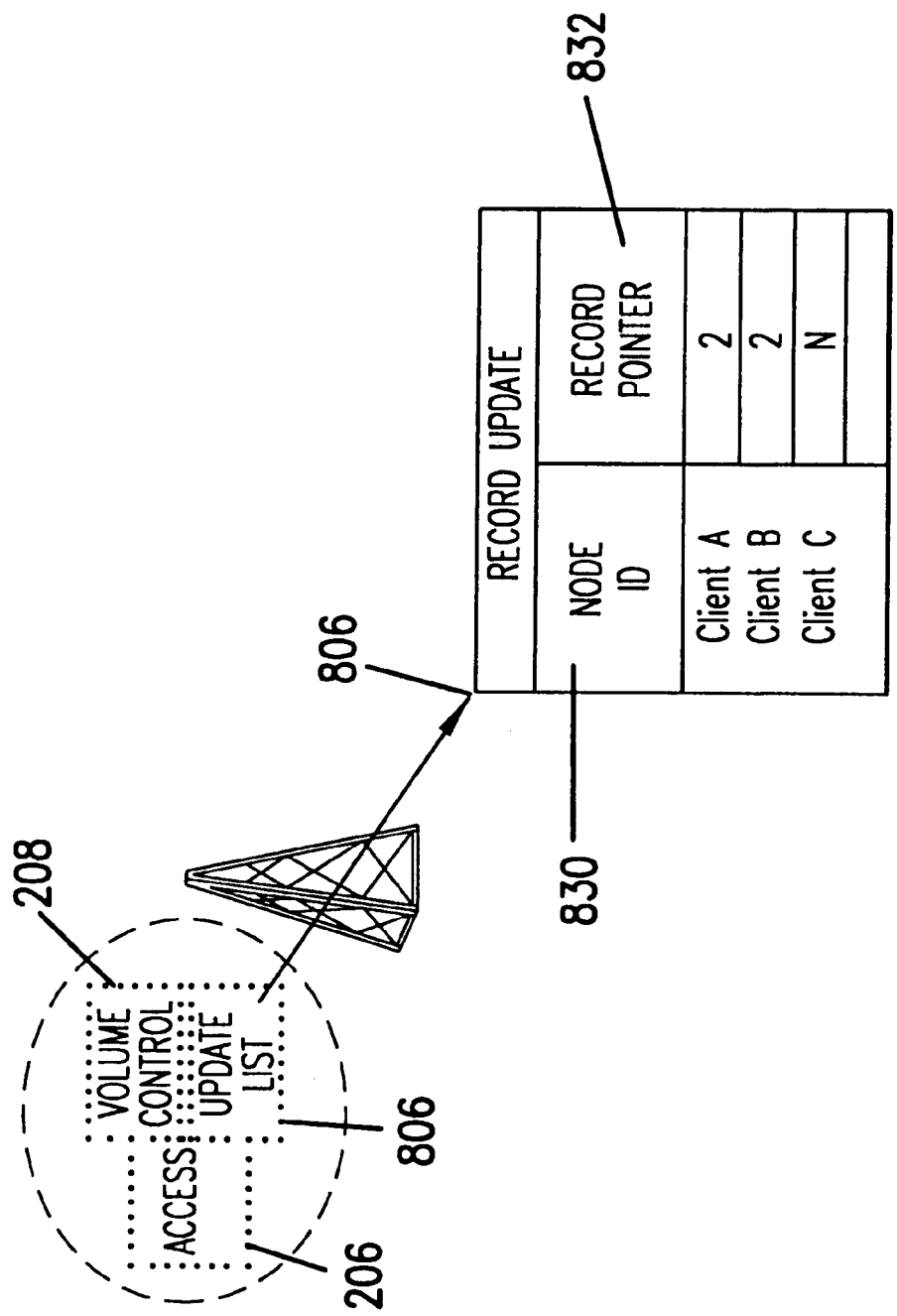
FIG. 8C shows the update list on the shared volume shown in FIG. 7.

FIG. 8C shows the detailed data structure for the update list 806 [see FIG. 7]. The update list contains for each client field 830, a corresponding record pointer 832 associated with the field that a client is editing. This list is utilized by the enhanced database processes 808–810 [see FIG. 7] for broadcasting updates to a field to all of the clients currently viewing the corresponding record. As indicated in fields 832, both clients 54 and 56 are currently viewing a field within record 2.

Figure 9A:
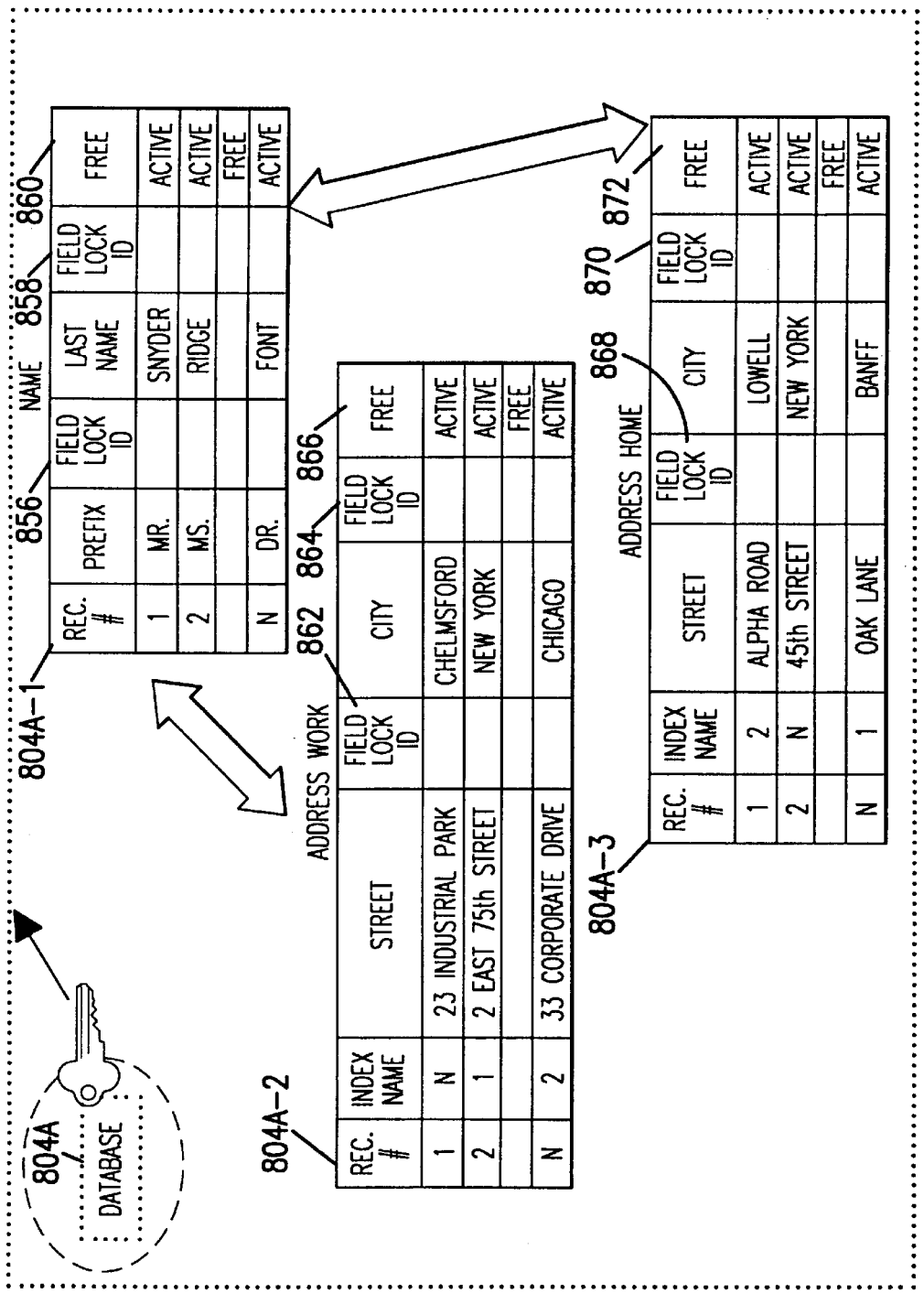
FIGS. 9A and 9B show respectively the enhanced data structures associated with either a relational or flat database on the shared volume of FIG. 7.

FIG. 9A shows the detail data structures associated with a relational database embodiment 804A of database 804 discussed in FIG. 7. The relational database includes a name table 804A-1, a work address table 804A-2 and a home address table 804A-3. Each of the tables contains multiple fields and for each field there is a corresponding lock field. In table 804A-1 there is a prefix and last name field for each record. Lock fields 856 are associated with each of the prefix fields and lock fields 858 are associated with the last name fields. In the work address table there are street fields and city fields for each record. Associated with each of the street fields is a corresponding field lock 862. Associated with each of the city fields is a field lock 864. Home address table 804A-3 includes both a street and a city field for each of the records. The street field has a corresponding lock field 868. The city field has a corresponding lock field 870. Associated with each record in each of the tables are free fields 860, 866 and 872, which indicates one of two states; active or free. A record with a free field marked active contains valid data. A record with a free field marked free contains no data and is available to be used as a new, added record. A free field marked delete contains a record destined to be physically removed from the database in order to reduce the storage requirements of the database. The deletion of a record from the database therefore, may be accomplished either by marking the record as free or by marking it as delete. A record may be added to the database either by converting a free field to an active field or by physically adding new records to the database. The processes connected with these activities will be discussed in greater detail in FIGS. 12A–12F.

Figure 9B:
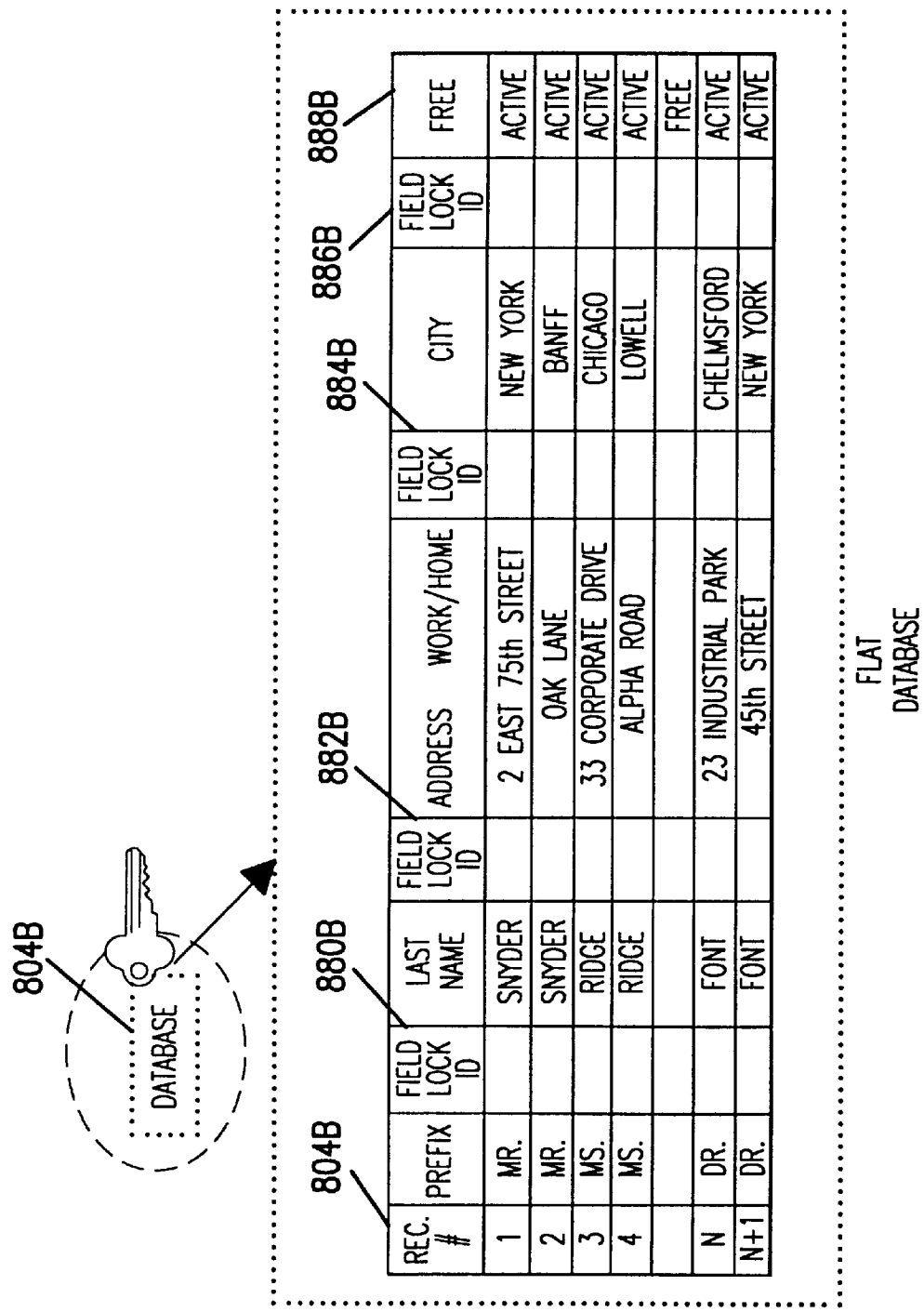

FIG. 9B shows detailed data structures associated with a flat database implementation 804B of database 804. The database 804B comprises rows each corresponding to an individual record. The database contains a prefix field, a last name field, a home and work address field and a city field. Associated with the prefix field is a lock field 880B. Associated with the last name fields is a corresponding lock field 882B. Associated with each of the home/work address fields is a corresponding lock field 884B. Associated with each of the city fields is a corresponding lock field 886B. Associated with each record is a corresponding free field 888B in which the possible states are active, free or delete. The effect of these free field states is identical to that discussed in FIG. 9A.

Figure 10:
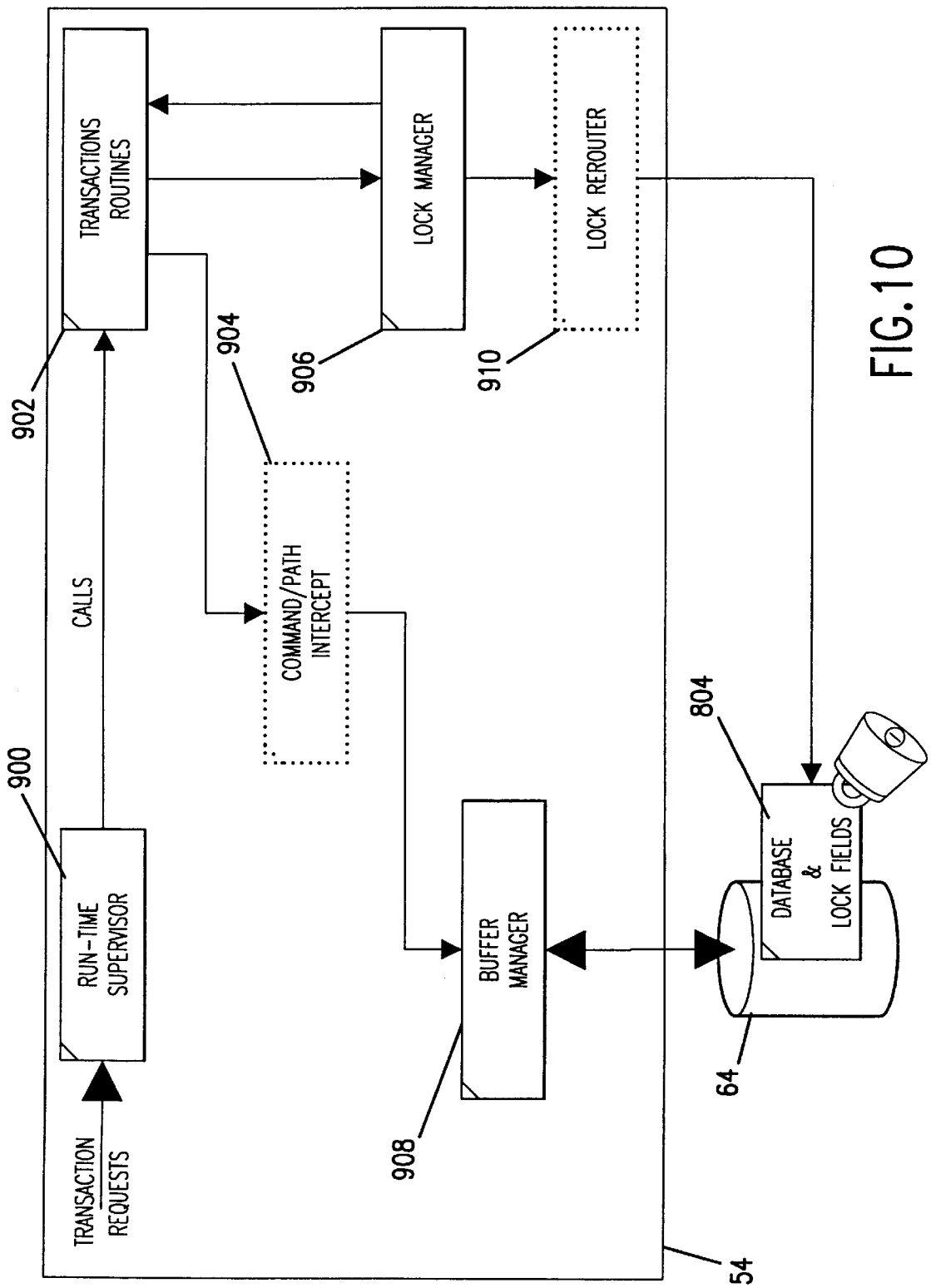
FIG. 10 is a functional block diagram showing the software modules on each client which implement the distributed database processes.

FIG. 10 shows the software modules on each client for managing the distributed database. Client 54 and RAID storage device 64 are shown. RAID storage device 64 contains a database and locking fields 804. The client 54 includes run time supervisor 900, transaction routines 902, command and path intercept 904, buffer manager 908, lock manager 906 and lock rerouter 910.

In operation a query is received by the run time supervisor 900 and passed to a transaction routines module 902. The transaction routine module submits a request for records from storage medium 64. That request is intercepted by the command or path interception module 904. The command path intercept module initiates the distributed management functions which will be discussed in greater detail FIGS. 12A–F, before passing the request on to buffer manager 908. Buffer manager 908 reads data from and writes data to the database 804 within storage device 64. When a transaction request is posted to the command and path intercept module 904, it is also posted to the lock manager 906. The lock manager issues a lock request for the required resource. That request is intercepted by lock rerouter 910. Lock rerouter 910 is responsible for implementing the field locking procedures, which will be discussed in greater detail in FIGS. 12C–F.

Figure 11:
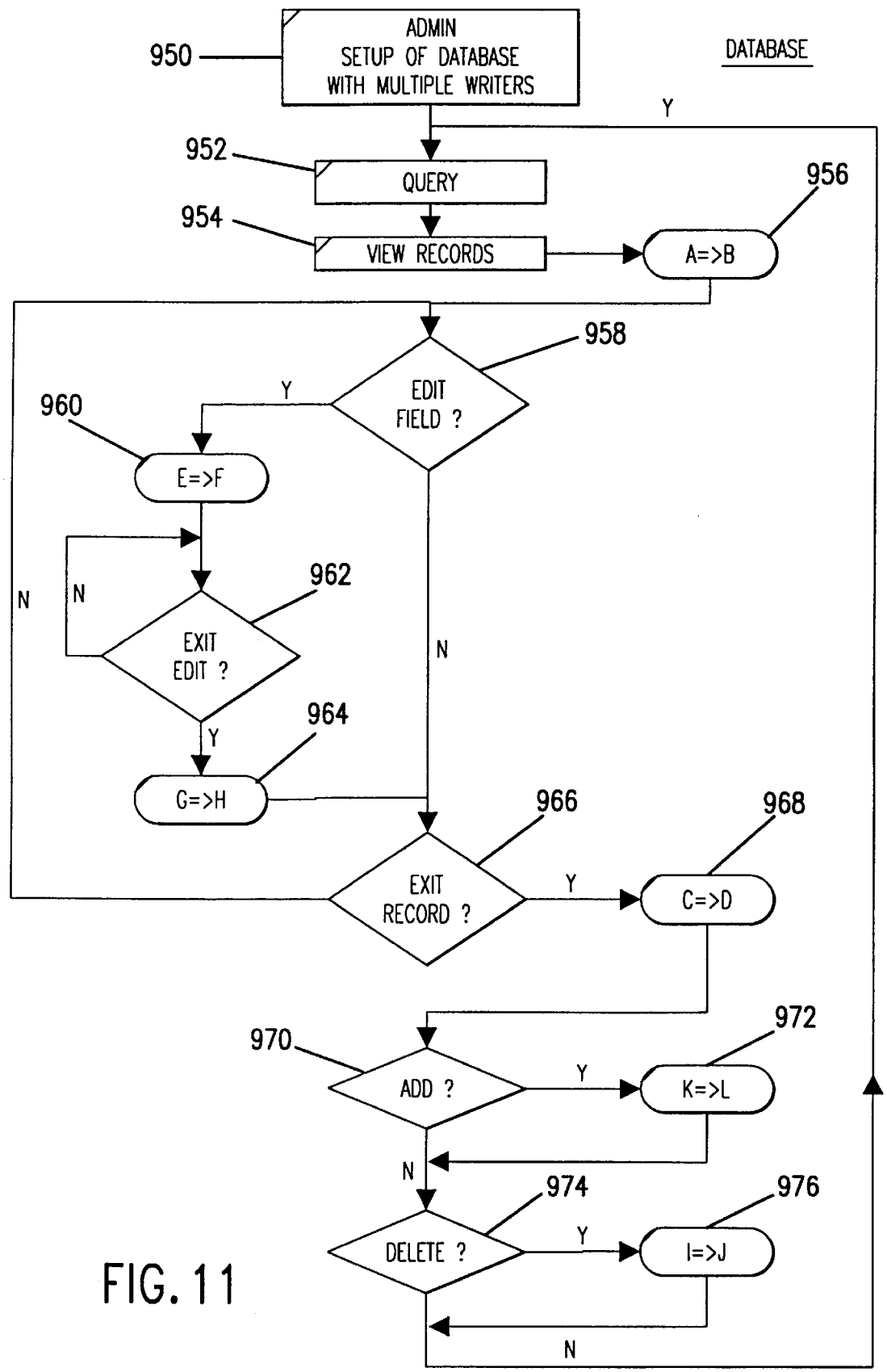
FIG. 11 is an overall process flow incorporating each of FIG. 10 within the overall structure of a database engine.

FIG. 11 shows the overall process flow connected with either of the distributed database processes 808–810, on respectively clients 54–56. Processing begins at process 950 in which an administrator sets up a database on a specific storage volume having specific field and record characteristics and permitting multiple writers. Fields within the database may contain text, or numerical data, or pointers to image files, sound files, and animation files. In a preferred embodiment the database will be established with a plurality of empty/free/available records of predefined size for future use. Thus, new records may be added to the database without requiring that the physical storage space be altered. Control is then passed to process 952 in which a GUT is presented to the user for purposes of accepting and processing a query. Control is then passed to process 954 in which the records retrieved from the database are viewed. Control then passes to subroutine block 956. Subroutine block 956 corresponds to the processes shown in greater detail in FIG. 12A. Control then passes to decision block 958. In decision block 958 a determination is made as to whether the user desires to edit a specific field within the record that is being viewed. If that determination is in the negative then control passes to decision block 966. Alternately, if the decision in the affirmative is reached, i.e., that a field is to be edited then control passes to subroutine block 960. The processes in subroutine 960 are set forth in greater detail in FIG. 12C. Control then returns to decision process 962. In decision process 962 a determination is made as to when the user has exited the field being edited. When the determination in the affirmative is reached, i.e., that the user has exited the field then control passes to subroutine module 964. Subroutine module 964 corresponds to the processes set forth in greater detail in FIG. 12D. Subsequent to the execution to the subroutine control returns to decision process 966. In decision process 966 a determination is made as to whether the user has exited the record. If that determination is in the negative control returns to decision process 958. Alternately, if the determination is in the affirmative, i.e., that the user has exited the record then control passes to subroutine block 968. Subroutine block 968 corresponds to the processes described in greater detail in FIG. 12B. From subroutine 968 control passes to decision process 970. In decision process 970 a determination is made as to whether the user desires to add a record. In the event that determination is in the affirmative, control passes to subroutine 972. Subroutine 972 corresponds to processes described in greater detail in FIG. 12F. On return from subroutine 972, control passes to delete decision process 974. Alternately, if in decision process 970 a determination in the negative is reached, i.e., that the user does not desire to add a record then control passes directly to delete decision process 974. In delete decision process 974 determination is made as to whether the user desires to delete a record. If that determination is in the negative, control returns to query process 952. Alternately, if a determination in the affirmative is reached, i.e., that the user desires to delete a record, then control passes to subroutine module 976. Subroutine module 976 includes the processes described in greater detail in the following FIG. 12E.

Figure 12A:
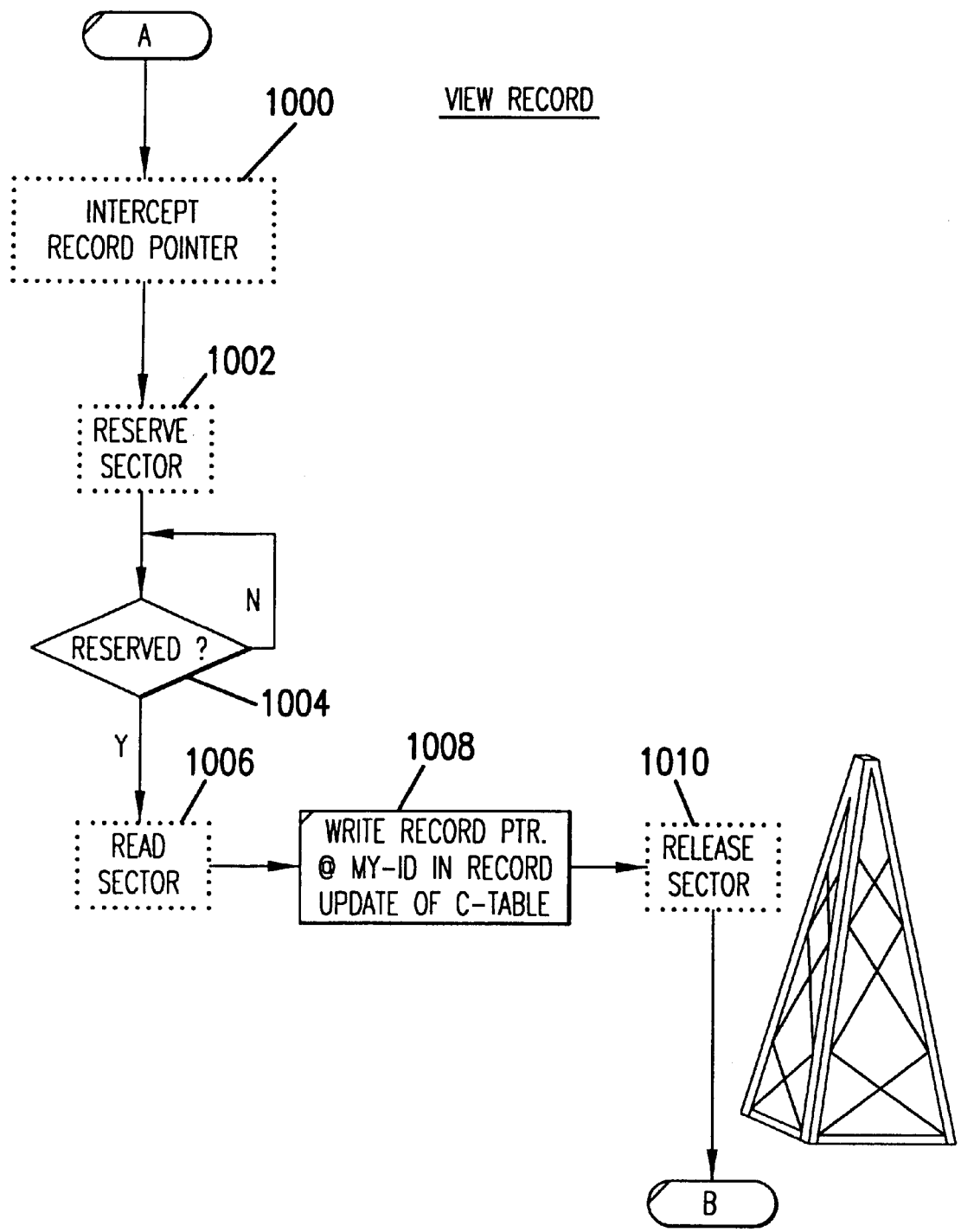

FIG. 12A outlines the processes connected with the view record subroutine module 956 discussed above in FIG. 11. Process begins at splice block A and passes to intercept process 1000. In intercept process 1000 a record pointer corresponding to the record being viewed is intercepted by the command path intercept module 904 [See FIG. 10]. Control passes to reserve sector process 1002. In reserve sector process 1002, the sector in storage device 64 corresponding to the record update table 806 [See FIG. 8C] is reserved. Control then passes to reserve confirmation decision process 1004. In reserve confirmation decision process 1004, determination is made as to whether the sector has in fact been reserved. In the event this determination is in the affirmative, control passes to read sector process 1006. In the read sector process 1006 the sector containing the update table is read and a pointer is obtained for the specific record in the table having a I.D. identical to the client I.D. running the process. Control then passes to process 1008. In process 1008 the record I.D. and/or record pointer obtained in process 1000 is written to the field in the control table corresponding to the client running this process. Control then passes to release sector process 1010. In process 1010 the sector being read is released. Control then returns via splice block B.

Figure 12B:
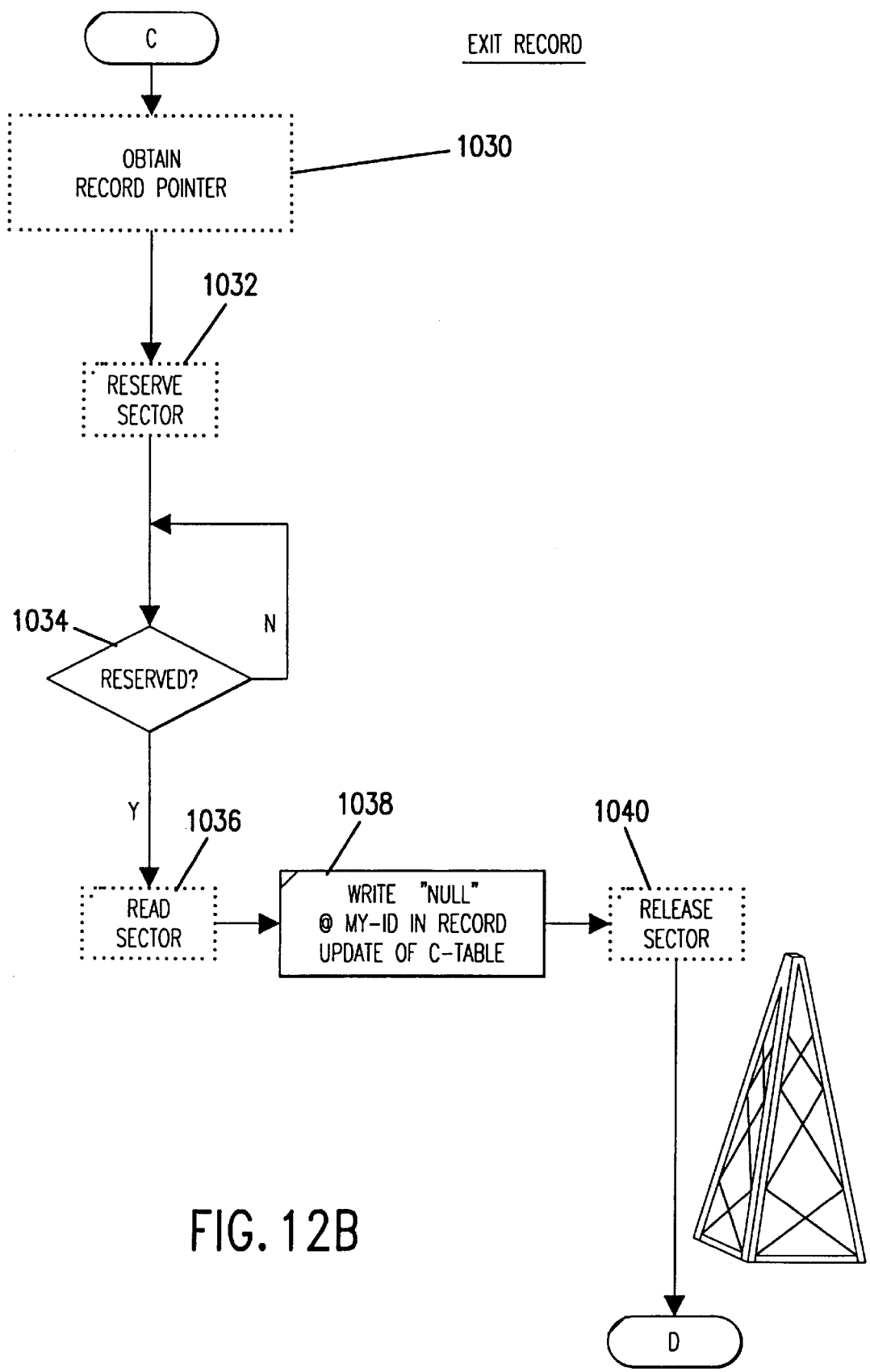

FIG. 12B shows the exit record processes associated with subroutine module 968 described above in FIG. 11. A subroutine commences at splice block C and control passes to process 1030. In process 1030 a record pointer for the record from which the user is exiting is obtained by the command path intercept module 904 [See FIG. 10]. Control is then passed to reserve sector process 1032. In this process the sector on the storage device 64 in which the update table [See FIG. 8C] is reserved. Control then passes to reserve confirmation decision process 1034. In this decision process, a determination is made as to whether the sector reservation has been accepted and implemented. When an affirmative determination is reached, control is passed to read sector process 1036. In read sector process 1036, the update table is read and a pointer is obtained for the specific row within that table corresponding to the client implementing the process. Control is then passed to process 1038. In process 1038 the record I.D. field corresponding to the client running the process is erased. This indicates that the user is no longer viewing the record. Control is then passed to process 1040. In process 1040 the reserve sector is released and control returns via splice block D.

Figure 12C:
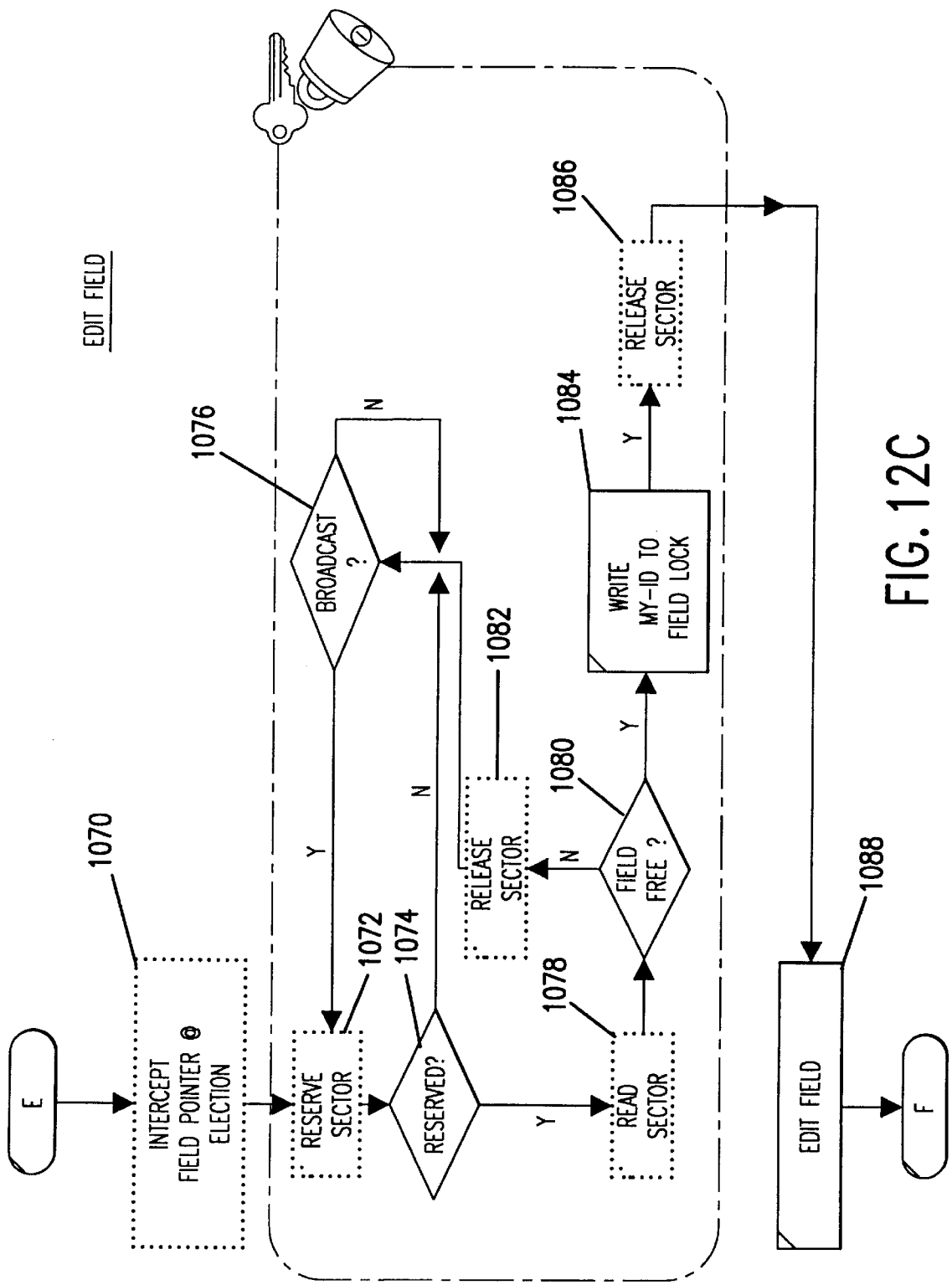

FIG. 12C shows the process implemented by subroutine module 960 [see FIG. 11] for editing a field. The subroutine commences at splice block E and control passes to process 1070. In process 1070, the command path intercept module 904 [See FIG. 10] intercepts the field pointer corresponding to the field being edited. Control then passes to process 1072. In process 1072, a reserve sector request is placed for a sector in the physical storage device 64 [See FIG. 10] in which the field is stored. Control is then passed to confirmation decision process 1074. In confirmation decision process 1074, determination is made as to whether the requested sector has in fact been reserved. In the event a determination in the negative is reached, then control passes to broadcast decision process 1076. In broadcast decision process 1076, a determination is made as to whether another client who is currently reserving the sector has broadcast a message indicating that the sector has been released. In the event of an affirmative determination, control returns to reserve sector process 1072. If in decision process 1074 an affirmative determination is reached, then control passes to process 1078. In process 1078 the reserve sector is read. Control then passes to decision process 1080. In decision process 1080 a determination is made as to whether the field with respect to which editing rights are being requested is in fact free. This determination is made on the basis of the lock fields described and discussed above in FIGS. 9A–B. In the event a negative determination is reached, control is passed to release sector process 1082. In process 1082 the sector is released and control returns to broadcast decision process 1076.

Alternately, if in decision process 1080 an affirmative determination is reached, i.e., that the requested field is unlocked, then control passes to process 1084. In process 1084 the lock rerouter 910 [See FIG. 10] writes the client I.D. to the locking field to be edited. Control is then passed to release sector process 1086. In release sector process 1086 the reserved sector is released and control is passed to process 1088. In process 1088 the user edits the selected field and control returns via splice block F.

Figure 12D:
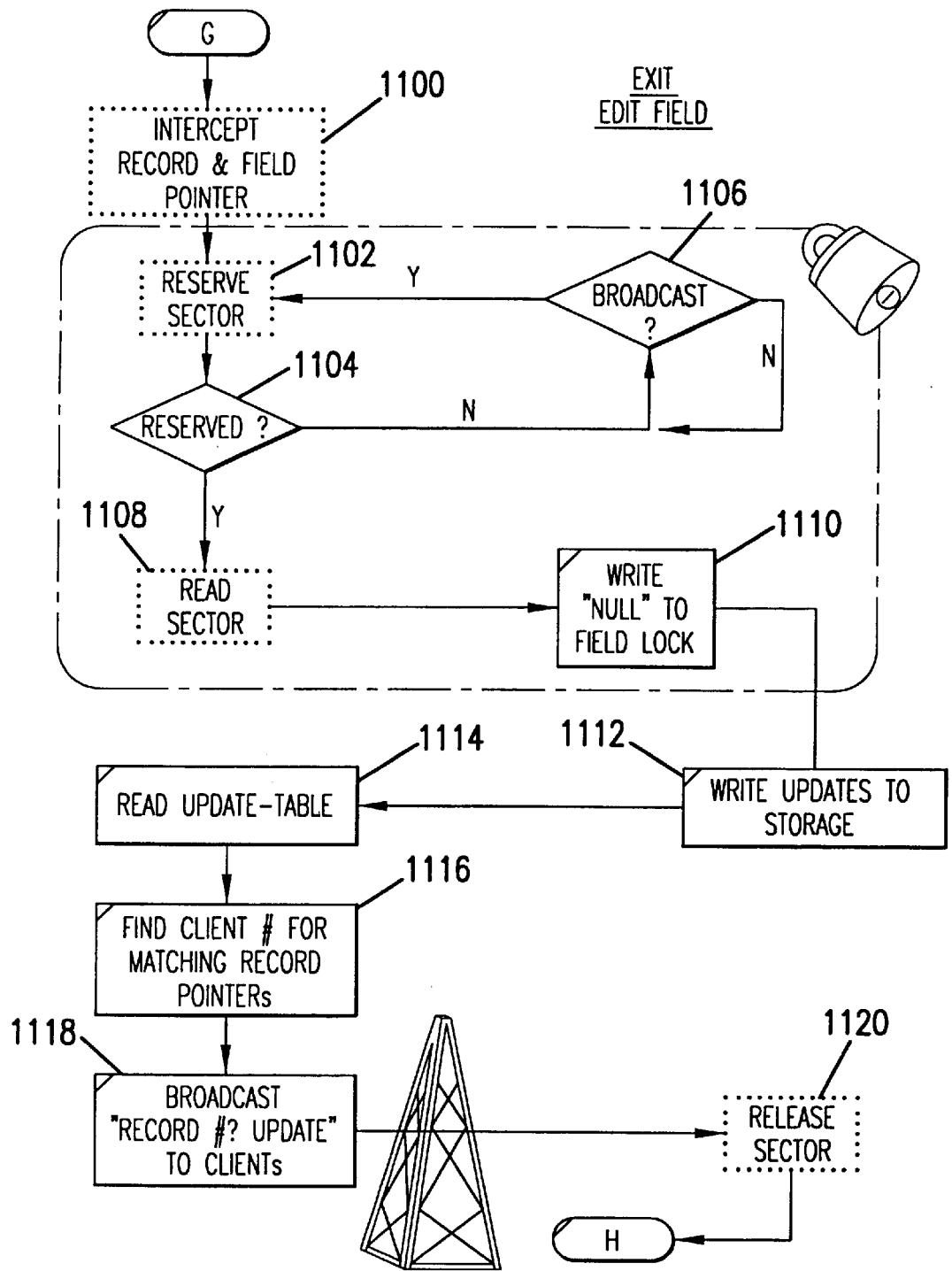

FIG. 12D shows the processes implemented by subroutine module 964 [see FIG. 11] for exiting an edited field. Subroutine module 964 described and discussed above in connection with FIG. 11 corresponds to these processes. The subroutine commences at splice block G and control passes to process 1100. In process 1100 the field pointer for the field being exited and the corresponding record pointer are obtained by the command path intercept module 904 [See FIG. 10]. Control is then passed to process 1102. In process 1102 the sector on the physical storage device on which the record and field reside is reserved. Control is then passed to reserve confirmation decision process 1104. In decision process 1104, decision is made as to whether the sector has in fact been reserved. In the event this determination is in the negative, control is passed to broadcast decision 1106. In broadcast decision 1106, a determination is made as to when the sector is released by whichever client currently has that sector reserved. Control then passes upon release to process 1102. Alternately, if an affirmative determination is reached in decision process 1104, i.e., that the sector has been reserved, then control passes to process 1108. In process 1108 the reserve sector is read and control passes to process 1110. In process 1110 the lock rerouter 910 [See FIG. 10] erases the block field associated with the field being exited and control passes to process 1112. In process 1112 the command path intercept module 904 [See FIG. 10] passes the update to the edited field to the physical storage device 64. Control is then passed to process 1114. In process 1114 the update table 806 [See FIG. 8C] is read and sorted by the record pointer fields 832 [See FIG. 8C]. Control then passes to process 1116 in which clients viewing the same record as that associated with the field which has just been updated are identified. Control then passes to process 1118. In process 1118 a broadcast message is sent to those clients viewing the updated record. The message contains an identifier corresponding to the record which is a field of which has just been updated. Control then passes to 1120. In process 1120 the reserved sector is released and control returns via splice block H.

FIG. 12E shows the detailed processes associated with deleting a record and corresponding to subroutine module 976 described and discussed above in FIG. 11. The process begins at splice block I and control passes to process 1150. In process 1150 the pointer to the record to be deleted is intercepted by the command path intercept module 904 [See FIG. 10]. Control then passes to process 1152. In process 1152 the sector in the physical storage device associated with a record to be deleted is reserved. Control then passes to decision process 1154. In decision process 1154 determination is made as to whether the reserved sector has in fact been reserved. In the event a determination in the negative is reached, then control returns to decision process 1156. In decision process 1156 a determination is made as to when the other client that has reserved that sector releases the sector. When such an affirmative determination is reached, control returns to process 1152.

Alternately, if in decision process 1154 an affirmative determination is reached, i.e., that the sector has been reserved, then control passes to process 1158. In process 1158 the lock rerouter 910 [See FIG. 10] reads the sector on the physical storage device which contains the record. Control then passes to decision process 1160 in which a determination is made by the lock rerouter as to whether all the lock fields within that record are free. In the event that determination is in the negative, i.e., all fields are not free and therefore another client is currently editing one of the fields, control passes to process 1162. In process 1162 the reserve sector is released and control returns to broadcast decision process 1156.

Alternately if in decision process 1160 an affirmative determination is reached, i.e., that all lock fields in the record to be deleted are free, then control passes to process 1164. In process 1164 the lock rerouter 910 writes to the free field [See FIGS. 9A–B] a delete indicator. Control then passes to process 1166. In process 1166 all fields within the deleted record are erased by the lock rerouter 910. Control then passes to process 1168. In process 1168 the reserve sector is released. Control then returns via splice block J.

Figure 12F:
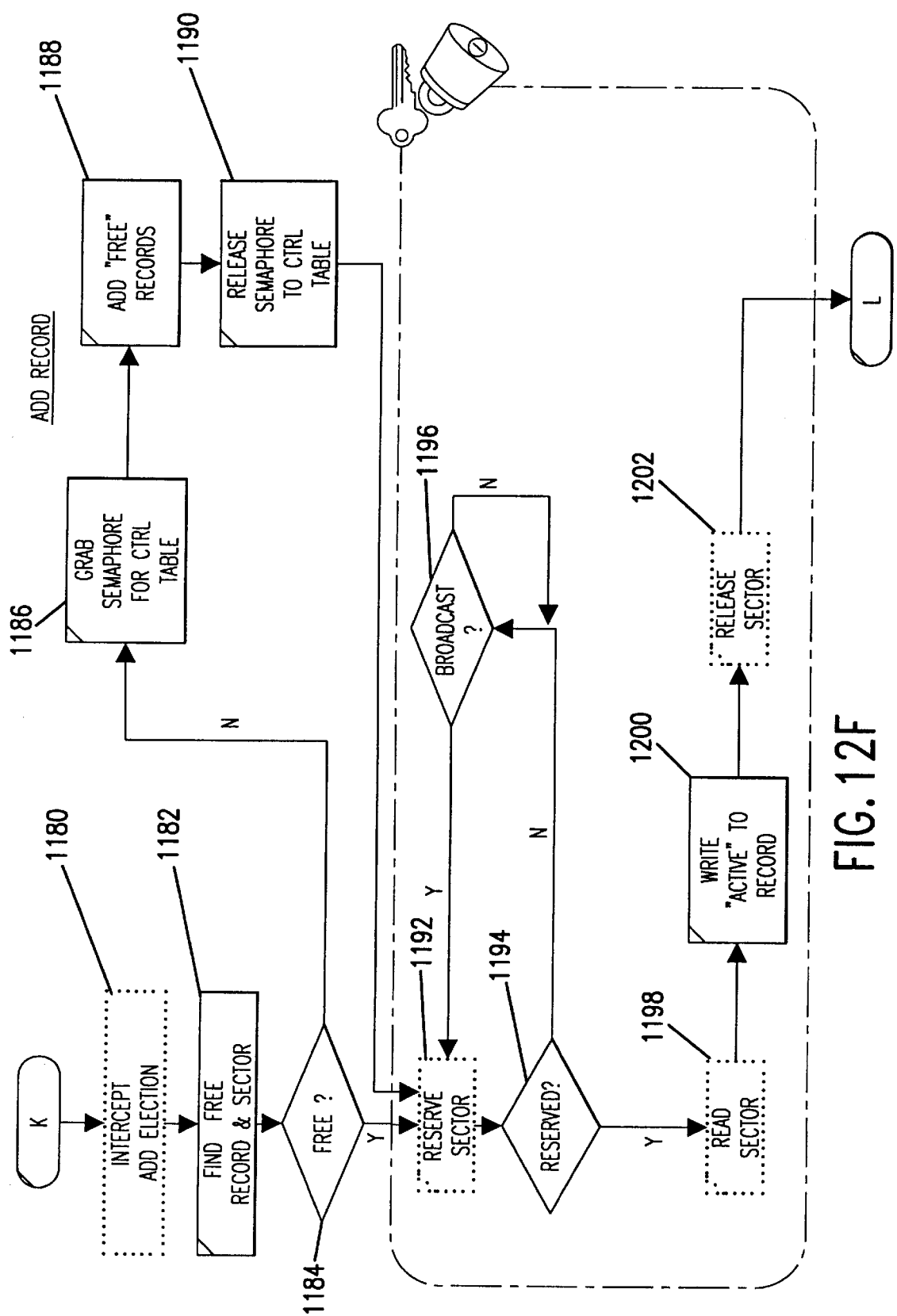

FIG. 12F shows the detailed processes associated with adding a record which are described and discussed above in connection with subroutine module 972 in FIG. 11. Control commences at splice block K and passes to process 1180. In process 1180 the command path intercept module 904 [See FIG. 10] intercepts the add transaction request and passes control to process 1182. In process 1182 the free fields of all records in the database are analyzed and control is passed to decision process 1184. In decision process 1184 a determination is made as to whether any of the free fields associated with each record currently in the database contains a free indicator. In the event that determination is in the negative, i.e., that no records are available, then control passes to process 1186. In process 1186 a semaphore field 352 [See FIG. 8A] for the access control table is grabbed [see FIG. 5A, processes 510–518]. Control then passes to process 1188. In process 1188 the actual physical storage space reserved for the database is increased by adding new records. The free fields of those new records are marked with a free indicator. Control then passes to process 1190. In process 1190 the semaphore field 352 for the control table 206 [See FIG. 8A] is released. Control then returns to process 1192.

If in decision process 1184 an affirmative determination is reached i.e. that there are free records currently existing in the database, then control passes to process 1192. In process 1192 the physical sector associated with the free record is reserved. Control then passes to decision process 1194. In decision process 1194 a determination is made as to whether the sector has in fact been reserved. In the event that determination is in the negative then control passes to decision process 1196. In decision process 1196 a determination is made as to when the client who has currently placed a reserve on that sector has released that reserve. When such a determination is in the affirmative, control returns to process 1192. Alternately, if in decision process 1194 an affirmative decision is reached, i.e., that the sector has in fact been reserved then control passes to process 1198. In process 1198 the physical sector containing the free record is read. Control then passes to process 1200. In process 1200 an active indicator is written to the free field of the record [See FIG. 9A–B]. This indicates that the record has been placed into use. Control then passes to process 1202. In process 1202 the reserved sector is released and control returns via splice block L.

DISTRIBUTED PROCESSING

Figure 13A:
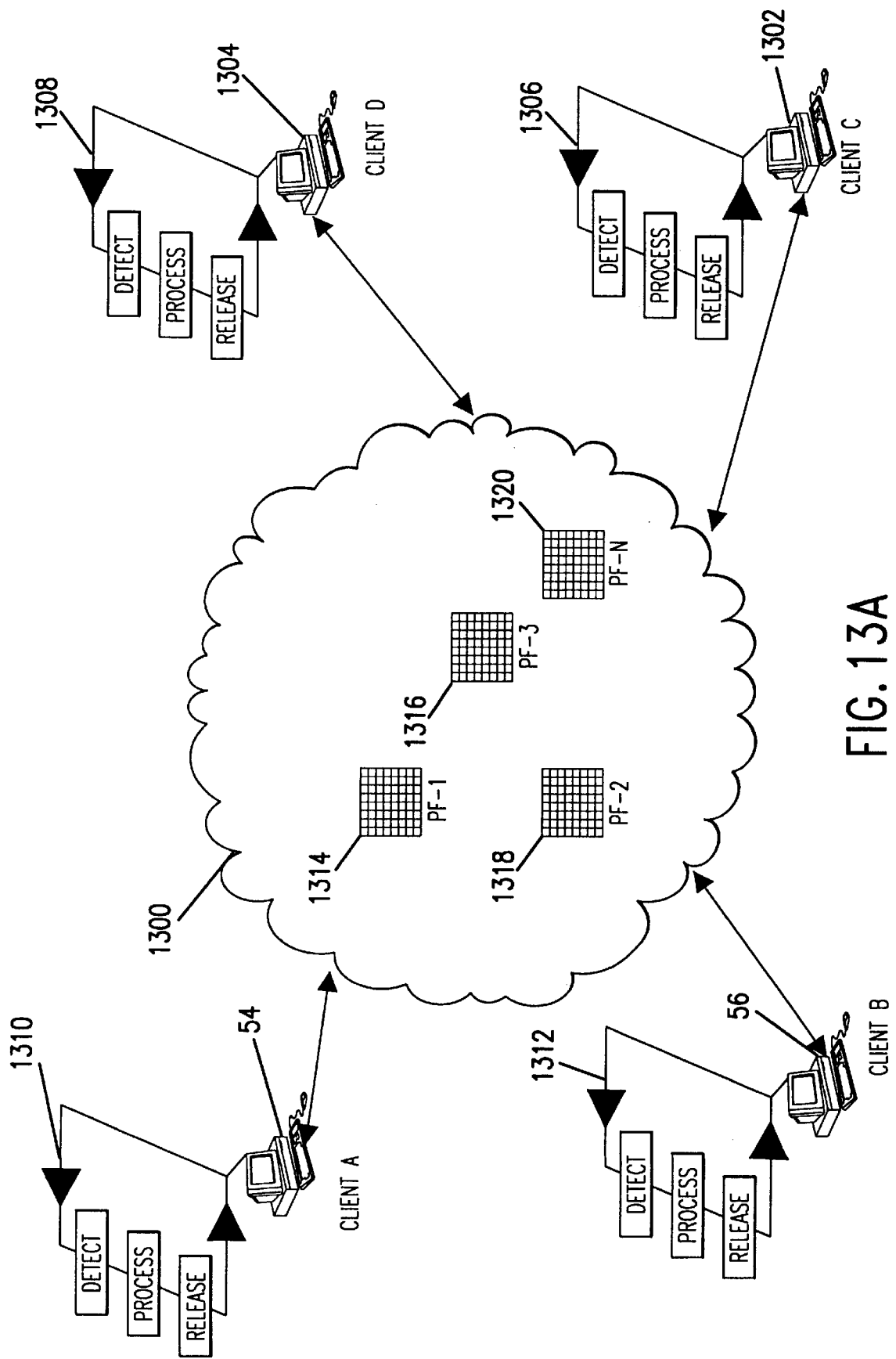
FIGS. 13A–C show a network environment in which multiple clients cooperatively process the task dictated by a project management file.
Figure 13B:
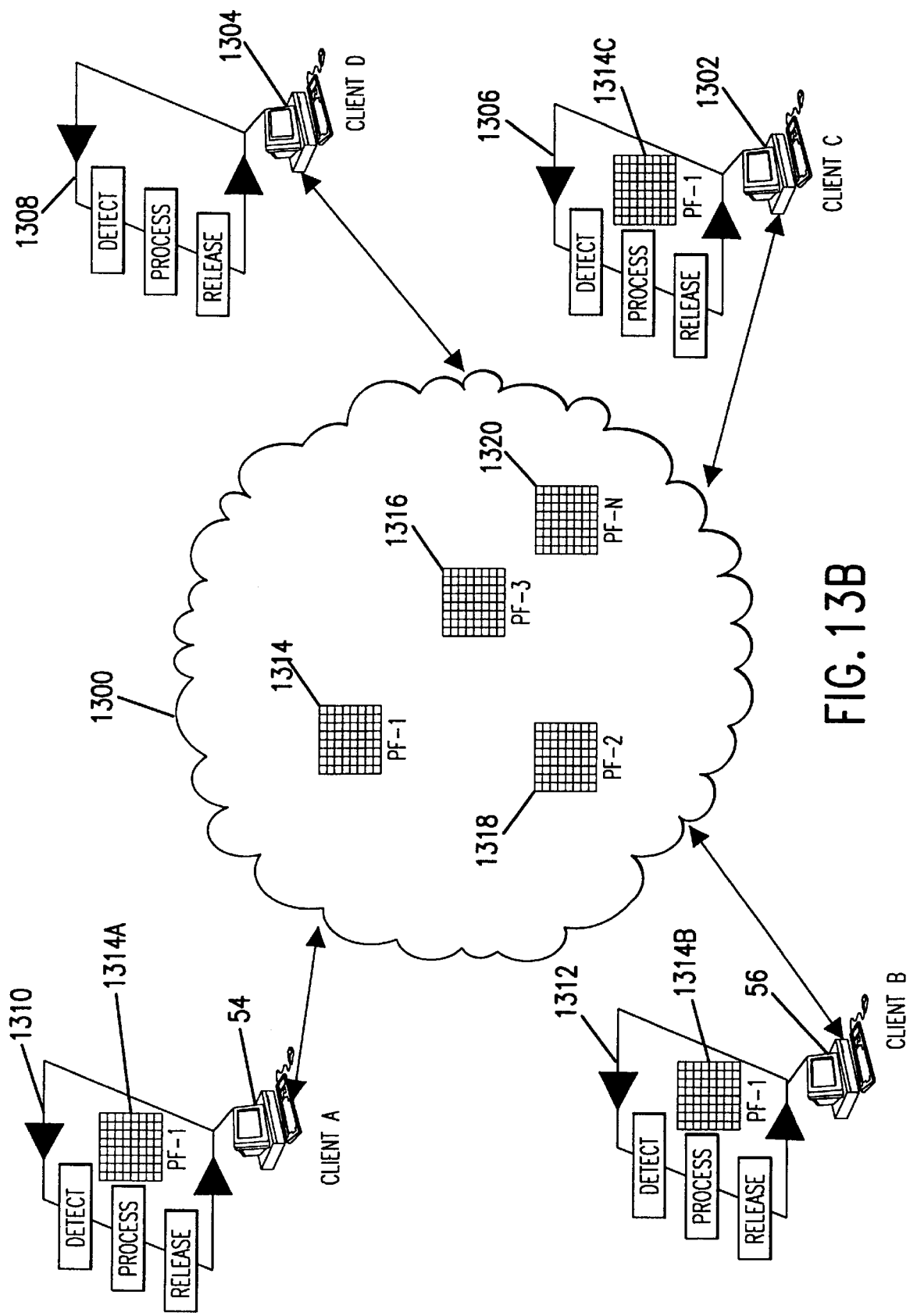
Figure 13C:
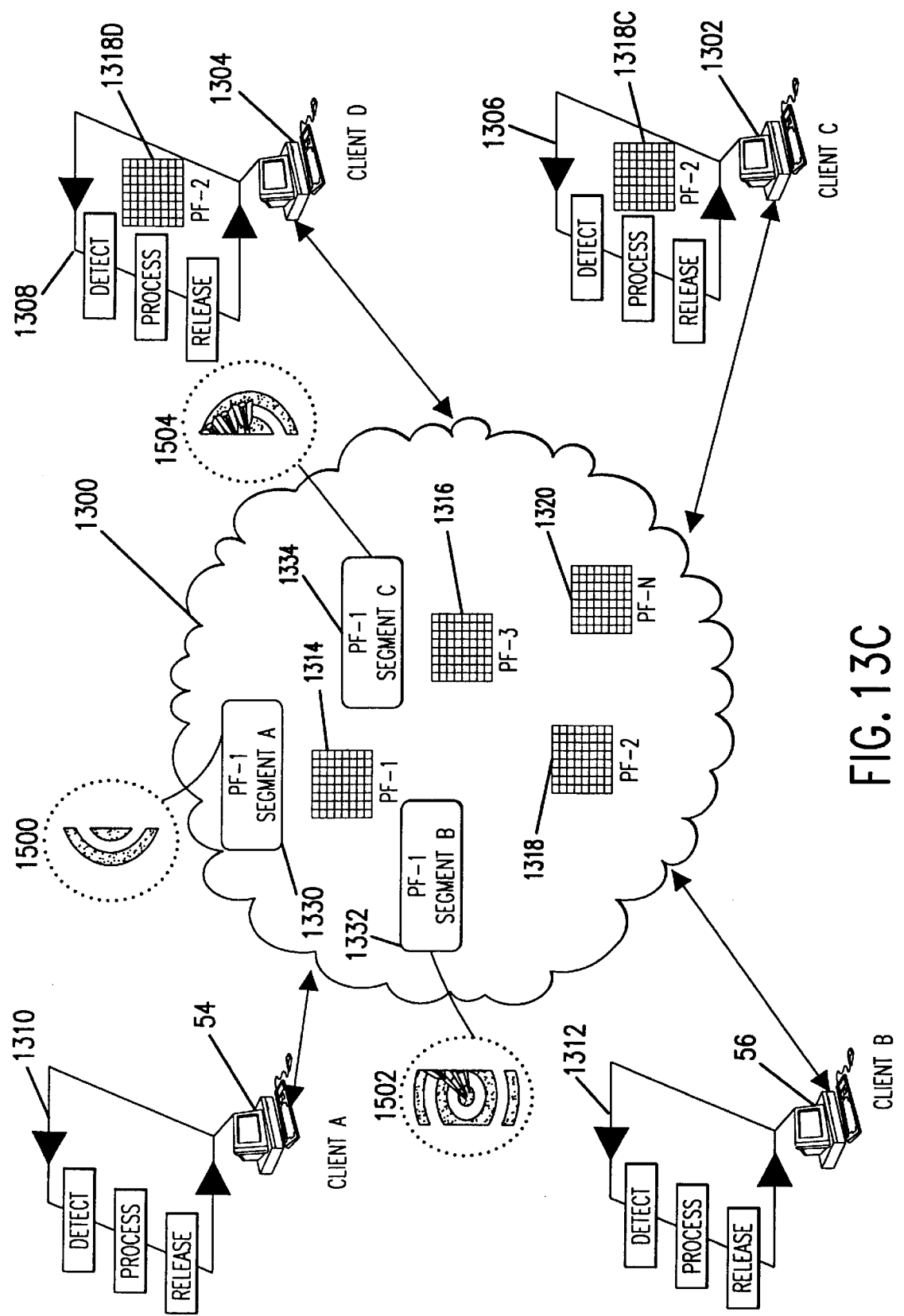

FIGS. 13A–C show the overall format for distributing control over multiple processors in a network environment. The network environment may be configured as either or both a NAP paradigm or a client-server paradigm. FIGS. 13-A–C include clients 54–56 and 1302–1304, which are connected to a network 1300. A series of project management folders 1314–1320 are available to all the clients on the network. Each client includes application programs and distributed project management process. Client 54 includes distributed project management process 1310, client 56 includes distributed process management process 1312, client 1302 includes distributed process management process 1306, and client 1304 includes distributed project management process 1308. The distributed project management processes each include the ability to select a project management folder to initiate the processing of a selected portion of that project management folder and to store a resultant file to an assembly location. Thus, a complex project such as a multimedia presentation involving image editing, rendering and key frame conversion can be accomplished cooperatively by the multiple clients in a network environment.

In FIG. 13B clients 54–56 and 1302 have each obtained copies 1314A–C respectively, of project management folder 1314. Each client has selected a segment of the project defined in Project Management File [PMF] 1314. Project management processes 1310–1312 and 1306, engage applications present on their respective clients in the processing associated with the selected segments of the PMF 1314. As resident applications complete the required task, the results are stored in files.

FIG. 13C shows that clients 54–56 and 1302 have released their copies of the PMF 1314. In addition, the resident processes 1310–12 and 1306 have caused the work product generated by the local applications to be stored on the network. Client 54 has stored its work product on the network in file 1330 depicted pictorially for purposes of example as the left hand portion 1500 of an image frame. Client 56 has stored its work product on the network in file 1332 depicted pictorially as the center portion 1502 of the image frame. Client 1302 has stored its work product on the network in file 1334 depicted pictorially as the right portion 1504 of the image frame. The location of each of these files on the network is recorded in the PMF 1314.

The next PMF on which processing is commenced is PMF 1318. Clients 1302–1304 have obtained copies respectively 1318C–D of PMF 1318. These clients will sign on for the processing of certain segments of these PMFS as well.

Figure 14A:
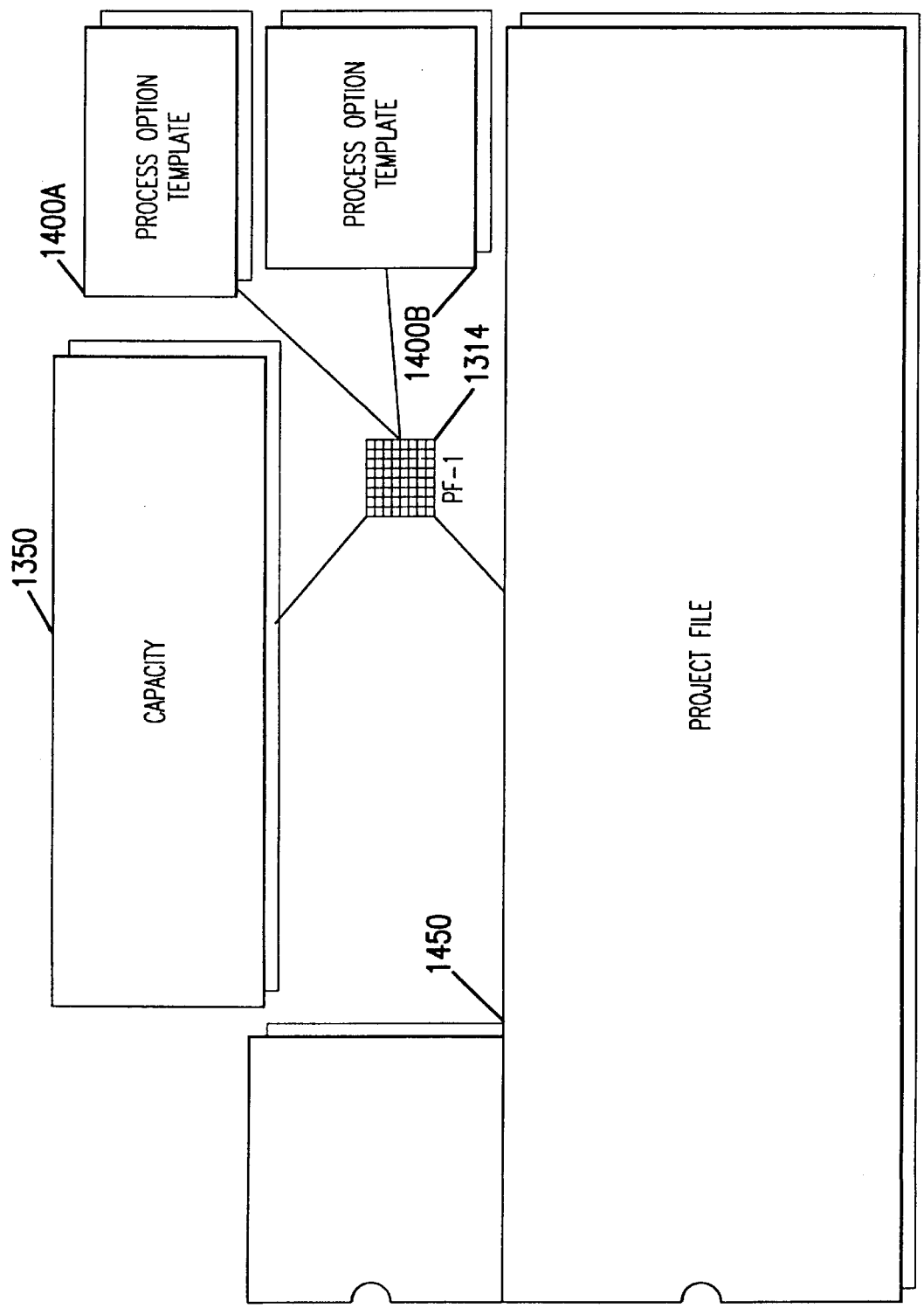
FIGS. 14A–D are detailed data structures associated with the project management files shown in FIGS. 13A–C.

FIGS. 14A–D show the data structures associated with a project management folder. FIG. 14A shows the data structures corresponding to a project management folder. Project management folder 1314 is shown to include a project file 1450, a capacity table 1350 and process option templates 1400A–B.

Figure 14B:
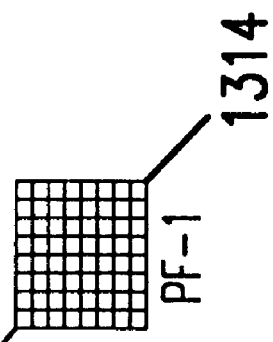

FIG. 14B shows the detailed data structures associated with capacity table 1350. Capacity table 1350 contain one row/record for each client on the network. For each client record application availability fields 1356–1362 record the availability of the applications on the client. For each of those applications, there is an indicator of the percent of the processing bandwidth consumed by the application. For example, client A [54] is shown with an electric image rendering package 1358 consumes 25% of its processing capacity. A CAD package 1360 is shown consuming 10% of the processing capacity on client A [54]. A rendering package 1362 is shown consuming 25% of the processing bandwidth of client A [54]. Finally, remaining unspecified applications and the operating system consume another 10% of the processing bandwidth of client A. Additionally, word processing package is listed in field 1356 as N/A indicating that that application is not even resident on client A [54]. Fields 1352 record for each client and specifically in this instance, client A [54], the accumulation of the utilization entries in fields 1356–1362. Thus, client A has a utilization 1352 listed at 70% of its total processing bandwidth. The remaining fields in the capacity table are the processing speed in terms of millions of instructions per second (MIPS) 1354. Client A [54] as listed as having a processing capability of 266 MIPS. Corresponding information is available for all clients on the network. Each record in the capacity table is maintained and updated by a corresponding one of distributed project management processes 1306–1312. The processes cause operating systems calls to be generated. These calls return variables corresponding to percent utilization broken down on an application specific basis. The processes then write these updated results to the corresponding fields associated with their record in the control table. Thus, a single table is utilized to record percent utilization for all network resources in a common location.

Figure 14C:
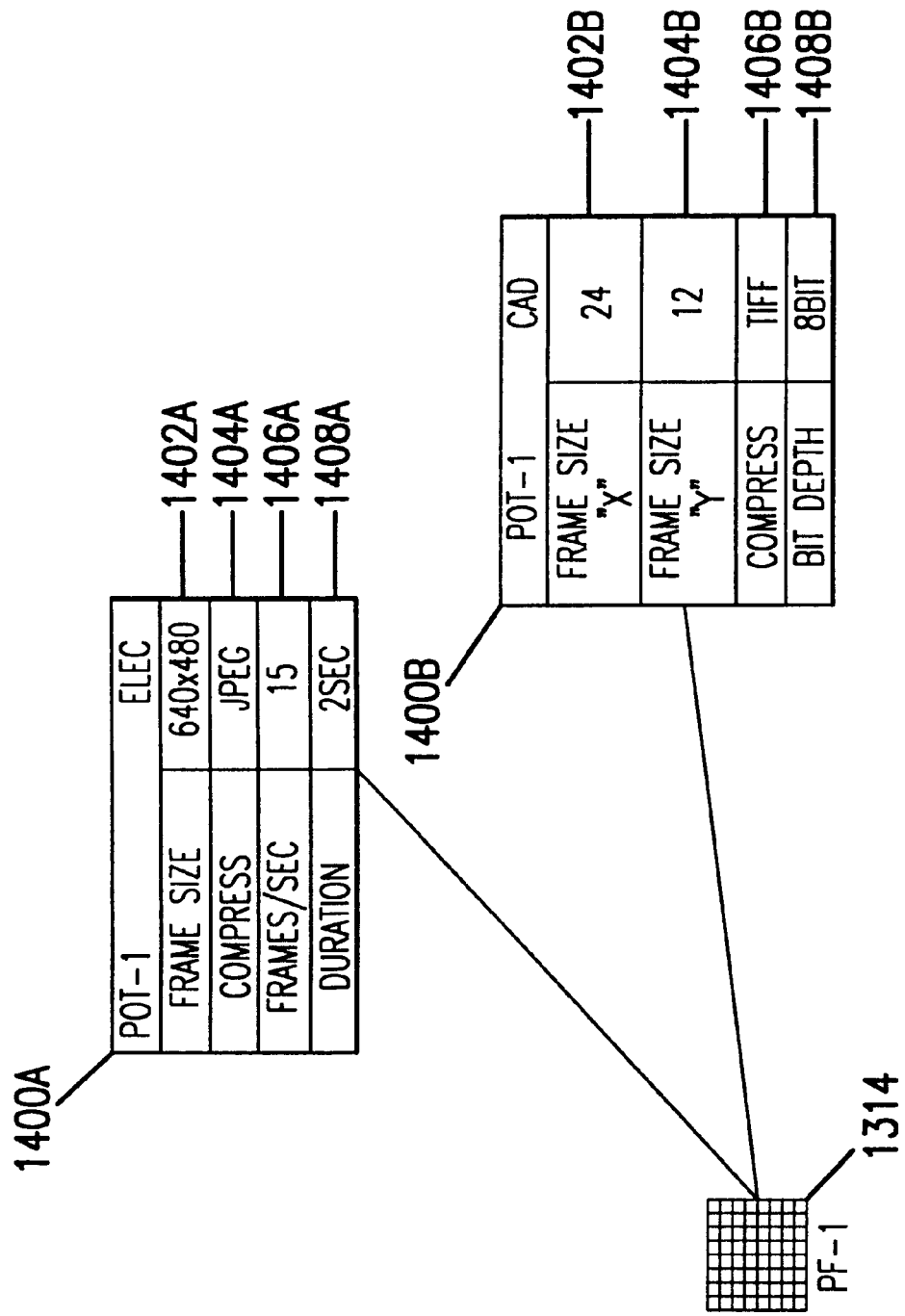

FIG. 14C shows the detailed data structures corresponding to process option templates 1400A–B. Typically, a process option template is associated with a specific application. A process option template causes an application resident on a client to be executed in a specific manner. For example, process option template 1400A is associated with the software application Electric Image®. Fields 1402A–1408A record respectively the appropriate frame size, compression, format, frames per second, and duration indicators for the application. In the example shown in FIG. 14C, a frame size 1402A of 640×480 is shown. A JPEG compression technique 1404A is indicated. A playback rate 1406A expressed in frames/second is indicated at 15. Finally, intended duration 1408A of the animation is two seconds.

Process option template 1400B is associated with computer aided design (CAD) application. For that application a frame size compression technique and bit depth preference is indicated in respectively, fields 1402B–1408B. The x axis frame size is 24, the y axis frame size is 12, the compression technique is TIFF and the bit resolution is 8 bit. Each of the process option templates can be generated in any one of a number of manners. The process option templates can be generated by a user enabling an application and selecting preferred processing parameters and storing those with an associated output file. Alternately, a process option template can be administratively generated and appended to a specific file in a shell program intended for just such a purpose.

Figure 14D:
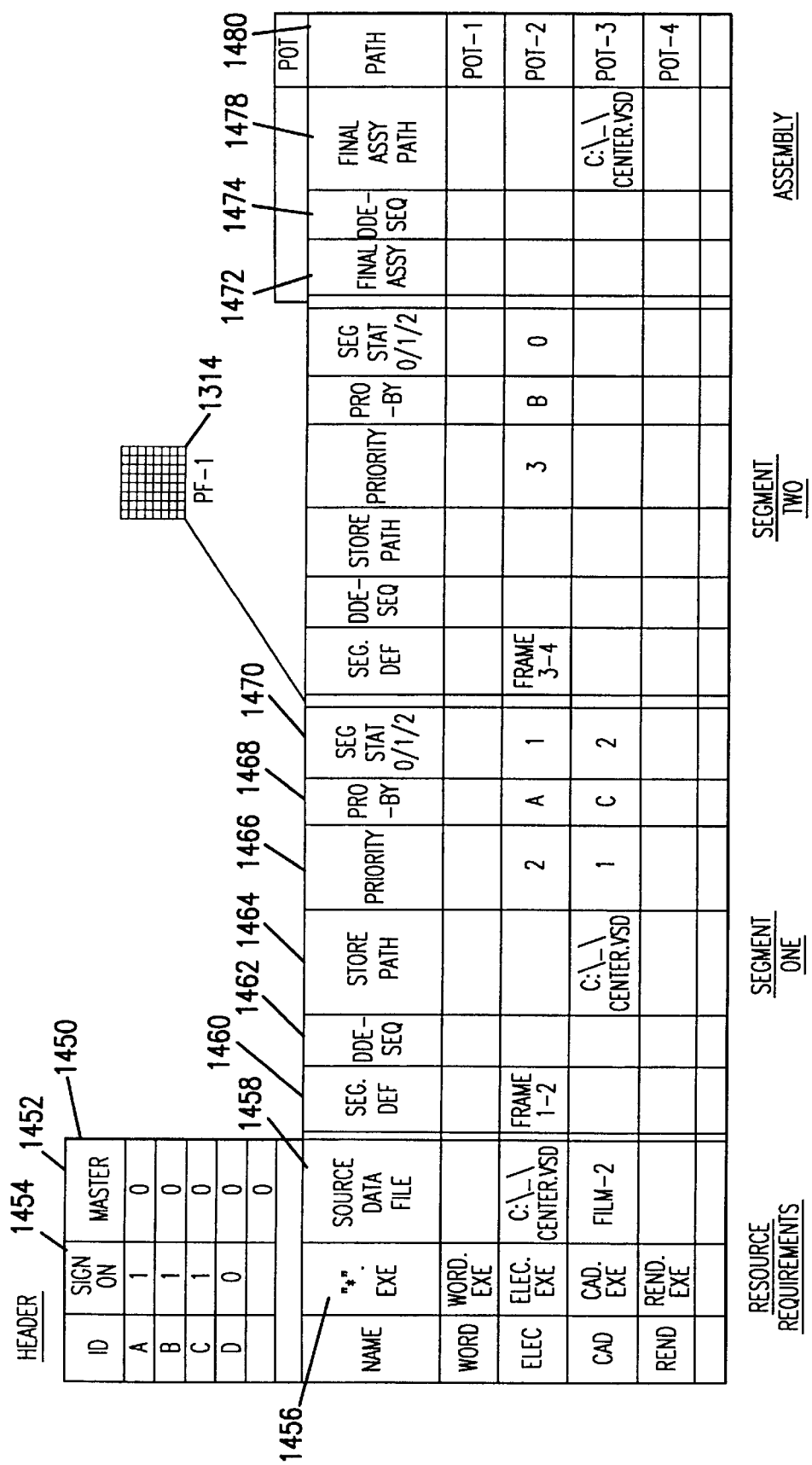

FIG. 14D shows the detailed data structures of the project file 1450. The project file includes a header with sign on fields 1454 and master preference fields 1452. The sign on fields indicate which amongst the various clients on the network have signed on for the project. Clients A, B and C are shown as having signed on to the project while client D has not. None of the clients has requested or been designated for master status since all the entries in the master status fields 1452 are zero.

The project file 1450 includes a resource requirements section. This section includes the names of the applications required to complete the project. In addition, executable path fields 1456 name the executable file for the application. Source data file fields 1458 indicate which files should be loaded by each application. This particular project requires the word processing application, the electric image application, the CAD application and a rendering application. The electric image application requires a source data file named "center.vsd" and the path to that file is listed as c:\...\center.vsd. The next portion of the project file is the segments sections. Two segment sections are shown. Generally, the number of these sections corresponds to the number of clients on the network, which can simultaneously engage in the processing associated with a particular project. Some projects will have one segment while other complex rendering projects that can be divided amongst a large number of clients, will have a large number of segments.

Each segment comprises a segment definition field 1460, a program field 1462, a storage path field 1464, a priority field 1466, a processed-by field 1468 and a segment status field 1470.

The segment definition field 1460 defines the starting and ending point for a specific segment. The starting and ending point for the electric image application in the first segment is listed as frames 1–2. The program control field 1462 contains control script, e.g., Visual Basic® Java™ or "DDE Script" which causes the application to perform in a manner appropriate for this specific project. Note: the word "applications" include any processes running on a computer, from high level programs like Auto-Cad® to low level applications including the OS. Storage path fields 1464 indicate where the results are to be stored [See FIG. 13C reference 1330–1334]. Fields 1466 determine the processing order of applications and segments within a project. Processed-by fields 1468 indicate who amongst the clients on the network has caused a locally resident application to execute a segment of the PMF. For example, in segment 1 the "a" identifier shows that the project management processes on client A have taken on the processing of segment 1 of the electric image task. Finally, segment status field 1470 indicates for each segment and for each application within a project file, what the status of that segment is. Possible entries are "0", "1"or "2". A 0 entry indicates that the segment has not yet been processed, a "1" entry indicates that the segment is being processed and a "2" entry indicates that the segment processing is complete and that the file generated as a result of that processing, has been stored at the store path location on the network. The next portion of the project file is the assembly portion which comprises fields 1472–1478. Field 1472 is an I.D. field indicating who amongst the various clients has performed the final assembly. Field 1474 contains the program code or DDE sequence associated with performing that task. Field 1478 indicates the location on the network in which the results are to be stored. The next portion of the project file is the process option template fields 1480. This field lists each application a corresponding process option template or process option template path.

Figure 15A:
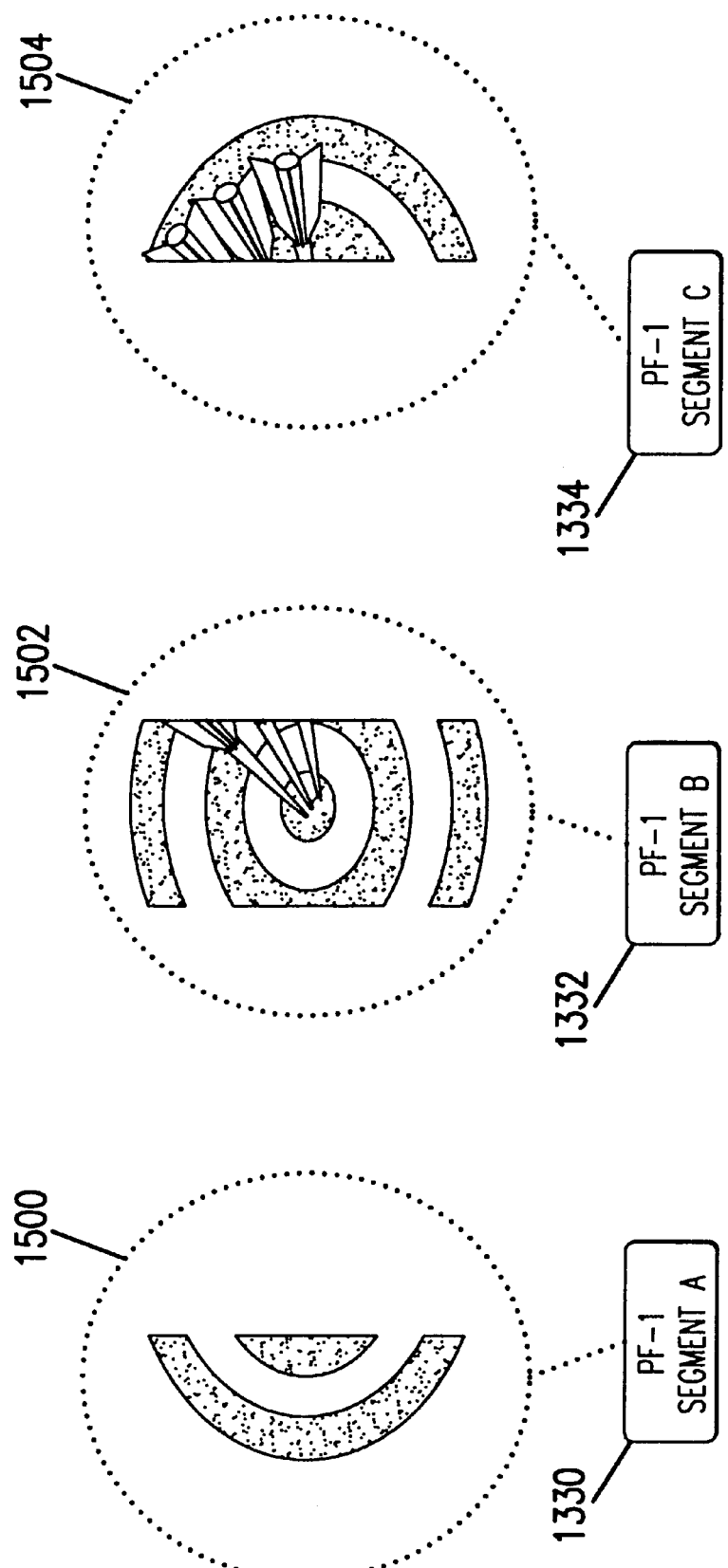
FIGS. 15A–B show examples of projects that can be implemented on the network shown in FIGS. 13A–C.
Figure 15B:
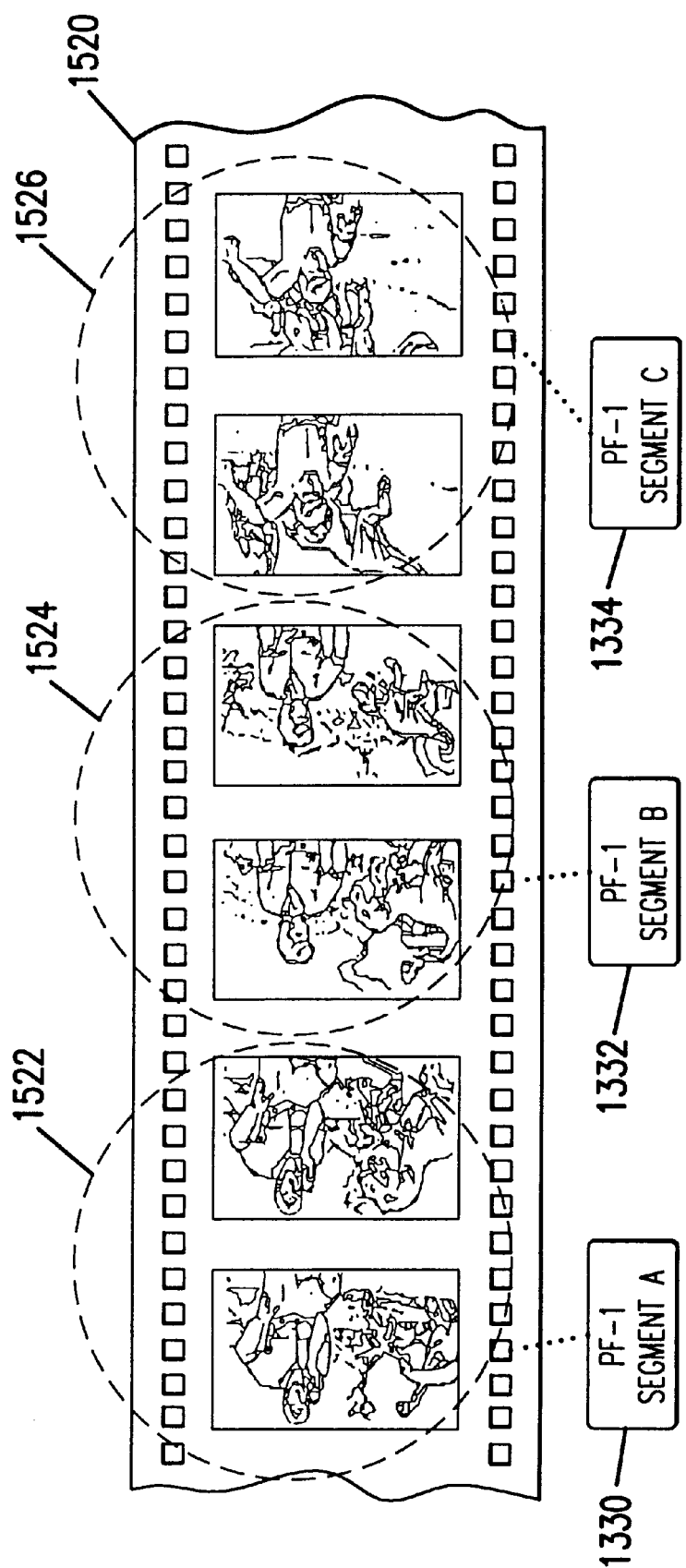

FIGS. 15A–B show two examples of distributed projects. FIG. 15A shows a two dimensional image, in which an image to be rendered is divided into three portions, each of which is rendered on a separate client. Portion 1500 is the left hand side of the image, portion 1502 is the center portion of the image and portion 1504 is the right hand side of the image. Each of these portions is stored in a corresponding file 1330–1334 on the network.

FIG. 15B is an animation sequence consisting of six frames. The first two frames 1522 are created by one client and stored in a file 1330 on the network. The next portion 1524 comprises frames 3 and 4 of the animation strip and it is stored in file 1332 on the network. The last portion 1526 of the project is frames 5 and 6 which are stored in file 1334 on the network. When files 1330–1334 are combined during final assembly the resultant animation sequence 1520 is produced.

Figure 16A:
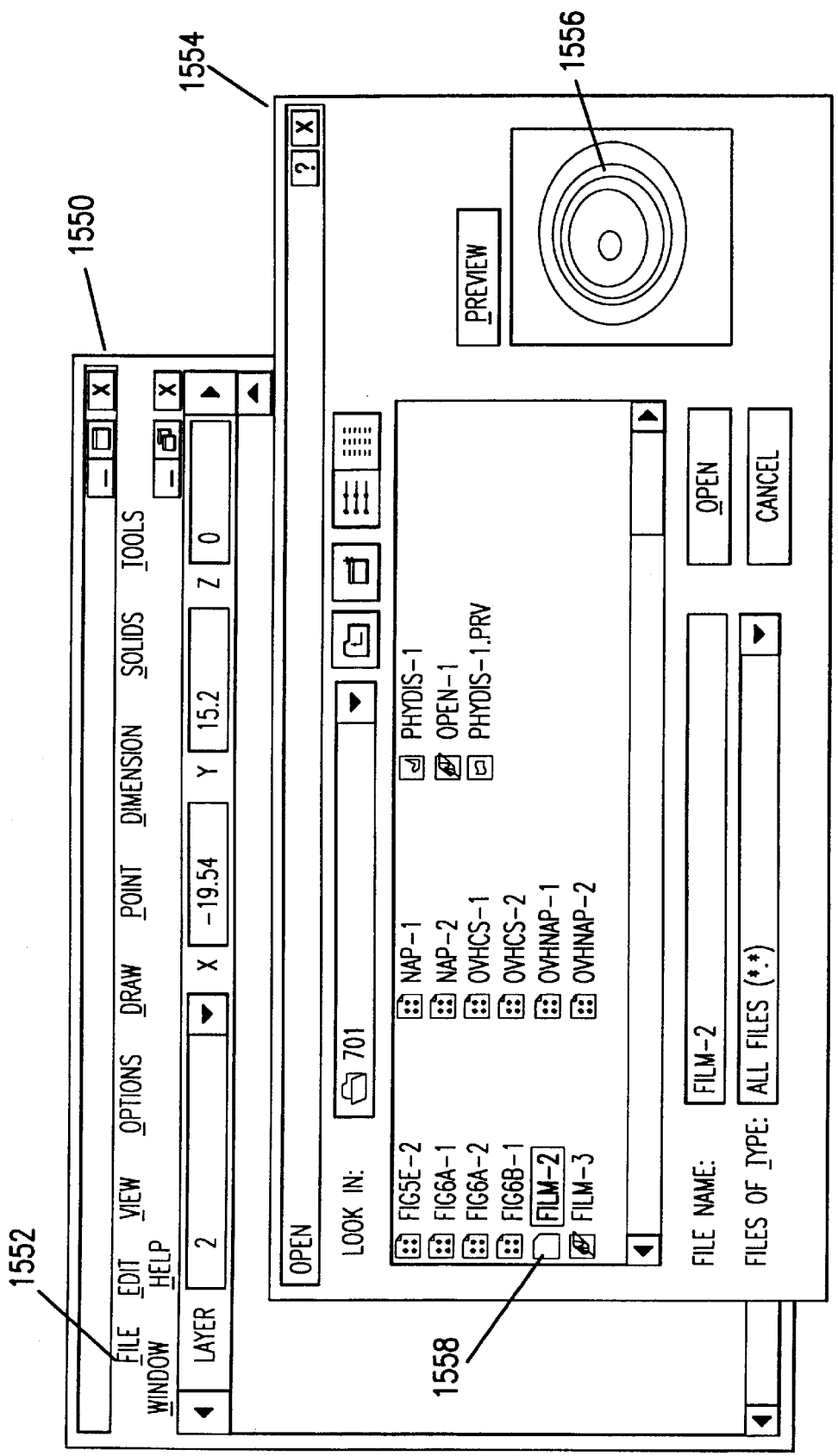
FIGS. 16A–D show the screen interfaces associated with the process shown in FIG. 15A.
Figure 16B:
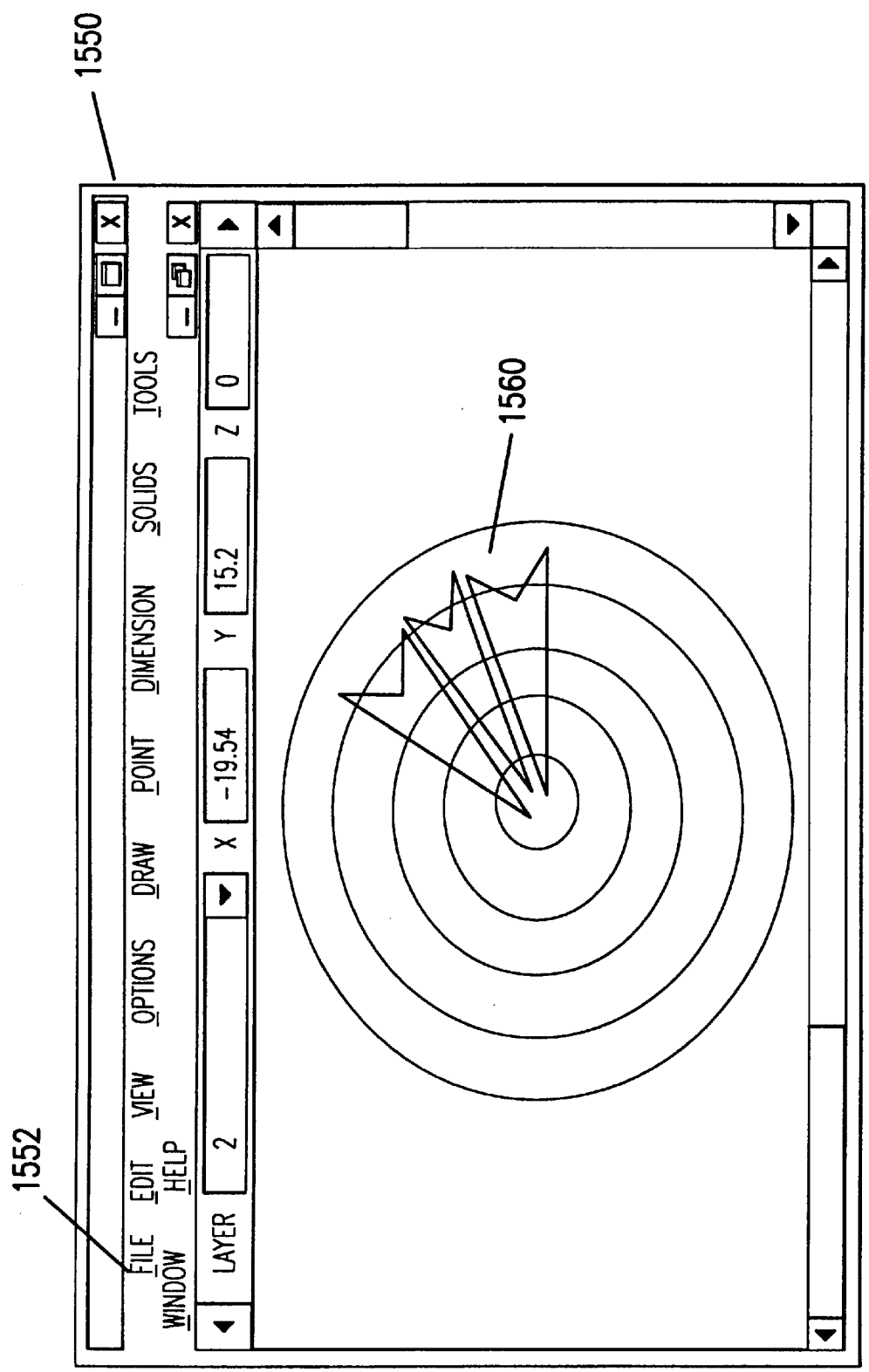
Figure 16C:
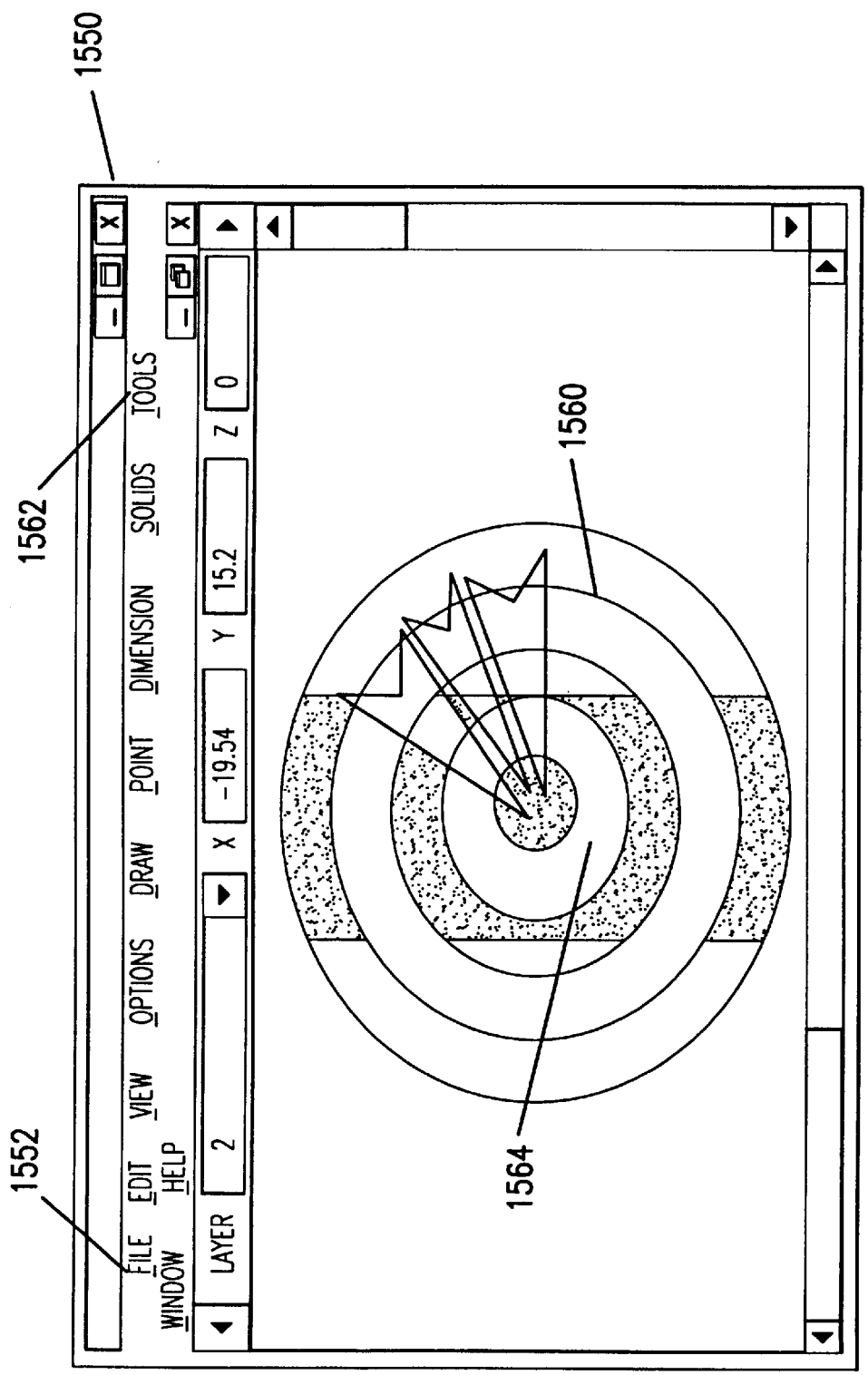
Figure 16D:
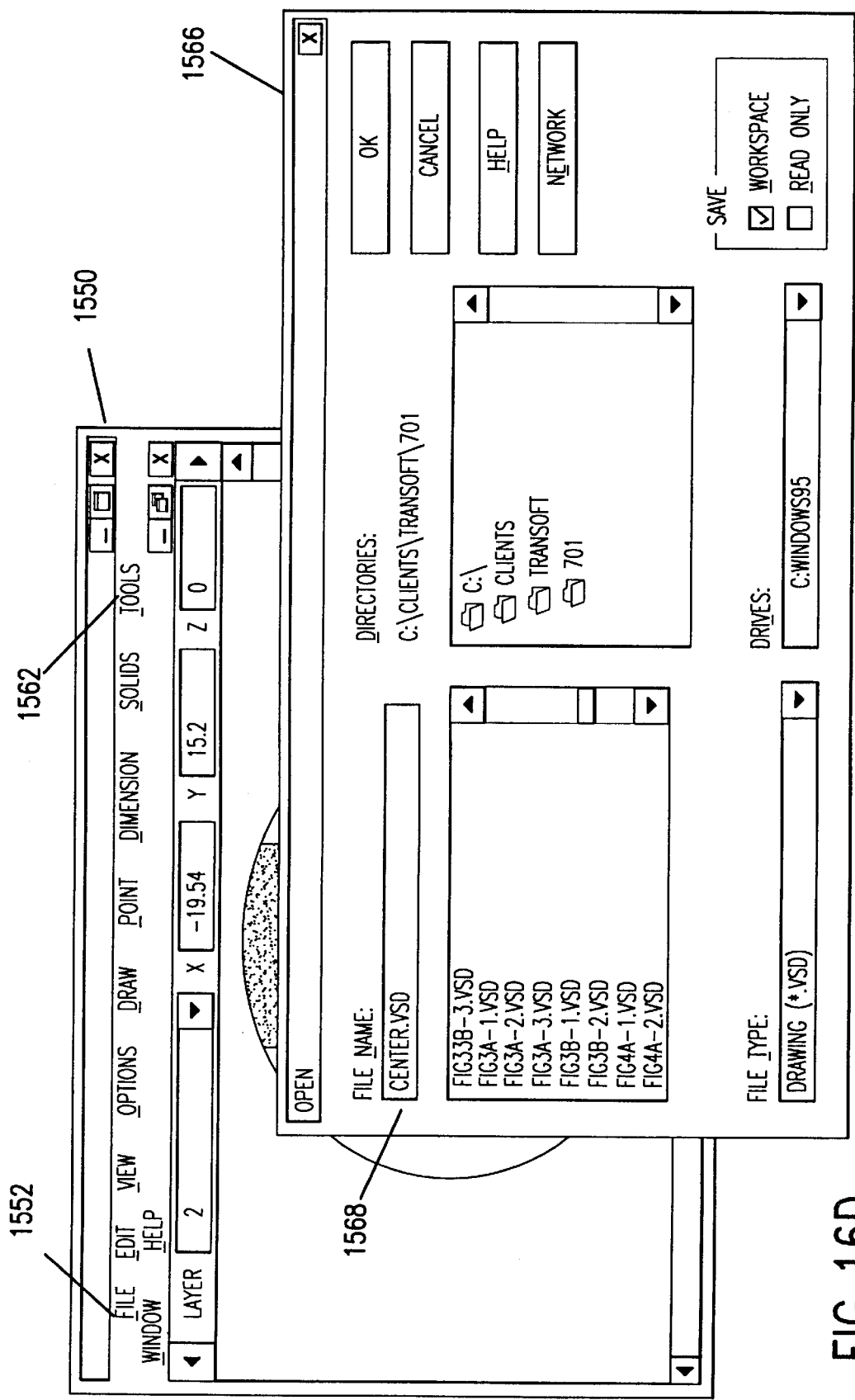

FIGS. 16A–D show a client resident application 1550 under the direction of a distributed project management process being caused to open a source data file [see FIGS. 16A–B] to process a file [see FIG. 16C] and to save the file [FIG. 16D]. The application is caused to perform in this manner by the control script 1462 [see FIG. 14D] associated with a segment. This code is uploaded by the distributed management processes and utilized by those processes to cause the application to perform in a predefined manner. In FIG. 16A, the GUI 1550 for the application is shown. Superimposed on that GUI is a file open GUI 1554. The file open GUI is enabled by the program code script which implements the file open command found within the file menu 1552. Within the GUI operator 1554 is a preview window 1556 in which the contents of the selected file 1558 are shown. In FIG. 16B image 1560 associated with file 1558 is displayed in GUI 1550.

In FIG. 16C the project management process has sent the next line of executable code to the CAD application resulting in a shading operation being selected from the tool menu 1562. As a result of this selection, the CAD application shades a portion 1564 of the image 1560 and displays it. In FIG. 16D the next line of code is delivered by the distributed project management processes to the application. Upon receipt of the next line of code, the application is caused to perform a file "save as" function found on menu tree 1552. In response, a "save as" GUI interface 1566 is enabled and the file name "center.vsd" is placed in the file name window. Subsequently, the file corresponding to the segment that has just been processed is stored on the network.

FIGS. 17A–F are process flow diagrams which show the various distributed project management processes.

Figure 17A:
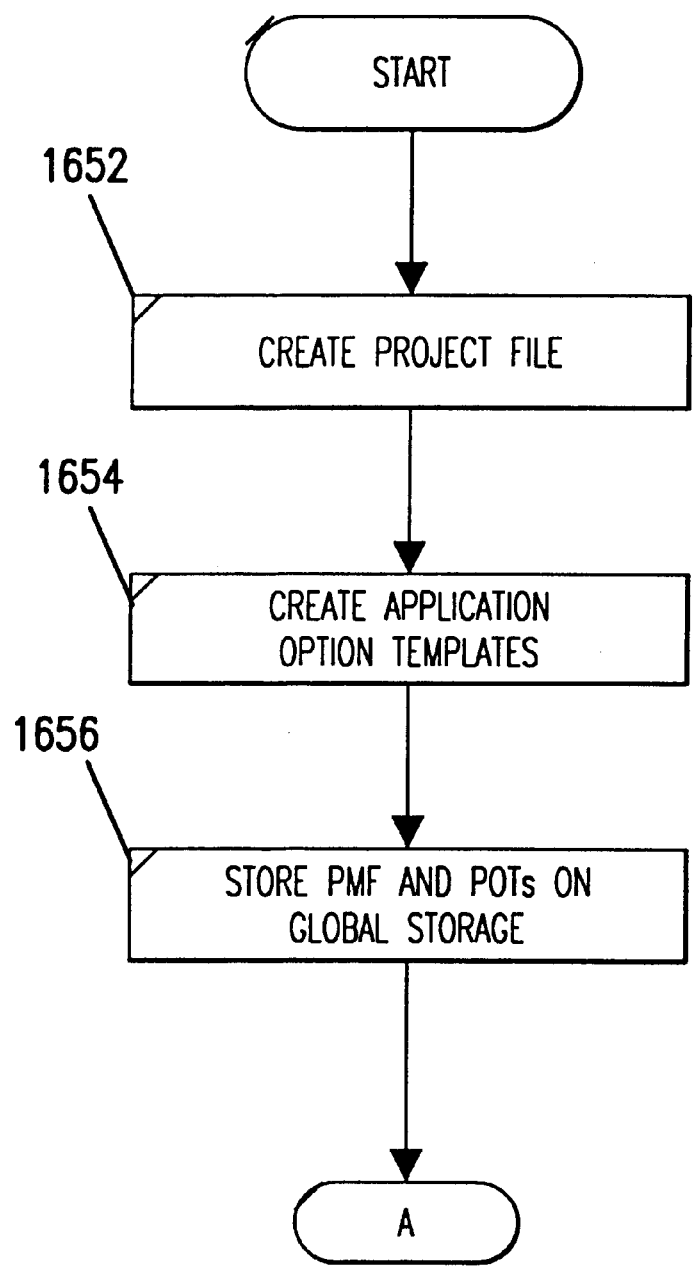
FIGS. 17A–F show the processes implemented on the clients of FIGS. 13A–C for implementing distributed process management.

FIG. 17A shows the create project processes. Commencing at the start block control passes to process 1652. In process 1652 a project file is created. In a preferred embodiment, the user is presented a GUI interface not unlike that shown in FIG. 14D. Using that template they enter the various parameters for the project file. Control then passes to process 1654. In process 1654 the process option template (s) are created. In a preferred embodiment, these are also created by a user via a GUI interface resembling that shown in FIG. 14C. Control then passes to process 1656. In process 1656 the process management files and related process option templates are stored on the network. Control then passes to splice block A.

Figure 17B:
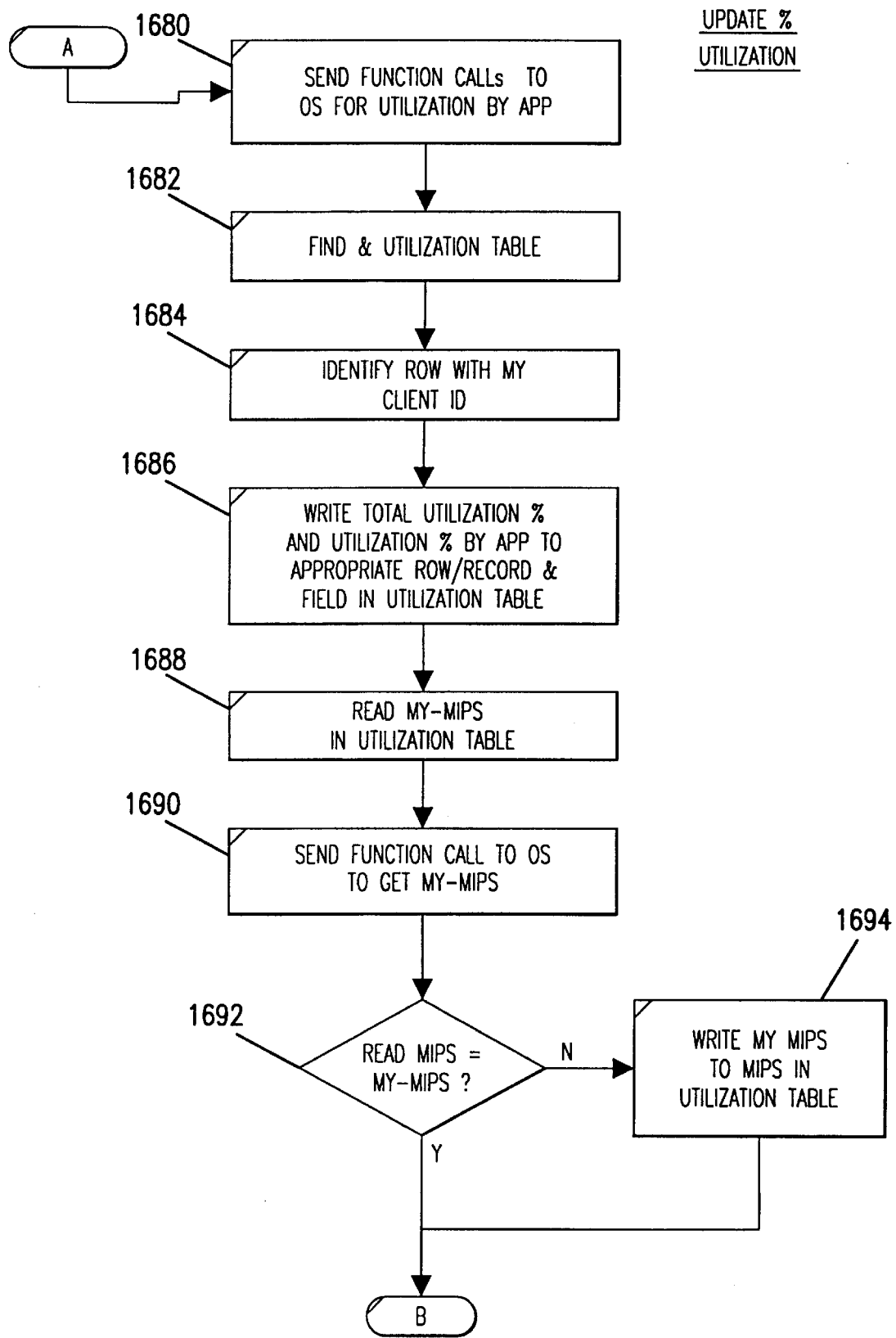

FIG. 17B shows the processes connected with maintaining the utilization/capacity table 1350 shown in FIG. 14B. As described and discussed above, the distributed management processes 1302, 1304, 1310 and 1312 [see FIGS. 13A–C] independently conduct these process steps. Commencing at splice block A, control passes to process 1680. A function call is sent to the OS to obtain utilization information broken down by application. Control is then passed to process 1682. In process 1682 the utilization table is discovered and read. Control is then passed to process 1684. In process 1684 the row/record is the utilization table corresponding to the client running this process is identified. Control is then passed to process 1686. In process 1686 the values obtained above in process 1680 are placed in the appropriate field in the utilization table. Control is then passed to process 1688. In process 1688 the processing speed for the client entered in the utilization table is read from that table. Control then passes to process 1690. In process 1690 function calls are sent to the OS to get the processing speed of the client. Control is then passed to decision process 1692. In decision process 1692 a determination is made as to whether the entry in the table corresponds to the actual processing speed of the client running the process. In the event the two do not match, then process is passed to process 1694 in which the entry in the table is updated to reflect the current processing power of the client. Control then passes to splice block B. Alternately, if in decision process 1692 an affirmative determination is reached, i.e., that the entry in the utilization table for this client is correct, then control passes directly to splice block B.

Figure 17C:
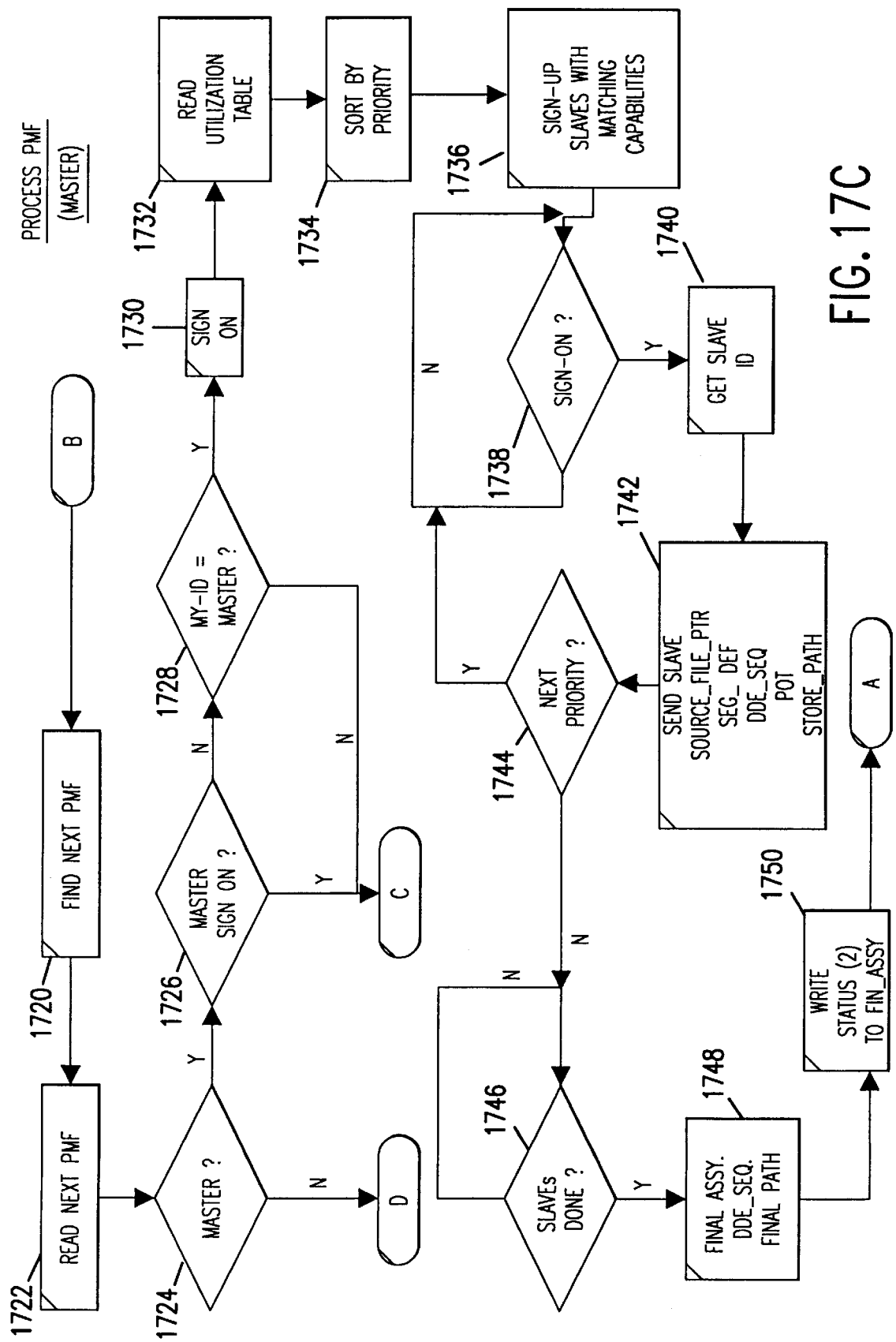

FIG. 17C shows the portion of the distributed management processes performed when a master/slave relationship has been enabled. There are basically two modes of operation for the distribution process management. In the master/slave mode, the client that is either predesignated for master status or that first seizes the PMF and obtains master status directs the subsequent processing of all segments of the project file. In another embodiment, a peer-to-peer approach to distributed processing is implemented. In the peer-to-peer approach each client is continually looking for an incomplete PMF to process.

In FIG. 17C processes commence at splice block B. Control passes to process 1720 in which the next PMF is located. In a preferred embodiment, the next PMF is selected from a first in first out (FIFO) queue and the processing on that PMF continues until all segments in the file are complete and the final assembly has been performed. In an alternate preferred embodiment, the next PMF would be defined as any file which had incomplete segments or which had not been finally assembled. Control then passes to process 1722 in which the selected PMF is read. Control then passes to decision process 1724. In decision process 1724 a determination is made as to whether this particular project management folder is enabled for master/slave status. In the event this determination is in the negative, control passes to splice block D. Alternately, if this determination is in the affirmative, then control passes to decision process 1726. In decision process 1726 a determination is made on the basis of master fields 1452 [see FIG. 14D] as to whether any master has signed on to this project management folder. In the event that determination is in the affirmative then control passes to splice block C. Alternately, if a determination in the negative is reached, control passes to decision process 1728. In decision process 1728 a determination is made as to whether the client designated for master status in the master status fields 1452 [see FIG. 14D] has an I.D. corresponding to my I.D., i.e., the client running this process. In the event that determination is in the negative then control passes to splice block C. Alternately, if that determination is in the affirmative then control passes to process 1730. In process 1730 the client signs on as accepting master status and it does so by writing a sign-on identifier to the appropriate field 1454 in the project management folder.

Control then passes to control 1732. In process 1732 the utilization table is read to determine slave availability and processing capacity. Control is then passed to process 1734. In process 1734 the segment record with the highest priority 1466 [see FIG. 14D] that has not yet had its segment status field 1470 [see FIG. 14D] marked with a "2" is obtained, and the application 1456 required for that segment is determined. Control is then passed to process 1736.

In process 1736 the master engages in a slave solicitation and/or slave assignment process. Only those slaves with locally resident applications which match the application 1456 for the segment are chosen. Additionally, slaves with more available processing power and less utilization, as determined in process 1732, will be preferred over those with slow processing speed and limited capacity. Control then passes to decision process 1738. In decision process 1738 a determination is made as to which slaves have accepted slave status. For those slaves that have accepted slave status control passes to process 1740 in which the slave I.D. is determined. Control then passes to process 1742. In process 1742 information is sent by the master to the slave based on the PMF segment that the slave is designated to process. That information includes: a pointer to the source file that the slave will need in order to engage in the process, a segment definition indicating what segment is to be processed, an executable code sequence to enable the slave to enable its resident application(s) and a process option template. Finally the master will send to the slave a pointer to the location on the network in which the slave should store its work product. Control then passes to decision process 1744. In decision process 1744 a determination is made as to whether there are any remaining incomplete segments and if there are then control returns to decision process 1738 for the selection of the next slave. If there are no remaining incomplete items then control passes to decision process 1746. In decision process 1746 a determination is made as to whether all of the slaves have completed their work. The completion of work is determined on the basis of entries made by the slaves in the project file, and specifically, the segment status fields 1470 [see FIG. 14D]. When a determination in the affirmative is reached, i.e., that all segments have been processed then control passes to process 1748. In process 1748 the master completes the final assembly of the segments of the project file according to the instructions contained in the assembly portion of the project file [see FIG. 14D]. Control then passes to process 1750. In process 1750 the master writes in the PMF and specifically fields 1472 a status indicator indicating that the final assembly is complete and that this project management folder can be closed. Control then passes to splice block A.

Figure 17D:
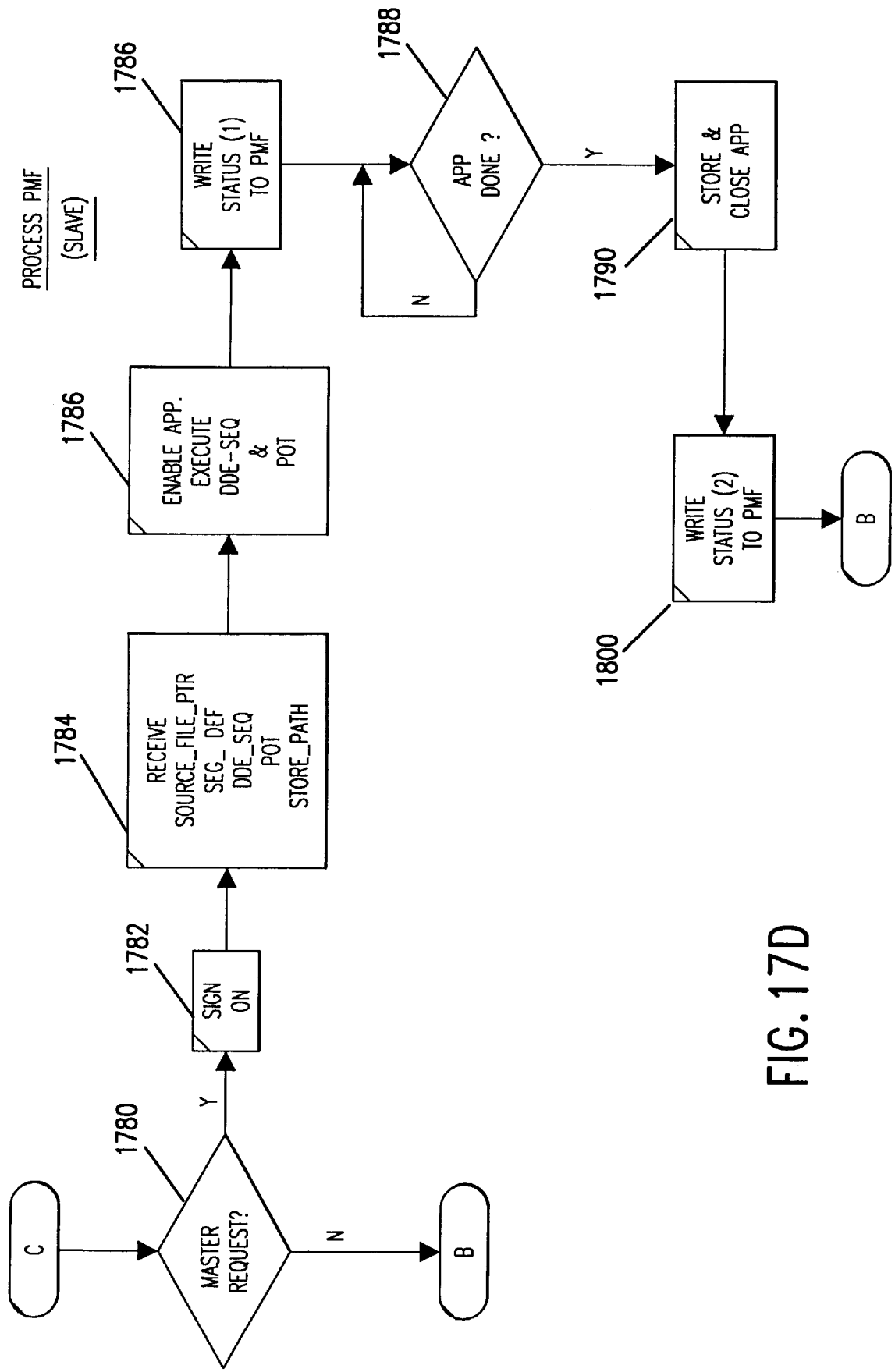

FIG. 17D sets forth the processes engaged in by a slave. Processing begins at splice block C and control is passed to decision process 1780. In decision process 1780 a determination is made as to whether or not a master request has been received. In the event that determination is in the negative control passes to splice block B. Alternately, if a determination on the affirmative is reached then control passes to process 1782. In process 1782 the slave sends an affirmative response to the master indicating that they accept slave status. Control is then passed to process 1784 in which the slave receives the information from the master necessary for it to process its designated segment of the project file. Control then passes to process 1786. In process 1786 the slave enables the designated application(s) and controls that application with the appropriate control script and process option template. This causes the application to perform its designated functions. Control is then passed to process 1786.

In process 1786 the slave writes to the corresponding segment status field 1470 in the project file [see FIG. 14D] a status "1" indicator. This indicates to any client reading the project file that that segment is being processed currently by the slave. Control then passes to decision process 1788 in which the slave determines whether or not the resident application has completed its project segment. When a determination in the affirmative is reached control is passed to process 1790. In process 1790 the application is caused to store its work product in the location designated in process 1784 and the application is closed. Control then passes to process 1800. In process 1800 a segment complete indicator "2" is written to the appropriate field 1470 in the project file. Control then passes to splice block B.

Figure 17E:
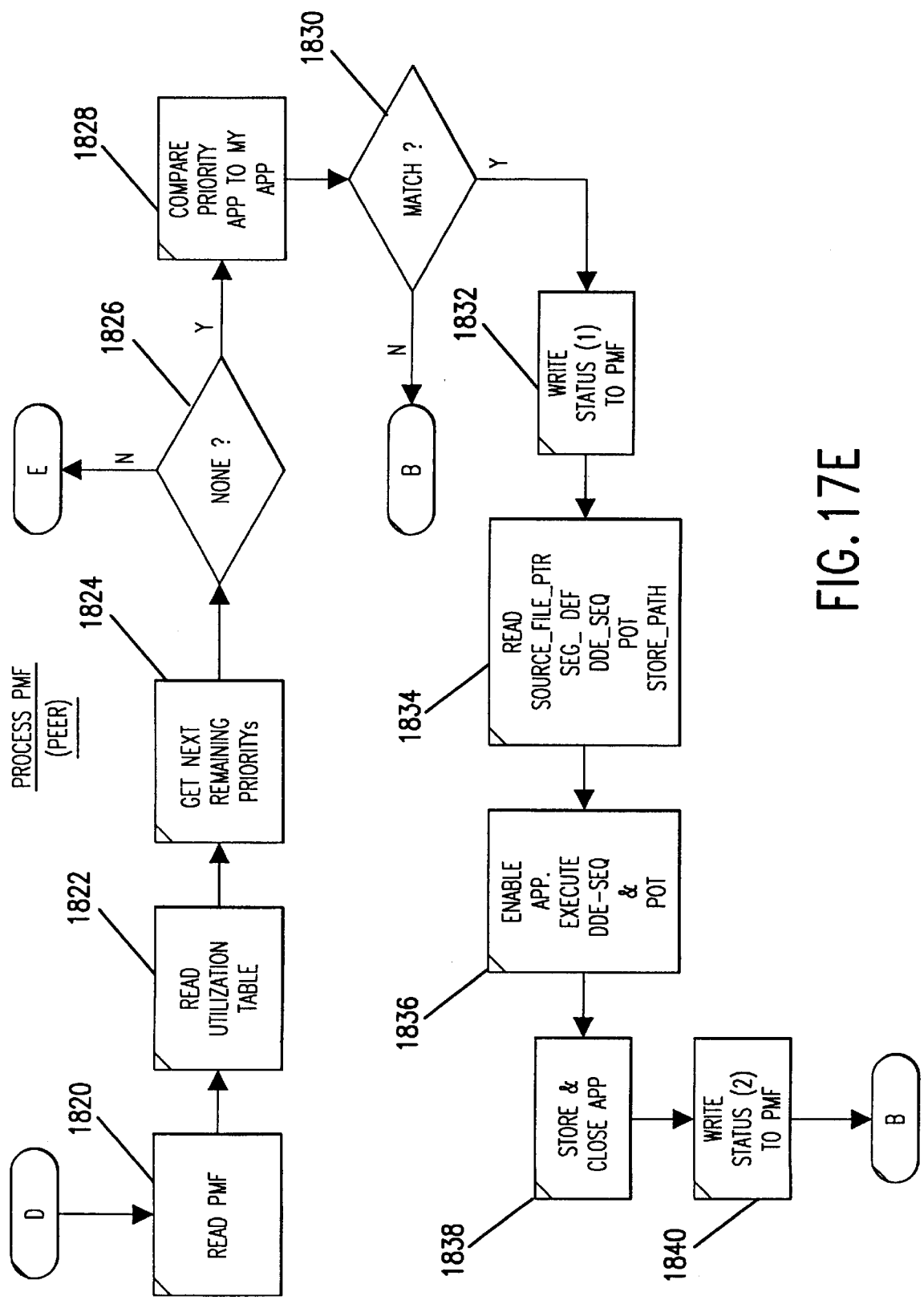

FIG. 17E discloses that portion of the distributed project processes associated with peer-to-peer, rather than master/slave relationships between the clients. Processing begins at splice block D. Control then passes to process 1820 in which the next PMF is read. Control then passes to process 1822 in which the utilization table is read. Control then passes to process 1824 in which the segments within the PMF are sorted by priority and a determination is made as to which of those segments is not yet completed. That determination is based on the entry in the above mentioned and discussed priority 1466 and segment status 1470 fields [see FIG. 14D]. Control then passes to decision process 1826. In decision process 1826 a determination is made as to whether there are any remaining incomplete segments. If that determination is in the negative then control is passed to splice block E. Alternately, if a determination in the affirmative is reached, i.e., that there are remaining segments to be processed then control is passed to process 1828. In process 1828 a determination is made as to whether the application associated with the next prioritized segment is available on the client running this process. Control then passes to decision process 1830 in which that determination is implemented.

In process 1736 the master engages in a slave solicitation and/or slave assignment process. Only those slaves with locally resident applications which match the application 1456 for the segment are chosen. Additionally in a preferred embodiment, slaves with more availabile processing power and less utilization, as determined in process 1732, will be preferred over those with slow processing speed and limited capacity. If the client running the process does not have the application called for then control passes to splice block B. Alternately, if an affirmative determination is reached, i.e., that the client has the requisite application resident then control passes to process 1832. In process 1832 the client signs on to a segment within the project file. A client does this by writing a status "1" indicator in the appropriate segment status field 1470 in the project file. [See FIG. 14D.] Control then passes to process 1834. In process 1834 the client reads from the process file the appropriate segment information including a pointer to the source file, segment definition, application processing code, process option template and/or path statement to process option template and a designated location in which to store the work product. Control then passes to process 1836. In process 1836 the client enables its resident application utilizing the program code sequence and the process option template provided to it from the project file. Control then passes to process 1838 in which the application which has finished the project stores its work product. The storage location corresponds to the designated source path 1464 [see FIG. 14D]. Control then passes to process 1840. In process 1840 the appropriate one of the status fields 1470 is updated to a status "2" to indicate in the project file that that particular segment is complete. Control then passes to splice block B.

Figure 17F:
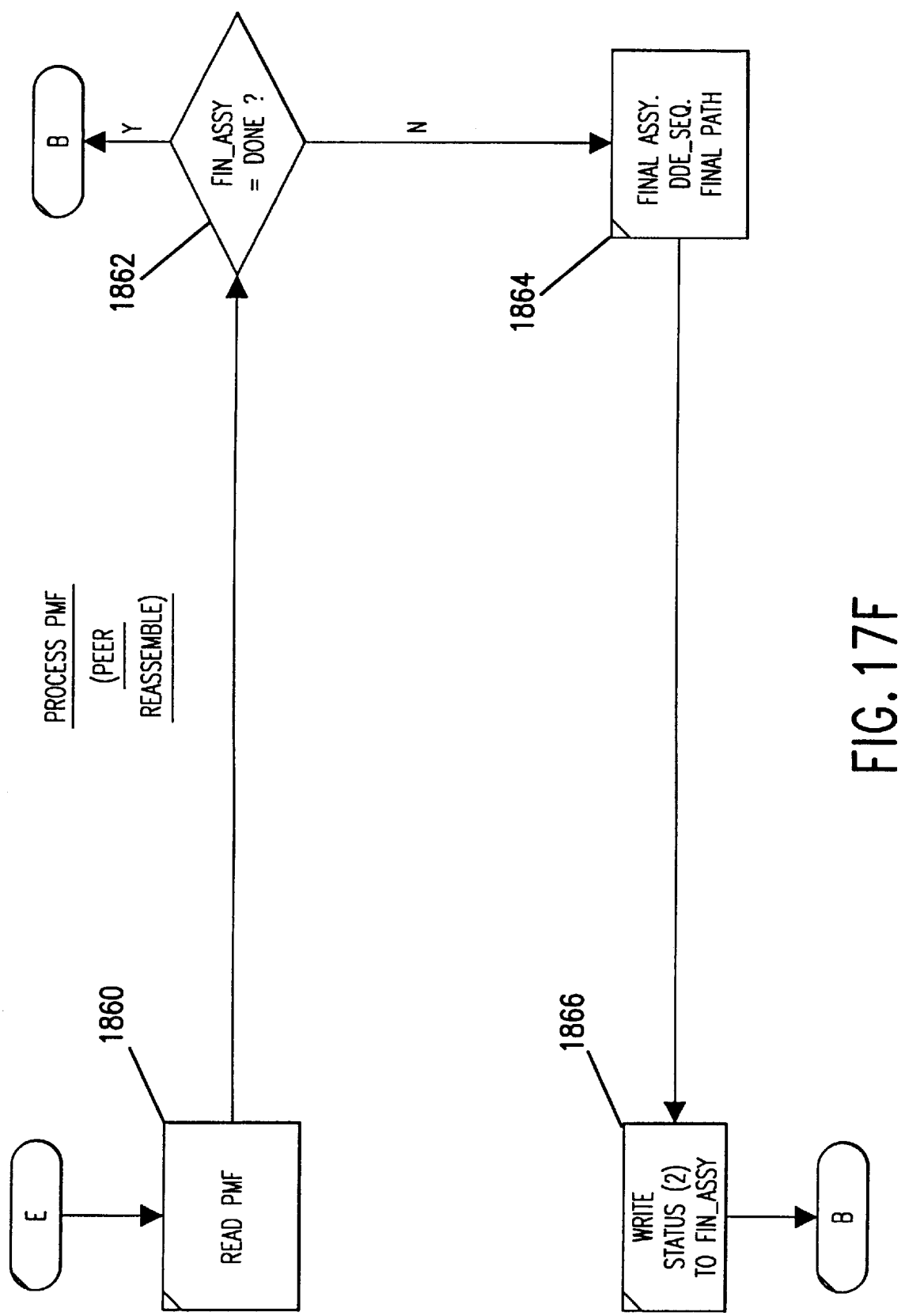

FIG. 17F indicates those processes engaged in a peer-to-peer relationship associated with the reassembly of a project file in which all segments have been completed. Processing begins at splice block E and passes to process 1860. In process 1860 the project management folder is read. Control then passes to decision process 1862. In decision process 1862 a determination is made on the basis of final assembly fields 1472 in the project file [see FIG. 14D] as to whether the PMF has been assembled. In the event that determination is in the affirmative then control returns to splice block B. Alternately, if a negative determination is reached, i.e., that the PMF has not been subject to final assembly then control passes to process 1864. In process 1864 the final assembly is performed according to the assembly instructions stored in the PMF. Control then passes to process 1866. In process 1866 the appropriate final assembly field(s) is marked with a status "2" indicating that the final assembly is complete. Control then returns to splice block B.

Inter Application Calls

Distribute_Process(POT_File_Pathname, Project_File_Pathname)

| From | To | Notes |
|------|-----|-------|
| MPA  | MSB |       |
| MPCA | MSB |       |

Launch_Process

| From | To  | Notes |
|------|-----|-------|
| SSB  | SPA |       |
| MSB  | SPA | In case processing power of the master machine is wanted (not already open) |

Process_Segment(PMF_File_Pathname, Plugin_ID, Timestamp, Segment_Parameters)

| From | To  | Notes |
|------|-----|-------|
| SBPI | SPA |       |
| SBPI | MPA | In cases where processing power of master machine is wanted |

Processing_Segment(PMF_File_Pathname, Plugin_ID, Timestamp, Segment_Parameters)

| From | To  | Notes |
|------|-----|-------|
| SPA  | SSB | Indicates that processing of requested segment has actually begun |
| MPA  | MSB | Indicates same, used in cases where processing power of master machine is wanted |

Segment_Done(PMF_File_Pathname, Plugin_ID, Timestamp, Segment_Parameters)

| From | To  | Notes |
|------|-----|-------|
| SPA  | SSB | Indicates that processing of requested segment done |
| MPA  | MSB | Indicates same, used in cases where processing power of master machine is wanted |

Quit_Process

| From | To  | Notes |
|------|-----|-------|
| SSB  | SPA |       |
| MSB  | SPA | In case processing power of the master machine was used (wasn't open at start) |

-continued

Assemble_Process(PMF_File_Pathname, Plugin_ID, Timestamp)

| From | To  | Notes |
|------|-----|-------|
| SBPI | SPA | Optional way to assemble when the plugin itself cannot assemble result |
| SBPI | MSB | Same, used in cases where processing power of master machine is wanted |

Assembly_Done(PMF_File_Pathname, Plugin_ID, Timestamp)

| From | To  | Notes |
|------|-----|-------|
| SPA  | SSB | If assembly done with process assistance, indicates completion |
| MPA  | MSB | Same, used in cases where processing power of master machine was used. |

Process_Complete(POT_File_Pathname, Project_File_Pathname)

| From | To   | Notes |
|------|------|-------|
| MSB  | MPA  | Indicates completion of entire process |
| MSB  | MPCA | Same |

StudioBOSS to StudioBOSS Calls
FOR PROCESS CONTROL

SB_Process_Segment(PMF_File_Pathname, PMF_Reference)

| From | To  | Notes |
|------|-----|-------|
| MSB  | SSB |       |

SB_Processing_Segment(PMF_Reference)

| From | To  | Notes |
|------|-----|-------|
| SSB  | MSB | Indicates that processing of requested segment has actually begun |

SB_Segment_Done(PMF_Reference)

| From | To  | Notes |
|------|-----|-------|
| SSB  | MSB | Indicates that processing of requested segment done |

SB_Quit_Process(PMF_Reference)

| From | To  | Notes |
|------|-----|-------|
| MSB  | SSB | Called to cleanup after process segments are done processing |

SB_Assemble_Process(PMF_Reference)

| From | To  | Notes |
|------|-----|-------|
| MSB  | SSB | Called to assemble process results (when plugin/app not available on MSB) |

FOR ARBITRATION MASTER/SLAVE CONTROL

SB_Become_Slave(PMF_File_Pathname, PMF_Reference)

| From | To  | Notes |
|------|-----|-------|
| MSB  | SSB | Called to become slave |

SB_Slave_Response(PMF_File_Pathname, PMF_Reference, Response)

| From | To  | Notes |
|------|-----|-------|
| SSB  | MSB | Response (true/false) if it will be slave for the process |

-continued

SB_Become_Free

| From | To  | Notes            |
|------|-----|------------------|
| MSB  | SSB | To free up slaves |

Pugin Calls

PI_Process_Segment(PMF_File_Pathname)

Called to distributed a process segment. Results in Process_Segment IAC call.

PI_Assemble_Process(PMF_File_Pathname)

Called to assemble process results. The plug-in either can assemble the results without any process application interaction, or it can as a option
issue a Assemble_Process IAC call to assemble everything.

Legend
MPA Master Process Application
MPCA Muti-Process Controller Application
PI Plug In
PMF Process Management File
SB StudioBOSS
MSB Master StudioBOSS
SSB Slave StudioBOSS
POT Process Option Template
SBPI StudioBOSS Plug-in which lives inside MSB or SSB Process Option Template (POT)
    Template_Signature
    (application specific options)
    POT Example, Results assembled in memory—For a frame based process
    Template_Signature
    Bit_Depth
    Frame_Size_X
    Frame_Size_Y
    POT Example, Results assembled in files—For a time based process
    Template_Signature
    Frame_Size
    Frames_Per_Second
    Compressor
    Start_Time
    End_Time
PMF
    Project_File_Path
    Remaining_Segments_To_Procss
    Process_Application_Signature
    Master Host ID
    Reassembly_Method
    Number_Of_Slaves
    (for each slave, the following)
    Slave_ID
    Segment_Being_Processed
    Segment_Status (not_procesing, processing_in_progress, processing_complete)
    Result_Location
    Process_Option_Template The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A distributed volume management system including clients coupled to a data storage device including a file directory defining a volume on the data storage device, and the distributed volume management system comprising:
    a control table including
        a volume field for containing a unique client identifier identifying among the clients a client with a read/write privilege to the volume; and
    volume control processes each controlling a mounted state including read and read/write of the volume on a corresponding one of said clients, and the volume control processes reading the volume field to initialize the system with a first client on which the volume is mounted for read/write access and writing to the volume field the unique client identifier of a second client to change the mounted state together with mounting the volume in a read/write state on the second client and a read state on the first client.

2. The distributed volume management system of claim 1, wherein said control table further comprises:
    security indicia for indicating the access privileges for each of said clients to said volume; and
    said volume control processes further comprise:
    processes for denying write privileges to the data storage volume to a one of the clients listed in said control table security indicia with read only access privileges to the volume.

3. A volume management system for managing a data storage volume, and for providing exclusive write access to a plurality of clients connected to the data storage volume, the volume management system comprising:
    a control table associated with said data storage volume, said control table including
        a) availability indicia for indicating whether the control table is available;
        b) identification indicia for indicating ownership of the data storage volume; and
    a plurality of control processes each executed on a corresponding one of said plurality of clients, said plurality of control processes: requesting and acquiring exclusive ownership of said control table to provide to each of said plurality of clients exclusive write access to the data storage volume and updating a file directory corresponding to the data storage volume on each of said plurality of clients with read only access privileges.

4. A volume management system for managing a data storage volume, and for providing exclusive write access to a plurality of clients connected to the data storage volume, the volume management system comprising:
    a control table associated with said data storage volume, said control table including
        a) availability indicia for indicating whether the control table is available;
        b) identification indicia for indicating ownership of the data storage volume;
        c) security indicia for indicating the access privileges for each of said plurality of clients to said data storage volume; and
    a plurality of control processes each executed on a corresponding one of said plurality of clients, said plurality of control processes: requesting and acquiring exclusive ownership of said control table to provide to each said plurality of clients exclusive write access to the data storage volume; denying write access to the data storage volume to a one of the plurality of clients listed in said control table security indicia with read only access privileges to the data storage volume and updating a file directory corresponding to the data storage volume on each of said plurality of clients with read only access privileges.

5. The distributed volume management system of claim 1, wherein said volume control processes further comprise:
   processes for displaying on a monitor of a one of the clients with exclusive write access to said volume a request from an other of said clients to release exclusive write status; and
   processes for accepting from an input device of the one of the clients an affirmative and a negative response to the request to release exclusive write status.

6. The distributed volume management system of claim 1, wherein said volume control processes further comprise:
   processes for displaying on a monitor of a client the status of each of the clients with respect to the volume, the status including: mount/dismount read only, read/write and locked/unlocked.

7. A volume management system for managing a data storage volume and for providing exclusive write access to a plurality of clients connected to the data storage volume, the volume management system comprising:
   a control table associated with said data storage volume said control table including
      a) availability indicia for indicating whether the control table is available;
      b) identification indicia for indicating ownership of the data storage volume; and
   a plurality of control processes each executed on a corresponding one of said plurality of clients, said plurality of control processes; requesting and acquiring exclusive ownership of said control table to provide to each of said plurality of clients exclusive write access to the data storage volume; locking each of a plurality of data storage volume drivers connecting each of the plurality of clients to the data storage volume during an initial power-up of each of the plurality of clients; and unlocking each of the plurality of data storage volume drivers upon initiation of the requesting and acquiring processes.

8. A volume management system for managing a data storage volume, and for providing exclusive write access to a plurality of clients connected to the data storage volume, the volume management system comprising:
   a control table associated with said data storage volume, said control table including
      a) availability indicia for indicating whether the control table is available;
      b) identification indicia for indicating ownership of the data storage volume; and
   a plurality of control processes each executed on a corresponding one of said plurality of clients, said plurality of control processes: requesting and acquiring exclusive ownership of said control table to provide to each of said plurality of clients exclusive write access to the data storage volume; accepting a message from a first of said plurality of clients to a second of said plurality of clients and writing the message to said control table; and determining that a message exists in said control table and displaying the message on a monitor of said second of said plurality of clients.

9. A method in a computer system for enforcing mutually exclusive write access to a data storage volume among a plurality of clients connected to the data storage volume, said method for enforcing mutually exclusive write access comprises the acts of:
   creating a control table connected to each of said plurality of clients for storing indicia of control table availability and indicia of ownership of the data storage volume;
   detecting a write request at a first of said plurality of clients,
   initiating a request routine on said first of said plurality of clients in response to said detecting act, wherein said request routine comprises the acts of:
      a) determining on the basis of the indicia of ownership of the data storage volume that an other of said plurality of clients has write access to said data storage volume; and
      b) sending, in response to said determining act, a release request to said other of said plurality of clients to release write access;
      c) responsive to an affirmative notification from said other of said plurality of clients;
         i) replacing the indicia of ownership with a first client indicia of ownership;
         ii) mounting said data storage volume for write access; and
      acquiring said release request at said second of said plurality of clients;
      initiating a release routine on said second of said plurality of clients in response to said acquiring act, wherein said release routine comprises the acts of:
      a) releasing write access to said data storage volume; and
      b) sending an affirmative notification to said first client of said releasing act.

10. The method of claim 9, wherein said request routines and said release routines may originate from a plurality of different file system protocols.

11. The method as claimed in claim 9 wherein said creating act further comprises the acts of:
   providing for the storage of security indicia in said control table for indicating access privileges to the data storage volume for each of the plurality of clients; and
   said act of detecting a write request further comprises the acts of:
   denying a write request to the data storage volume by a one of said plurality of clients with security indicia in said control table indicating read only access privileges to the data storage volume.

12. The method as claimed in claim 9 wherein said method for enforcing mutually exclusive write access further comprises the acts of:
   updating a copy of a data storage volume file on a one of the plurality of clients with read only access privileges to the data storage volume when changes are made to said data storage volume file directory.

13. The method as claimed in claim 9 wherein said method for enforcing mutually exclusive write access further comprises the acts of:
   displaying on a monitor of a one of the plurality of clients with exclusive write access to said data storage volume a request to release exclusive write status; and
   accepting from an input device of the one of the plurality of clients an affirmative and a negative response to the request to release.

14. The method as claimed in claim 9 wherein said method for enforcing mutually exclusive write access further comprises the acts of:

displaying on a monitor of a one of the plurality of clients the status of each of the plurality of clients with respect to the data storage volume, the status including: read only, read/write.

15. The method as claimed in claim 9 wherein said method for enforcing mutually exclusive write access further comprises the acts of:

locking each of a plurality of data storage volume drivers connecting each of the plurality of clients to the data storage volume during an initial power-up of each of the plurality of clients; and unlocking each of the plurality of data storage volume drivers upon initiation of the requesting and acquiring processes.

16. The method as claimed in claim 9 wherein said method for enforcing mutually exclusive write access further comprises the acts of:

accepting a message from a first of said plurality of clients to a second of said plurality of clients and writing the message to said control table;

determining that a message exists in said control table; and displaying the message on a monitor of said second of said plurality of clients.

17. A computer usable medium having computer readable program code embodied therein for enforcing mutually exclusive write access to a data storage volume among a plurality of clients connected to the data storage volume, the computer readable program code in said article of manufacture comprising:

computer readable program code for causing a computer to create a control table connected to each of said plurality of clients for storing indicia of control table availability and indicia of ownership of the data storage volume;

computer readable program code for causing a computer to detect a write request at a first of said plurality of clients, computer readable program code for causing a computer to initiate a request routine on said first of said plurality of clients in response to said detection of a write request, wherein said request routine comprises the acts of:

a) determining on the basis of the indicia of ownership of the data storage volume that an other of said plurality of clients has write access to said data storage volume; and b) sending, in response to said determining act, a release request to said other of said plurality of clients to release write access;

c) responsive to an affirmative notification from said other of said plurality of clients;

i) replacing the indicia of ownership with a first client indicia of ownership;

ii) mounting said data storage volume for write access; and computer readable program code for causing a computer to acquire said release request at said second of said plurality of clients;

computer readable program code for causing a computer to initiate a release routine on said second of said plurality of clients in response to said acquisition of said release request, wherein said release routine comprises the acts of:

a) releasing write access to said data storage volume; and b) sending an affirmative notification to said first client of said releasing act.

18. A method for enforcing mutually exclusive write access to a data storage volume among clients connected to the data storage volume, and said method for enforcing mutually exclusive write access comprising the acts of:

creating a control table read/write accessible to each of the clients and the control table including a semaphore field and a volume field each for containing a unique client identifier identifying among the clients, respectively, the client owner of the control table and the client with an exclusive write privilege to the data storage volume;

detecting a write request at a first of said clients;

determining on the basis of the unique client identifier in the volume field that a second of the clients includes an exclusive write privilege to the data storage volume;

communicating, in response to said deterring act, a request to release the exclusive write privilege to the second of the clients;

responding to a grant from the second of the clients by remounting the data storage volume on the second of the clients for read access, remounting the data storage volume on the first of the clients for read/write access, writing the unique client identifier of the first client to the volume field of the control table and releasing the control table; and responding to a denial from the second of the clients by releasing the control table.

19. A computer usable medium having computer readable program code embodied therein for enforcing mutually exclusive write access to a data storage volume among clients connected to the data storage volume, the computer readable program code in said article of manufacture comprising:

computer readable program code for creating a control table read/write accessible to each of the clients and the control table including a semaphore field and a volume field each for containing a unique client identifier identifying among the clients, respectively, the client owner of the control table and the client with an exclusive write privilege to the data storage volume;

computer readable program code for detecting a a write request at a first of said clients;

computer readable program code for determining on the basis of the unique client identifier in the volume field that a second of the clients includes an exclusive write privilege to the data storage volume;

computer readable program code for communicating, in response to said determining act, a request to release the exclusive write privilege to the second of the clients;

computer readable program code for responding to a grant from the second of the clients by remounting the data storage volume on the second of the clients for read access, remounting the data storage volume on the first of the clients for read/write access, writing the unique client identifier of the first client to the volume field of the control table and releasing the control table; and computer readable program code for responding to a denial from the second of the clients by releasing the control table.

* * * * *

UNITED STATES PATENT AND TRADEMARK OFFICE
CERTIFICATE OF CORRECTION

PATENT NO. : 5,999,930
DATED : December 7, 1999
INVENTOR(S) : James J. Wolff

It is certified that error appears in the above-identified patent and that said Letters Patent is hereby corrected as shown below:

Column 4,
Line 66, delete "fall" and insert therefor -- full --

Column 18,
Line 49, "FIG. SE" and insert therefor -- FIG. 5E --

Column 40,
Line 20, delete "deterring" and insert therefor -- determining --
Line 45, after "detecting" delete "a"

Signed and Sealed this

Eighteenth Day of January, 2005

JON W. DUDAS
*Director of the United States Patent and Trademark Office*